US012738283B2

(12) United States Patent
Markovic et al.

(10) Patent No.: US 12,738,283 B2
(45) Date of Patent: Sep. 15, 2026

(54) PROCESSOR FOR GENERATING A PREDICTION SPECTRUM BASED ON LONG-TERM PREDICTION AND/OR HARMONIC POST-FILTERING

(71) Applicant: Fraunhofer-Gesellschaft zur Förderung der angewandten Forschung e.V., Munich (DE)

(72) Inventors: Goran Markovic, Erlangen (DE); Bernd Edler, Erlangen (DE); Stefan Bayer, Erlangen (DE); Jan Frederik Kiene, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 127 days.

(21) Appl. No.: 18/405,369

(22) Filed: Jan. 5, 2024

(65) Prior Publication Data

US 2024/0177720 A1 May 30, 2024

Related U.S. Application Data

(63) Continuation of application No. PCT/EP2022/069751, filed on Jul. 14, 2022.

(30) Foreign Application Priority Data

Jul. 14, 2021 (EP) .................................... 21185662

(51) Int. Cl.
*G10L 19/02* (2013.01)
*G10L 19/09* (2013.01)
*G10L 25/18* (2013.01)

(52) U.S. Cl.
CPC .............. *G10L 19/02* (2013.01); *G10L 19/09* (2013.01); *G10L 25/18* (2013.01)

(58) Field of Classification Search
None
See application file for complete search history.

(56) References Cited

U.S. PATENT DOCUMENTS 5,886,276 A 3/1999 Levine et al.
6,064,954 A * 5/2000 Cohen ................ G10L 19/0212
704/E19.02
(Continued)

FOREIGN PATENT DOCUMENTS

EP 2980794 A1 2/2016
EP 3671741 A1 6/2020
(Continued)

OTHER PUBLICATIONS

Examiner, "Office Action for Japanese Application No. 2024-501939 ", Mar. 18, 2025, JPO, Japan.
(Continued)

*Primary Examiner* — Douglas Godbold
(74) *Attorney, Agent, or Firm* — Bridgeway IP Law Group, PLLC; Jihun Kim

(57) ABSTRACT

A processor for processing an (encoded) audio signal, the processor comprising: an LTP buffer configured to receive samples derived from a frame of the encoded audio signal; an interval splitter configured to divide a time interval associated with a subsequent frame of the encoded audio signal into sub-intervals depending on the encoded pitch parameter; calculation means configured to derive sub-interval parameters from the encoded pitch parameter dependent on a position of the sub-intervals within the time interval associated with the subsequent frame of the encoded audio signal; a predictor configured for generating a prediction signal from the LTP buffer dependent on the sub-
(Continued)

interval parameters; and a frequency domain transformer configured for generating a prediction spectrum ($X_P$) based on the prediction signal.

30 Claims, 25 Drawing Sheets

(56) References Cited

U.S. PATENT DOCUMENTS

| | | | | |
|---|---|---|---|---|
| 8,060,363 | B2 | 11/2011 | Anssi et al. | |
| 11,043,226 | B2 | 6/2021 | Ravelli et al. | |
| 2005/0228648 | A1* | 10/2005 | Heikkinen | G10L 19/20 704/205 |
| 2006/0047522 | A1 | 3/2006 | Ojanpera | |
| 2006/0089832 | A1 | 4/2006 | Ojanpera | |
| 2006/0239473 | A1 | 10/2006 | Kjorling et al. | |
| 2007/0239440 | A1 | 10/2007 | Garudadri et al. | |
| 2008/0027711 | A1* | 1/2008 | Rajendran | G10L 19/167 704/201 |
| 2008/0126081 | A1 | 5/2008 | Geiser et al. | |
| 2009/0070118 | A1 | 3/2009 | Den Brinker et al. | |
| 2009/0234644 | A1 | 9/2009 | Reznik et al. | |
| 2010/0250260 | A1 | 9/2010 | Laaksonen et al. | |
| 2010/0262420 | A1 | 10/2010 | Herre et al. | |
| 2011/0270616 | A1 | 11/2011 | Garudadri et al. | |
| 2011/0320212 | A1 | 12/2011 | Tsujino et al. | |
| 2012/0146831 | A1 | 6/2012 | Eksler | |
| 2013/0151262 | A1 | 6/2013 | Lohwasser et al. | |
| 2013/0346073 | A1 | 12/2013 | Laaksonen et al. | |
| 2014/0244274 | A1 | 8/2014 | Yamanashi et al. | |
| 2014/0310009 | A1* | 10/2014 | Lee | G10L 19/26 704/500 |
| 2015/0106108 | A1 | 4/2015 | Baeckstroem et al. | |
| 2015/0228289 | A1 | 8/2015 | Oh et al. | |
| 2015/0262588 | A1* | 9/2015 | Tsutsumi | G10L 19/005 704/207 |
| 2016/0027450 | A1 | 1/2016 | Gao | |
| 2016/0133265 | A1 | 5/2016 | Disch et al. | |
| 2016/0155451 | A1 | 6/2016 | Baeckstroem et al. | |
| 2016/0284357 | A1 | 9/2016 | Kawashima et al. | |
| 2016/0293175 | A1 | 10/2016 | Atti et al. | |
| 2017/0069328 | A1 | 3/2017 | Kawashima et al. | |
| 2017/0256267 | A1 | 9/2017 | Disch et al. | |
| 2018/0182400 | A1 | 6/2018 | Choo et al. | |
| 2018/0190303 | A1 | 7/2018 | Ghido et al. | |
| 2019/0158833 | A1 | 5/2019 | Sung et al. | |
| 2019/0272835 | A1 | 9/2019 | Adami et al. | |
| 2019/0295561 | A1 | 9/2019 | Disch et al. | |
| 2020/0294518 | A1 | 9/2020 | Ravelli et al. | |
| 2021/0125624 | A1* | 4/2021 | Ravelli | G10L 19/025 |

FOREIGN PATENT DOCUMENTS

| | | | |
|---|---|---|---|
| JP | H09-261064 | A | 10/1997 |
| JP | 2007-004050 | A | 1/2007 |
| JP | 2008-513848 | A | 5/2008 |
| JP | 2010-530079 | A | 9/2010 |
| JP | 2017-523473 | A | 8/2017 |
| RU | 2409874 | C9 | 1/2011 |
| RU | 2428748 | C2 | 9/2011 |
| RU | 2482554 | C1 | 5/2013 |
| RU | 2662921 | C2 | 7/2018 |
| RU | 2667376 | C2 | 9/2018 |
| WO | 2008151755 | A1 | 12/2008 |
| WO | 2010003556 | A1 | 1/2010 |
| WO | 2008072701 | A1 | 4/2010 |
| WO | 2013107602 | A1 | 7/2013 |
| WO | 2014056705 | A1 | 4/2014 |
| WO | 2014118171 | A1 | 8/2014 |
| WO | 2014118175 | A1 | 8/2014 |
| WO | 2014128197 | A1 | 8/2014 |
| WO | 2015010949 | A1 | 1/2015 |
| WO | 2015010952 | A1 | 1/2015 |
| WO | 2015010953 | A1 | 1/2015 |
| WO | 2015010954 | A1 | 1/2015 |
| WO | 2016016121 | A1 | 2/2016 |
| WO | 2016142357 | A1 | 9/2016 |
| WO | 2019091573 | A1 | 5/2019 |
| WO | 2019091904 | A1 | 5/2019 |
| WO | 2019092220 | A1 | 5/2019 |
| WO | 2021104623 | A1 | 6/2021 |

OTHER PUBLICATIONS

Examiner, “Office Action for Japanese Application No. 2024-501938 ”, Mar. 18, 2025, JPO, Japan.

Volkov P.A . . . “Office Action for RU Application No. 2024103467”, Apr. 12, 2024, Rospatent, Russia.

Kenichi Makino et al., “Hybrid audio coding for speech and audio below medium bit rate”, Consumer Electronics, 2000, ICCE, 2000 Digest of Technical Papers, International Conference on 2000, pp. 264-265.

Juha Ojanperä et al., “Long term predictor for transform domain perceptual audio coding”, An Audio Engineering Society Convention 107th, Sep. 24-27, 1999, New York.

Sean A. Ramprashad, “A multimode transform predictive coder (MTPC) for speech and audio”, Speech Coding Proceedings, 1999 IEEE Workshop, 1999, pp. 10-12.

Lars Villemoes et al., “Speech coding with transform domain prediction”, 2017 IEEE Workshop on Applications of signal Processing to Audio and Acoustics(WASPAA), 2017, pp. 324-328.

Ronald Howell Frazier, “An adaptive filtering approach toward speech enhancement,” Citeseer, 1975.

D. Malah et al., “A generalized comb filtering technique for speech enhancement,” Acoustics, Speech, and Signal Processing, IEEE International Conference on ICASSP’ 82., 1982, vol. 7, pp. 160-163.

Jeongook Song et al., “Harmonic Enhancement in Low Bitrate Audio Coding Using an Efficient Long-Term Predictor,” EURASIP Journal on Advances in Signal Processing, Feb. 8, 1010, vol. 2010, Article ID 939542, 9 pages.

Universal Mobile Telecommunications System (UMTS), LTE, EVS Codec General Overview, 3GPP TS 26.441 version 12.0.0 Release 12, Oct. 2014.

Ning Guo et al., “Frequency Domain Long-Term Prediction for Low Delay General Audio Coding”, IEEE Signal Processing Letters, pp. 1185-1189, vol. 28, 2021.

Tejaswi Nanjundaswamy et al., “Cascaded Long Term Prediction for Enhanced Compression of Polyphonic Audio Signals,” IEEE/ACM Transactions On Audio, Speech, And Language Processing, Mar. 2014, pp. 697-710, vol. 22, No. 3.

“Low Complexity Communication Codec”, Bluetooth SIG Proprietary, v 1.0, Sep. 15, 2020, Hearing Aid Working Group.

“Digital Enhanced Cordless Telecommunications (DECT), Low Complexity Communication Codec plus (LC3plus)”, ETSI TS 103 634 V1.3.1, Oct. 2021.

Juin-Hwey Chen et al., “Adaptive postfiltering for quality enhancement of coded speech”, IEEE Transactions on Speech and Audio Processing, Jan. 1, 1995, pp. 59-71, vol. 3, No. 1, DOI: 10.1109/89.365380, URL: http://ieeexplore.ieee.org/xpls/abs_all.jsp?arnumber=365380, XP055104008.

Jean-Marc Valin et al., “A High-Quality Speech and Audio Codec With Less Than 10 ms Delay”, arxiv.org, Cornell University Library, Feb. 17, 2016, DOI: 10.1109/TASL.2009.2023186, XP080684285, 201 OLIN Library Cornell University Ithaca, NY 14853.

Ajit B. Rao et al., “Pitch adaptive windows for improved excitation coding in low-rate CELP coders”, IEEE Transactions on Speech and Audio Processing, Nov. 1, 2003, pp. 648-659, vol. 11, No. 6, DOI: 10.1109/TSA.2003.815530, ISSN 1063-6676, XP011104538, IEEE Service Center, New York, NY, US.

3GPP TS 26.290 V16.0.0, “3rd Generation Partnership Project; Technical Specification Group Services and System Aspects; Audio codec processing functions; Extended Adaptive Multi-Rate—Wideband (AMR-WB+) codec; Transcoding functions (Release 16)”, Jul. 2020, Release 16.

(56) References Cited

OTHER PUBLICATIONS

Jurgen Herre et al., "Extending the MPEG-4 AAC Codec by Perceptual Noise Substitution", Audio Engineering Society Convention 104, May 16-19, 1998, pp. 1-14, Amsterdam.
Frederik Nagel et al.,"A continuous modulated single sideband bandwidth extension", 2010 IEEE International Conference on Acoustics, Speech and Signal Processing, Apr. 2010, pp. 357-360.
Christian Neukam et al., "A MDCT based harmonic spectral bandwidth extension method", 2013 IEEE International Conference on Acoustics, Speech and Signal Processing, 2013, pp. 566-570.
Sascha Disch et al.,"Intelligent Gap Filling in Perceptual Transform Coding of Audio", Convention Paper 9661, the Journal of the Audio Engineering Society 141 st Convention,, Sep. 29, 2016, Los Angeles, CA, US.
Sascha Disch et al., "Improved Psychoacoustic Model for Efficient Perceptual Audio Codecs", Convention Paper 10029, the Journal of the Audio Engineering Society 145 th Convention, Oct. 18, 2018, New York, NY, US.
Christian R. Helmrich et al., "Spectral envelope reconstruction via IGF for audio transform coding", 2015 IEEE International Conference on Acoustics, Speech and Signal Processing (ICASSP), 2015, pp. 389-393.
Marie Oger et al., "Model-based deadzone optimization for stack-run audio coding with uniform scalar quantization", 2008 IEEE International Conference on Acoustics, Speech and Signal Processing, 2008, pp. 4761-4764.
Oliver Niemeyer et al., "Detection and Extraction of Transients for Audio Coding", Audio Engineering Society Convention Paper 6811, the Journal of the AES 120 th Convention, May 20, 2006, XP040507705, New York, NY, US.
Florin Ghido et al., "Coding Of Fine Granular Audio Signals Using High Resolution Envelope Processing (HREP)", 2017 IEEE International Conference on Acoustics, Speech and Signal Processing (ICASSP), 2017, pp. 701-705.
Alexander Adami et al., "Transient-to-noise ratio restoration of coded applause-like signals", 2017 IEEE Workshop on Applications of Signal Processing to Audio and Acoustics (WASPAA), Oct. 15, 2017, pp. 349-353, New Paltz, NY, US.
Richard Füg et al., "Harmonic-percussive-residual sound separation using the structure tensor on spectrograms", 2016 IEEE International Conference on Acoustics, Speech and Signal Processing (ICASSP), 2016, pp. 445-449.
L. Daudet, B. Torresani et al., "An hybrid audio coder for very low bit rate with two-level psychoacoustic modeling", Multimedia Signal Processing, 1999 IEEE 3rd Workshop on Copenhagen, Denmark, Sep. 13-15, 1999, ISBN 978-0-7803-5610-8, pp. 203-208, XP010351724, Piscataway, NJ, US.
Volkov P.A., "Office Action for RU Application No. 2024103466", Aug. 23, 2024, Rospatent, Russia.
Volkov P.A . . . "Office Action for RU Application No. 2024103244", Mar. 6, 2024, Rospatent, Russia.
Schmidt Konstantin et al., "Low complexity tonality control in the Intelligent Gap Filling tool", 2016 IEEE International Conference on Acoustics, Speech and Signal Processing (ICASSP), IEEE, Mar. 20, 2016 (Mar. 20, 2016), pp. 644-648, XP032900680, Germany.
Luc Krembel, "Extended European Search Report for EP Application No. 25197110.7", Feb. 9, 2026, EPO, Germany.
Ghido, Florin, et al., "Coding of Fine Granular Audio Signals Using High Resolution Envelope Processing (HREP)" Proceedings of The 2017 IEEE International Conference on Acoustics, Speech and Signal Processing (ICASSP), IEEE, 2017, U.S.A.
Niemeyer, Oliver, et al., "Detection and Extraction of Transients for Audio Coding," AES 120th Convention, 2006, Paris, France.
Oliver Niemeyer et al., "Detection and extraction of transients for audio coding", Audio Engineering Society, Convention Paper 6811, pp. 1-8, May 20-23, 2006.

* cited by examiner

PROCESSOR FOR GENERATING A PREDICTION SPECTRUM BASED ON LONG-TERM PREDICTION AND/OR HARMONIC POST-FILTERING

CROSS-REFERENCES TO RELATED APPLICATIONS

This application is a continuation of copending International Application No. PCT/EP2022/069751, filed Jul. 14, 2022, which is incorporated herein by reference in its entirety, and additionally claims priority from European Application No. EP 21 185 662.0, filed Jul. 14, 2022, which is incorporated herein by reference in its entirety.

BACKGROUND OF THE INVENTION

Embodiments refer to a processor for processing an audio signal comprising an LTP buffer and/or a harmonic post-filter. Further embodiments refer to a corresponding method for processing an audio signal. Above embodiments may also be computer implemented. Therefore, another embodiment refers to a method for performing, when running on a computer, the method for processing an audio signal using the LTP buffering and/or using the harmonic post-filtering, or to a method for decoding and/or encoding including one of the processings. Another embodiment refers to an encoder. Another embodiment refers to a decoder. In general, embodiments have the aim to improve quality of harmonic signals coded in the MDCT domain.

MDCT domain codecs are well suited for coding music signals as the MDCT provides decorrelation and compaction of the harmonic components commonly produced by instruments and singing voice. However this MDCT property deteriorates if short MDCT windows are used or if harmonic components are frequency or amplitude modulated. By exhibiting significant frequency and amplitude modulations, vowels in speech signals are specially challenging for MDCT codecs.

The conventional technology already discloses some methods for long-term prediction.

The Long Term Prediction (LTP) methods use decoded samples from past frame, available at both encoder and decoder side to predict the samples in the current frame. As such they increase coding gain.

In [1] a pitch is determined and a prediction signal is constructed in an LTP using the pitch and a low-pass filtered decoded samples from past frames. The pitch may be searched in sub-frames. The LTP signal is transformed via the MDCT and subtracted from the MDCT of the input signal. The residual is coded and shaped using the transmitted masking curve. Only the low-frequency coefficients where the prediction gain is high are subtracted from the input MDCT. The LTP signal is added back to the decoded MDCT. Other similar method that work in a frequency domain using time domain signal include [2-6]. An extension for polyphonic signals is proposed in [22].

In [7] an LTP method that fully operates in time domain with the application of the MDCT on the LTP residual is proposed.

There are also LTP methods that operate in the MDCT domain without a need for the inverse MDCT in the encoder, for example [8][9][20][21].

The harmonic post-filter (HPF) methods used in conjunction with MDCT domain codecs implement time domain filtering that reduce quantization noise between harmonics and/or increases amplitudes of the harmonics. Sometime the post-filter is accompanied by a pre-filtering method that reduces amplitudes of the harmonics in expectance that the MDCT domain codec would need less bits in coding the pre-filtered signal.

$$y[n] = \sum_{i=0}^{2K} a_i x[n - l_i] l_i a_i \ln$$

[10] an adaptive FIR filter is used for speech enhancement. The parameters are defined by the pitch periods (from glottal movements measurements of an accelerometer). The parameters are fixed and defined by a windowing function (e.g rectangular, Blackman).

In [11] a bandwidth expansion and compression/reduction method called Time Domain Harmonic Scaling (TDHS) is used to implement time varying adaptive comb filter, which in fact can be seen as another way of implementing the adaptive FIR filter from [10] with specific window of adaptive length dependent on the pitch.

$$y[n] = x[n] + \sum_{p=-m}^{m} b_p y[n - d + p] b_p \ln$$

[12] a pre-/post-filter approach divides the frame into non-overlapping sub-frames, where the sub-frame borders are determined so that the net signal power is minimized. For each sub-frame pitch information is obtained. Post-filters are used, where d is the pitch estimated in a sub-frame and are prediction coefficients obtained with a closed-loop search.

$\gamma P_0 g \gamma \gamma[n]=x[n]+g_{-1}y[n-P_{-1}]g_0 y[n-P_0]g_0 g g_{-1}$ In [13] a harmonic post-filter (HPF) is run on a decoded signal divided in sub-frames of fixed length. A pitch analysis returns a correlation and a pitch per sub-frame. A gain is derived from the correlation. The HPF+ is run for each sub-frame with changing from 0 towards and changing from the gain in the previous sub-frame towards 0, where is equal to the pitch in the previous sub-frame. In [14], [15] the harmonic filter with the transfer function:

$$H(z) = \frac{1 - \alpha\beta g B(z, 0)}{1 - \beta g B(z, T_{fr}) z^{-T_{int}}}$$

has coefficients derived from a pitch lag and a gain value, which are signal adaptive. The gain value g is calculated using $$g = \frac{\sum_n x[n] y[n]}{\sum_n y[n]^2}$$

where x is the input signal and y is the predicted signal. The gain value g is then limited between 0 and 1. The post-filter parameters are constant over a frame, where the frame is defined by a codec. A discontinuity at the frame borders is removed using a cross-fader or a similar method.

Below, an analysis of the conventional technology will be given showing that drawbacks, wherein the identification of the drawbacks is part of the present invention, since the improvements given by the present invention are at least partially resulting from the inventive analysis of the drawbacks of the conventional technology.

Using long MDCT blocks improves quality when coding harmonic signals even for varying pitch, yet the LTP used in signals with varying pitch (e.g. speech) needs adaptation with varying speed to achieve high enough coding gain. Decoupling of LTP update rate and the MDCT frame is not easy to achieve in the frequency only methods [8][9] and no solution is offered so far.

With time varying characteristics of a signal, it is needed to use the newest available samples as input for the LTP and this is not possible with time domain only methods [7] in conjunction with overlapping windows for a frequency transform.

Dividing time domain signal in overlapping sub-frames or smoothing at sub-frame borders and adaptive filter length dependent on the pitch are techniques known in time-domain filtering, but were not applied in an LTP methods that are adding/subtracting a prediction in a frequency domain.

In [1][9] pitch is found per sub-frame and if the sub-frame number is high, a lot of bits could be needed for coding the pitch information.

None of the known LTP techniques does not use additional non-overlapping output of the inverse MDCT that is available if for example methods from [16] are used.

The FIR filter in [10]0 doesn't model the amplitude modulations/changes. The increase of harmonicity that it introduces is fixed and signal independent. It uses overlapping window of fixed size spanning several pitch periods (as it needs to, because of the FIR filter limitation), thus also including periods with changing pitch periods within single window. The problem of (rapid) changing pitch period is named "Overload Problem" and is addressed by "turning off" the adaptive filter or equivalently inserting zeros into the signal. This reduces the effectiveness of the filter. The method from [10] also requires voiced/unvoiced detection. The TDHS method from [11] uses adaptive window length, but the FIR filter length spans over at least 4 pitch periods thus also is unable to model rapid pitch changes. It also does not model the amplitude modulations/changes. The increase of harmonicity that it introduces is also fixed and signal independent.

In [12] the de-harmonization predictor reduces the harmonic part in the coded signal and thus limits the quality of coded harmonic components and the post-filter efficiency. All parameters of the post-filter are estimated for each sub-frame and transmitted, thus significantly increasing the bitrate. The method also does not consider smoothing at sub-frame borders.

$g_0$ In [13] the sub-frames are of constant length, not signal adaptive. The post-filter in [13] doesn't model amplitude modulations/changes, because is proportional to the correlation limited between 0 and 1.

g≤1g The LTP post-filter from [14], [15] is not adapting fast enough to signal changes because its adaptation is bound to the codec's constant framing. It also does not model well amplitude modulations/changes because of the limitation that and because appears in both numerator (feed-forward) and denominator (feed-backward).

SUMMARY

An embodiment may have a processor for processing an encoded audio signal, the encoded audio signal comprising at least an encoded pitch parameter, the processor comprising: an LTP buffer configured to receive samples derived from a frame of the encoded audio signal; an interval splitter configured to divide a time interval associated with a subsequent frame of the encoded audio signal into sub-intervals depending on the encoded pitch parameter; a calculation unit configured to derive sub-interval parameters from the encoded pitch parameter dependent on a position of the sub-intervals within the time interval associated with the subsequent frame of the encoded audio signal; a predictor configured for generating a prediction signal from the LTP buffer dependent on the sub-interval parameters; and a frequency domain transformer configured for generating a prediction spectrum based on the prediction signal.

Another embodiment may have a processor for processing an audio signal, the processor comprising: a splitter configured for splitting a time interval associated with a frame of the audio signal into a plurality of sub-intervals, each comprising a respective length, the respective length of the plurality of sub-intervals being dependent on a pitch lag value; a harmonic post-filter configured for filtering the plurality of sub-intervals, wherein the harmonic post-filter is based on a transfer function comprising a numerator and a denominator, where the numerator comprises a harmonicity value, and wherein the denominator comprises a sub-interval pitch lag value and the harmonicity value and/or a gain value; wherein the associated harmonicity value and/or the sub-interval pitch lag value and/or the gain value is different in at least two different sub-intervals of the plurality of sub-intervals; wherein the sub-interval pitch lag value, the harmonicity value and/or the gain value are obtained based on the audio signal in each sub-interval of the plurality of sub-intervals.

Another embodiment may have a processing unit comprising the processor for processing an encoded audio signal according to the invention and the processor for processing an audio signal according to the invention.

Another embodiment may have a decoder for decoding an encoded audio signal which comprises the processor for processing an encoded audio signal according to the invention and/or the processor for processing an audio signal according to the invention.

Another embodiment may have a encoder for encoding an audio signal, comprising the processor for processing an encoded audio signal according to the invention.

Another embodiment may have a method for processing an encoded audio signal, the encoded audio signal comprising at least an encoded pitch parameter, the method comprising the following steps: receiving samples derived from a frame of the encoded audio signal using an LTP buffer; dividing a time interval associated with a subsequent frame of the encoded audio signal subsequent to the frame into sub-intervals depending on the encoded pitch parameter; deriving sub-interval parameters from the encoded pitch parameter dependent on a position of the sub-intervals within the time interval associated with the subsequent frame of the encoded audio signal; generating a prediction signal from the LTP buffer dependent on the sub-interval parameters; and generating a prediction spectrum based on the prediction signal.

Another embodiment may have a method for processing an audio signal, the method comprising the following steps: splitting a time interval associated with a frame of the audio signal into a plurality of sub-intervals, each comprising a respective length, the respective lengths of at least two of the plurality of sub-intervals being dependent on a pitch lag value; filtering the plurality of sub-intervals using a harmonic post-filter, wherein the harmonic post-filter is based on a transfer function comprising a numerator and a denominator, where the numerator comprises a harmonicity value, and wherein the denominator comprises a sub-interval pitch lag value and the harmonicity value and/or a gain value; wherein the associated harmonicity value and/or the sub-interval pitch lag value and/or the gain value is different in at least two different sub-intervals of the plurality of sub-intervals; wherein the sub-interval pitch lag value, the harmonicity value and/or the gain value are obtained based on the audio signal in each sub-interval of the plurality of sub-intervals.

Another embodiment may have a non-transitory digital storage medium having a computer program stored thereon to perform the method for processing an encoded audio signal, the encoded audio signal comprising at least an encoded pitch parameter, the method comprising the following steps: receiving samples derived from a frame of the encoded audio signal using an LTP buffer; dividing a time interval associated with a subsequent frame of the encoded audio signal subsequent to the frame into sub-intervals depending on the encoded pitch parameter; deriving sub-interval parameters from the encoded pitch parameter dependent on a position of the sub-intervals within the time interval associated with the subsequent frame of the encoded audio signal; generating a prediction signal from the LTP buffer dependent on the sub-interval parameters; and generating a prediction spectrum based on the prediction signal, when said computer program is run by a computer.

Another embodiment may have a non-transitory digital storage medium having a computer program stored thereon to perform the method for processing an audio signal, the method comprising the following steps: splitting a time interval associated with a frame of the audio signal into a plurality of sub-intervals, each comprising a respective length, the respective lengths of at least two of the plurality of sub-intervals being dependent on a pitch lag value; filtering the plurality of sub-intervals using a harmonic post-filter, wherein the harmonic post-filter is based on a transfer function comprising a numerator and a denominator, where the numerator comprises a harmonicity value, and wherein the denominator comprises a sub-interval pitch lag value and the harmonicity value and/or a gain value; wherein the associated harmonicity value and/or the sub-interval pitch lag value and/or the gain value is different in at least two different sub-intervals of the plurality of sub-intervals; wherein the sub-interval pitch lag value, the harmonicity value and/or the gain value are obtained based on the audio signal in each sub-interval of the plurality of sub-intervals, when said computer program is run by a computer.

An embodiment provides a processor for processing an encoded audio signal. The encoded audio signal or encoded time domain audio signal may comprise at least an encoded pitch parameter. For the sake of completeness it should be noted that the audio signal may also have parameters defining samples of a decoded time domain (TD) audio signal. The processor comprising an LTP buffer, a time interval divider/splitter, calculation means (or unit), a predictor and a frequency domain transformer. The LTP buffer is configured to receive samples derived from a frame of the encoded audio signal, the interval divider/splitter is configured to divide a time interval associated with the subsequent frame (subsequent to the frame) of the encoded audio signal into sub-intervals depending on the encoded pitch parameter. The calculation means are configured to derive sub-interval parameters from the encoded pitch parameter dependent on a positon of the sub-intervals within the (time) interval associated with the subsequent frame of the encoded audio signal. The predictor is configured to generate a prediction signal from the LTP buffer dependent on the sub-interval parameters. The frequency domain transform is configured to generate a prediction spectrum based on the prediction signal.

Embodiments of this aspect of the invention are based on the principle that it is beneficial with respect to the quality of harmonic signal coding in the MDCT domain to split a current window into overlapping sub-intervals, wherein optionally, the lengths of the sub-intervals may be dependent of a pitch. In each sub-interval the predicted signal may be constructed using a decoded TD signal and a filter derived from the pitch contour depending on the sub-interval position. The predicted signal is windowed and transformed to the frequency domain, afterwards. This way constructed predicted signal and the LTP applied in a frequency domain, enable a smooth and fast delay-less adaption to varying signal characteristics in a non-constant rate different to a frequency domain coder frame rate. According to further embodiment the predicted spectrum may be perceptually flattened to produce derivation of the prediction spectrum. Additionally, it should be noted that the prediction spectrum or the derivation of the prediction spectrum may be combined with an error spectrum. Magnitudes away from harmonics in the predicted spectrum may be reduced to zero. Due to this the following advantage results: a predicted spectrum is further processed using pitch information to remove non-predictable parts of the predicted spectrum.

Regarding the pitch parameters it should be noted that there may be more sub-intervals than temporarily distinct encoded pitch parameters.

According to further embodiments the processor further comprises an inverse frequency domain transformer. This may be configured for generating a block aliased (TD, time domain) audio signal from a derivation of an error spectrum; additionally or alternatively, the processor further comprised means (or a unit) for generating a frame of (TD) audio signal using at least two blocks of aliased (TD) audio signal, wherein at least some portions of the aliased (TD) audio signal are different from the (TD) audio signal and the received samples, respectively. Note a prediction spectrum is obtained from the frame of the encoded audio signal and/or the error spectrum is obtained from a frame of the encoded audio signal subsequent to the frame and the derivation of the error spectrum is derived from the error spectrum.

Note, a frame of a signal has typically a time interval associated with it. For example: the encoded audio signal is divided into frames. A block of the aliased audio signal may be obtained from the frame of the encoded audio signal. A frame of the output time domain audio signal may be obtained from at least two (consecutive and overlapping) blocks of the aliased audio.

According to further embodiments the processor may comprise a combiner configured to combine at least a portion of a derivation of the prediction spectrum with an error spectrum to generate a combined spectrum. Here, the derivation of the error spectrum may, for example, be derived from the combined spectrum.

According to embodiments, in each sub-interval the predicted signal may be constructed using the LTP buffer and/or using a decoded (TD) audio signal out of the LTP buffer and a filter whose parameters are derived from a pitch contour and the sub-interval positon within the frame.

According to further embodiments a number of predictable harmonics is determined based on the pitch contour or based on a corrected pitch contour. Note the corrected pitch contour is derived from a modified pitch parameters (see below).

According to further embodiments, there are more distinct sub-interval parameters than temporarily distinct encoded pitch parameters.

According to another embodiment the processor further comprises means (or a unit) for smoothing the plurality of sub-intervals across/at sub-interval borders (borders of the sub-intervals). The smoothing may be done, e.g. by cross-fading or a cascade of time varying filters (e.g. cascaded filers in [19]).

According to further embodiments the processor comprises means (or a unit) for modifying the predicted spectrum (or of the a derivative of the predicted spectrum) depended on a parameter derived from the encoded pitch parameter. This has the purpose to generate a modified predicted spectrum.

According to further embodiments, the processor further comprises means (or a unit) for deriving a modified pitch parameter from the encoded pitch parameter dependent on a content of the LTP buffer. For example, the predicted spectrum may be generated dependent on the modified pitch parameter.

According to further embodiments the processor further comprising means (or a unit) for putting all samples from the block of aliased (TD) audio signal being not different from the (TD) audio signal into the LTP buffer. This procedure is according to embodiments especially then performed, when samples of one block of aliased (TD) audio signal are used for producing two distinct frames of the (TD) audio signal.

Another embodiment according to another aspects provides a processor for processing an encoded audio signal. The processor comprises means (or a unit) for splitting a frame as well as a harmonic post-filter. The means for splitting the frame are configured to split the frame of the audio signal into a plurality of (overlapping) sub-intervals, each having respective lengths and the respective lengths of the plurality of (overlapping) sub-intervals or at least two sub-intervals is dependent on a pitch lag value. Respective length means, that the length of different sub-intervals may be different, i.e. each sub-interval has a length just defined for the subinterval of all itself. The harmonic post-filter is configured for filtering the plurality of overlapping sub-intervals, wherein the harmonic post-filter is based on a transfer function comprising a numerator and a denominator. Here, the numerator comprise a harmonic value, wherein the denominator comprises the harmonic value and a gain value and/or pitch value.

Note, a frame of a signal has typically a time interval associated with it. For example: the encoded audio signal is divided into frames. A block of the aliased audio signal may be obtained from the frame of the encoded audio signal. A frame of the output time domain audio signal may be obtained from at least two (consecutive overlapping) blocks of the aliased audio.

Embodiments of this second aspect are based on the finding that it is beneficial, if a changing pitch, a changing harmonicity or an amplitude modulation is detected, so that the current output frame is split into overlapping sub-intervals of lengths dependent of a pitch, where this pitch is obtained from the coded pitch parameters are found on the detected time domain signal. In each sub-interval the decoded (TD) signal may be filtered using the adaptive parameters found in each sub-interval. The decoded signal contains enough information for a detection of a varying signal characteristic for the harmonic post-filter (HPF) were the harmonic post-filter can model pitch and amplitude changes. Here, the update rate of the harmonic post-filter parameters is independent of the frequency domain coder frame rate.

According to further embodiments, the harmonicity value is proportional to a desired intensity of the filter and/or independent of amplitude changes in an audio signal.

According to embodiments the gain value is dependent on the amplitude change in the audio signal.

According to further embodiments, the harmonic value, the gain value and the pitch lag value are derived using an output of the harmonic post-filter, i.e., representing the result of a previous sub-interval/previous sub-intervals.

According to further embodiments, the harmonic post-filter is different in the different sub-interval in the pluralities of the sub-intervals.

According to further embodiments the processor comprises means (or a unit) for smoothing the plurality of sub-intervals across/at sub-interval border (borders of the sub-intervals).

It should be noted, that according embodiments there are at least two sub-intervals within the frame. It should further be noted that the respective lengths of each sub-interval is dependent on an average pitch. For example, the average pitch is obtained from an encoded pitch parameter.

According to embodiments, the encoded pitch parameter may have higher time resolution than a codec framing. Further, the encoded pitch parameter having lower time resolution than the pitch contour.

According to further embodiments the processor comprises a domain converter for converting on a frame basis a first domain representation of the audio signal into a second domain representation of the audio signal. For example the domain converter provides for the harmonic post-filtering (HPF)) a signal in the time domain.

According to further embodiments the domain converter is configured for converting the domain representation of the audio signal into a frequency domain representation of the audio signal.

According to further embodiments, the processing unit belonging to the first aspect may be combined to the processing unit of the second aspect. Expressed in other words this means that both approaches (the new LTP approach and the harmonic post-filtering (HPF)) may be combined and advantageously used with an MDCT codec. Compared to the conventional technology, the new method aim are better modelling of the frequency and amplitude modulations with minimum or no side information needed.

Another embodiment provides a decoder for decoding an encoded audio signal which comprises the processor according to aspect 1 and/or the processor according to aspect two.

According to embodiments the decoder further comprises a frequency domain decoder or a decoder based on a MDCT codec. Note, the frequency domain encoder and decoder operate advantageously in a frequency domain in frames with overlapping windows.

Another embodiment provides an encoder for encoding an audio signal comprising a processor according to aspect one.

Further embodiments provide a method for processing an encoded audio signal. The method comprises the steps:

- receiving samples derived from a frame of the encoded audio signal using an LTP buffer;
- dividing a time interval associated with the subsequent frame of the encoded audio signal into sub-intervals depending on the encoded pitch parameter;
- deriving sub-interval parameters from the encoded pitch parameter dependent on a position of the sub-intervals within the time interval associated with the subsequent frame of the encoded audio signal;

generating a prediction signal from the LTP buffer dependent on the sub-interval parameters; and generating a prediction spectrum based on the prediction signal.

Another embodiment provides a method for processing an audio signal comprising the following steps:

splitting a frame of the audio signal into a plurality of overlapping sub-intervals, each having a respective length, the respective lengths of the plurality of overlapping sub-intervals being dependent on a pitch lag value;

filtering the plurality of overlapping sub-intervals using a harmonic post-filter, wherein the harmonic post-filter is based on a transfer function comprising a numerator and a denominator, where the numerator comprises a harmonic value, and wherein the denominator comprises the pitch lag value and the harmonic value and/or a gain value.

Further embodiments provide a computer program for performing when running a computer the above method.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
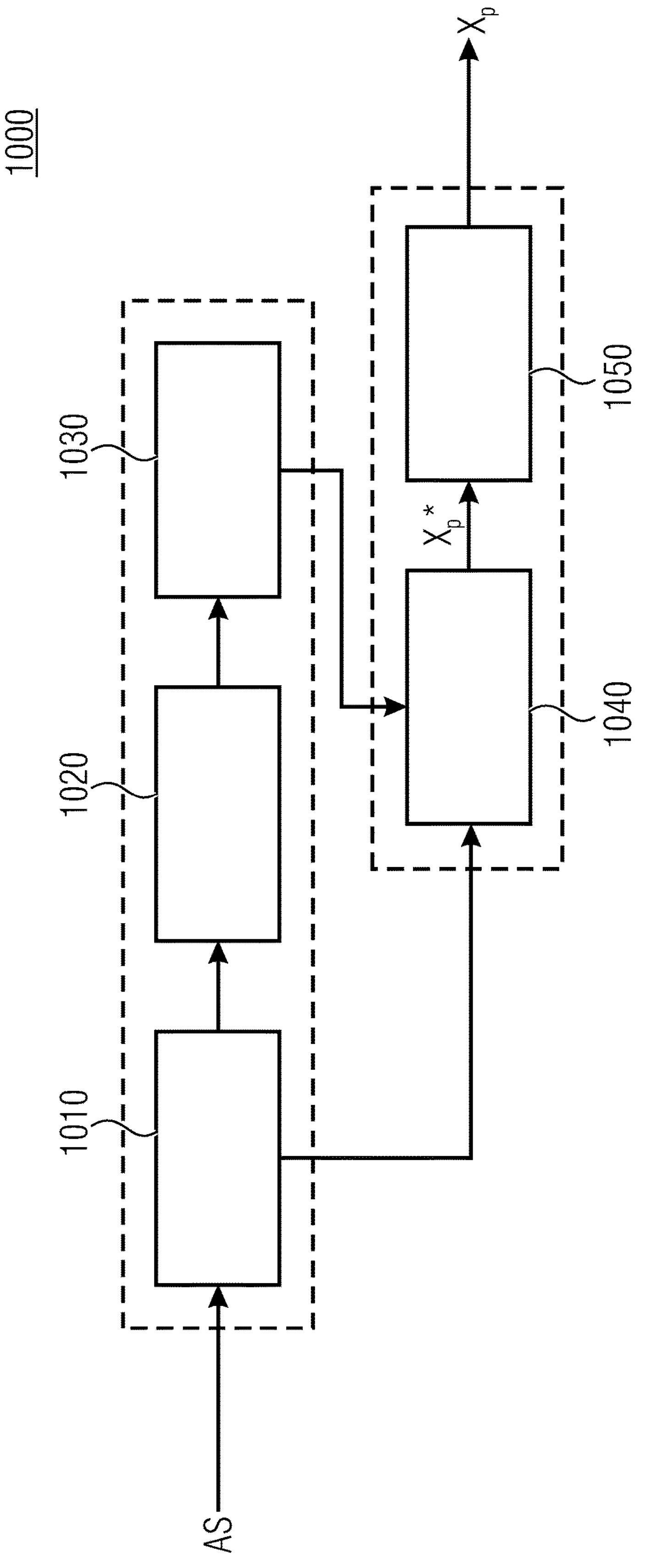
FIG. 1*a* shows schematic representation of a basic implementation of an processor using LTP buffering according to an embodiment of a first aspect.

Below, embodiments of the present invention will subsequently be discussed referring to the enclosed figures, wherein identical reference numerals are provided to objects having identical or similar functions, so that the description thereof is mutually applicable and interchangeable.

FIG. 1*a* shows a processor 1000, which can be part of an encoder for encoding and/or a decoder for decoding an encoded audio signal. The processor 100 comprises in its basic implementation an LTP buffer 1010, an interval divider/interval splitter 1020, a calculator 1030 as well as the elements of a conventional encoder/decoder, namely a predictor 1040 and a frequency domain transformer 1050.

The audio signal may be an encoded audio signal comprising at least an encoded pitch parameter and optionally one or more parameters defining samples of a decoded time domain (TD) audio signal. Note the encoded audio signal may consist of "pitch contour", "spect", "zfl", "tns", "sns" and "coded pulses" (cf. FIG. 2*a*). For example, the audio signal may be preprocessed by an inverse frequency domain transformer for generating a block of aliased TD audio signal from a derivative of an error spectrum, wherein a frame of the TD audio signal is generated using at least two blocks of aliased TD audio signal, so that at least some portions of the aliased TD audio signal are different from the TD audio signal.

From another point of view, this means that the audio signal is processed in a frequency domain. Note a derivative of the error spectrum is for example $X_C$ (FIG. 2*a*), since $X_C$ is derived from the combined spectrum ($X_{DT}$) which is derived (via the combiner) from the error spectrum ($X_D$).

This audio signal is received by the buffer 1010 and then processed by the processing path consisting out of the elements 1010, 1020 and 1030. The buffer 1010 buffers/receives the samples from the frame of the TD audio signal. As a possible implementation, the output of the frequency domain decoder may be used as LTP buffer, including complete non-overlapping part of the decoded signal.

In the next entity 1020, the time interval of the current frame window length is split into overlapping sub-intervals (interval for which the prediction signal will be generated). Here, the lengths of each sub-interval is dependent on the pitch, e.g., dependent of an average pitch. Since the audio signal comprises a coded pitch parameters, it is possible that the pitch or a pitch information is obtained from the coded pitch parameter. According to embodiments, the pitch is determined using a pitch contour. The pitch contour is obtained from coded pitch parameters using, for example, an interpolation. For example, the coded pitch parameter may have higher time resolution than the coded framing and/or may have a lower time resolution than the pitch contour itself. It should be noted that according to embodiments, there may be more sub-intervals than temporary distinct encoded pitch parameters. The next entity 1030 receives the divided time interval associated with the frame of the encoded audio signal, i.e., the sub-intervals and is configured to derive sub-interval parameters from the encoded pitch parameter dependent on a position of the sub-interval within the prediction signal. This calculation is performed by the entity 1030. It should be noted that at least in some cases, there are more distinct sub-interval parameters than temporary distinct encoded pitch parameters. Due to the processing of the prediction signal/predicted spectrum using the pitch information, it is possible to review non-predictable parts. After this processing, the construction of the predicted signal is performed. The entity 1040 is configured to construct the predicted signal XP* in each sub-interval, e.g., using a filter whose parameters are derived from the encoded pitch parameter/the pitch contour (note the pitch contour is derived from the encoded pitch parameters, so it could also be stated that the parameters are derived from the encoded pitch parameters) and the sub-interval position within the window/within the time interval associated with the frame of the encoded audio signal. Therefore, the predictor 1040 constructs/generates the prediction signal is XP* dependent on the sub-interval parameters output by the entity 1030. Subsequent to the entity 1040 a frequency domain transformer 1050 may be arranged/configured to generate a prediction spectrum $X_P$ based on the prediction signal XP*. Here, the predicted signal XP* is windowed and transformed to the frequency domain. According to embodiments, the predicted spectrum may be optionally perceptually flattened to produce a flattened predicted spectrum. Due to the per sub-interval construction and the application of the LTP in the frequency domain it is possible to smoothly, fast and without an additional delay adapt the LTP to varying signal characteristics in a non-constant rate different to a frequency domain coder frame rate.

Magnitudes away from harmonics in the (flattened) predicted spectrum are reduced to a zero, where the location of the harmonics is derived from the corrected pitch contour.

A number of predictable harmonics is determined in the encoder based on the corrected pitch contour, the (flattened) predicted spectrum and a spectrum derived from the input signal According to embodiments, a part of the flattened predicted spectrum, corresponding to number of predictable harmonics, is subtracted in frequency domain in the encoder. According to further embodiments this part is added in the frequency domain in the decoder and/or in the encoder.

Figure 2A:
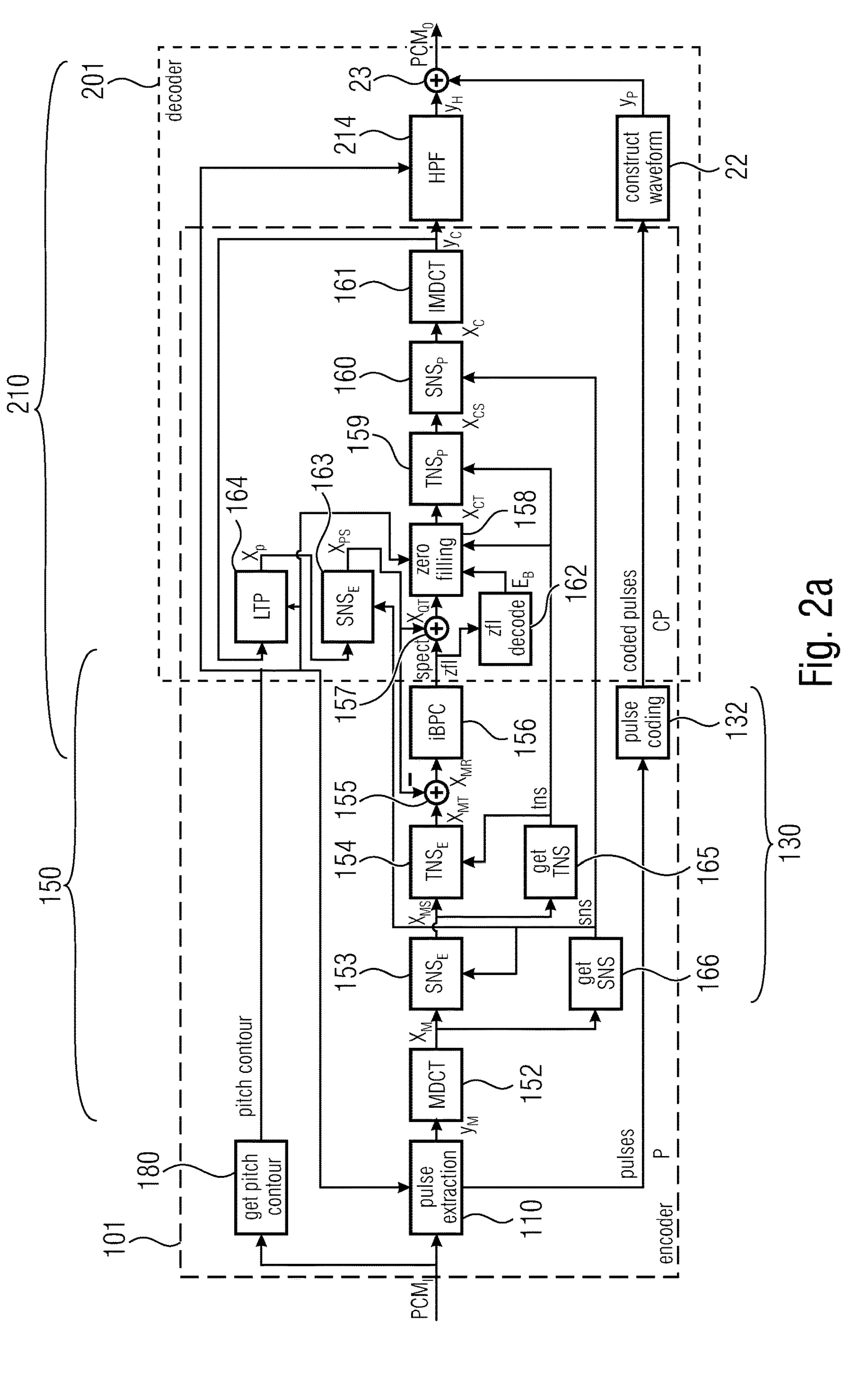
FIG. 2*a* shows a schematic block diagram illustrating an encoder according to an embodiment and a decoder according to another embodiment.

It should be noted that this LTP approach may be part of an encoder or decoder as will be discussed with respect to FIG. 2*a*. In FIG. 2*a*, the LTP buffer is a part of the LTP element 164.

With respect to FIG. 1*b*, another embodiment also using dividing/splitting the audio signal $y_C$ into overlapping sub-intervals dependent on a pitch information will be discussed.

Figure 1B:
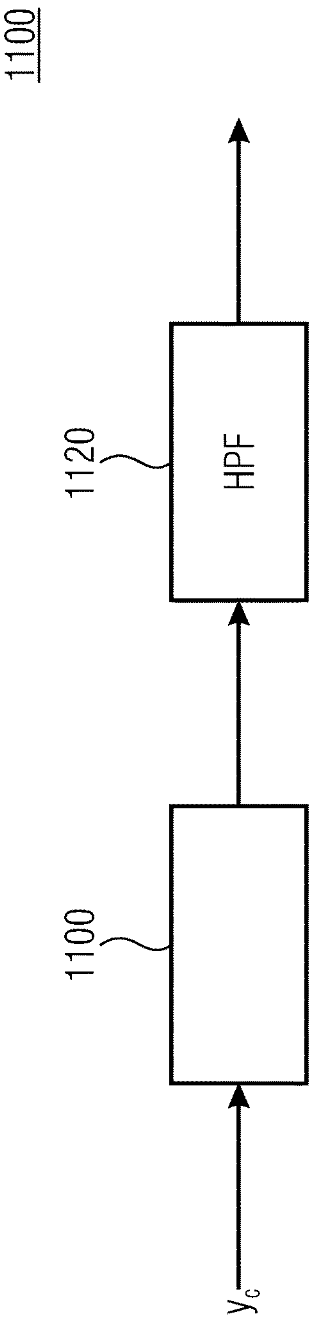
FIG. 1*b* shows schematic representation of a basic implementation of an processor using harmonic post-filtering according to an embodiment of a second aspect.

FIG. 1*b* shows a harmonic post filter unit 1100 (HPF) comprising the harmonic post filter 1120 following means for dividing the audio signal $y_C$. The means for dividing are marked by the reference numeral 1110. The divider 1110 is configured for dividing/splitting a frame of the audio signal into a plurality of overlapping sub-intervals, each having respective lengths. For example, the respective lengths of two or all of the plurality of sub-intervals or overlapping sub-intervals is dependent on a pitch lag value. Note, at least in some cases, there are at least two sub-intervals in a frame.

The harmonic post filter 1120 is configured for filtering the plurality of (overlapping) sub-intervals. The filter 1120 uses a filter function based on a transfer function comprising a numerator and a denominator. The numerator comprises a harmonicity value, while the denominator comprises the harmonicity value, gain value and pitch lag value. For example, this transfer function may be defined by use of a numerator comprising a harmonic value, and a denominator comprising the harmonic value, gain value and pitch lag value.

The filter can for example be described based the following transfer function:

$$H(z) = \frac{1 - \alpha\beta hB(z, 0)}{1 - \beta hgB(z, T_{fr})z^{-T_{int}}}$$

where the signal adaptive parameters T_int, T_fr, h, g are found in each sub-interval based on the decoded time domain signal and the already available previous sub-intervals of the output signal.

According to further embodiments, the audio signal is received from a domain converter for converting on a frame basis a first domain representation of the audio signal into a second domain, advantageously a time domain representation of the audio signal.

According to embodiments, the harmonicity value is proportional to the desired intensity of the filter. Further, it can be independent of the amplitude changes in the audio signal, wherein the gain value may be dependent on the amplitude changes. The result is that at least in some cases, the harmonic post-filter is different in at least two sub-intervals. This also means that, if for one frame this condition is given, for some other frame(s) the harmonic post-filter may be the same in all sub-intervals or if in some cases there is only one sub-interval being equal to the time interval associated with the whole frame. Note, the filter may have a kind of feedback loop, so that the harmonicity value, the gain value and the pitch lag value may be derived using already available output of the harmonic filter in past sub-intervals and the second domain representation of the audio signal (e.g. second domain representation is a time domain). According to further embodiments, there may be at least two sub-intervals within the frame. Here, there may be some other frames where there is only one sub-interval being equal to the time interval associated with the whole frame.

According to embodiments, if a changing pitch, a changing harmonicity or an amplitude modulation is detected, the time interval of the current output frame length is split into overlapping sub-intervals of length dependent of a pitch, where the pitch is obtained from the coded pitch parameters or found on the decoded time domain signal. According to embodiments the harmonic post-filer 1100 is configured to model pitch and/or amplitude changes. According to embodiments, the update rate of the HPF parameters may be independent of the frequency domain coder frame rate.

As will be shown with respect to FIG. 2*a*, the HPF entity 1100 (cf. FIG. 1*b*) is mainly used for the decoder side. The HPF entity 1100, here marked as 214 is arranged at the end of a process path comprising the spectral coder 156. All features discussed in context of the HPF entity 1100 may also be applied to the HPF entity 214.

Figure 2B:
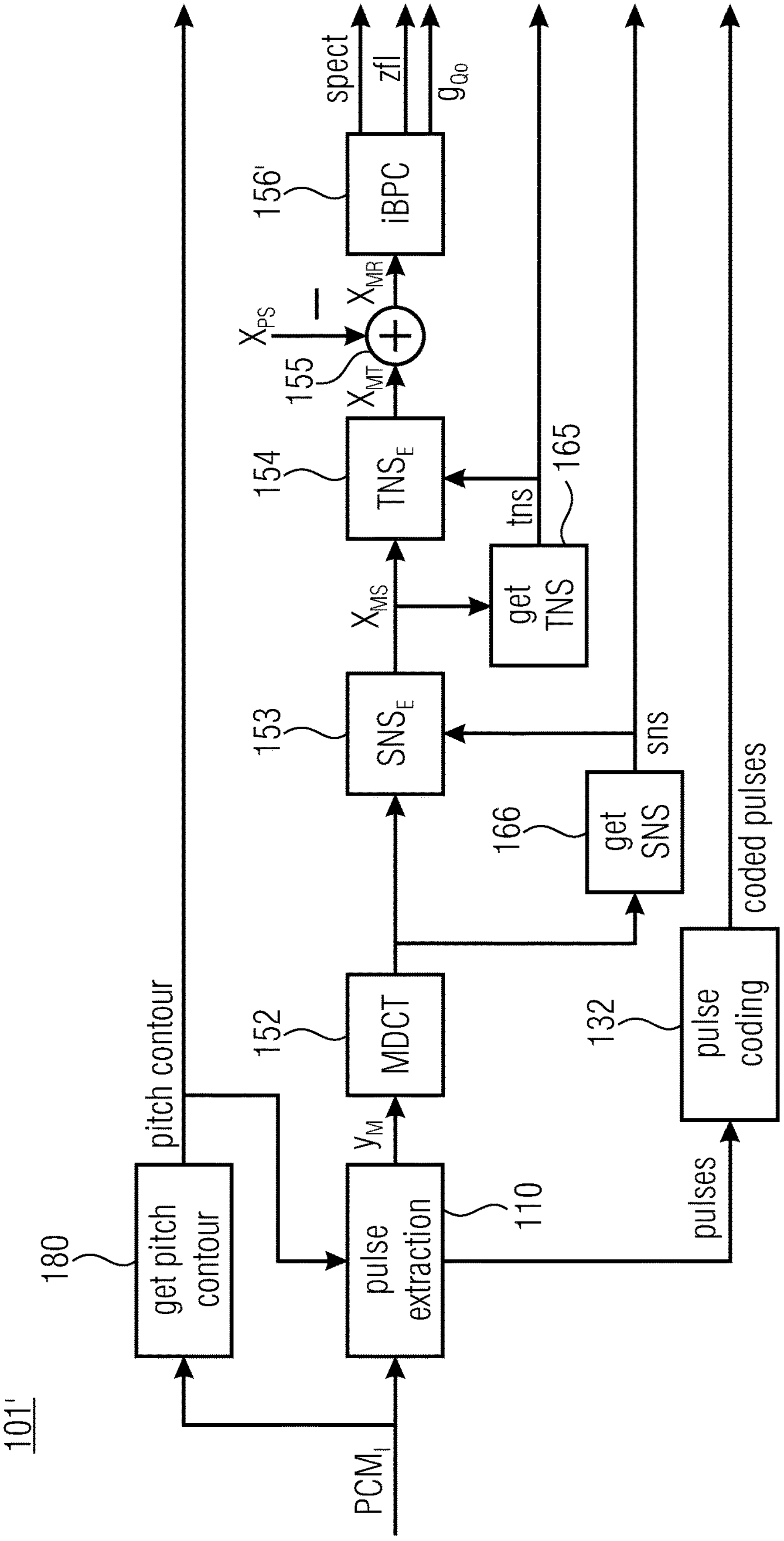
FIG. 2*b* shows a schematic block diagram illustrating an encoder according to an embodiment.
Figure 2C:
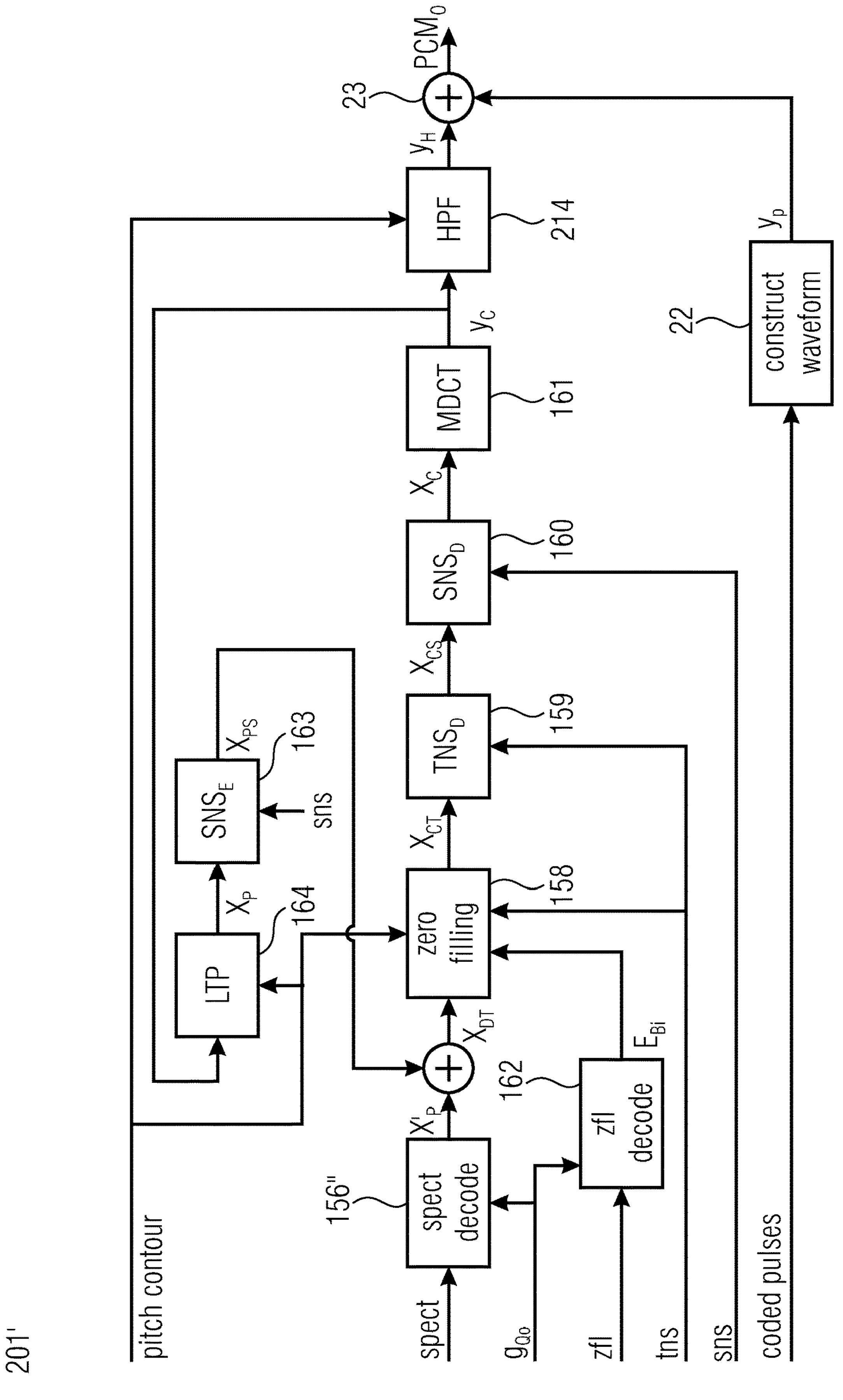
FIG. 2*c* shows a schematic block diagram illustrating an decoder according to an embodiment.

The LTP buffer included by the processor 1000 may be used for the encoder 101 as well as for the decoder 201 which are discussed with respect to FIGS. 2*a*, 2*b* and 2*c*.

Here, the entity 164 may comprise the processor 1000 comprising the LTP buffer 1010 as discussed in context of FIG. 1*a*. All features discussed in contacts of the processor 1000 may also be applied to the LTP entity 164.

The complete interaction of the entities 164 (LTP) and 214 (HPF) will be discussed with respect to FIG. 2*a*, wherein here optional elements will be mentioned.

FIG. 2*a* shows an encoder 101 in combination with decoder 201.

The main entities of the encoder 101 are marked by the reference numerals 110, 130, 151. The entity 110 performs the pulse extraction, wherein the pulses p are encoded using the entity 132 for pulse coding.

The signal encoder 150 is implemented by a plurality of entities 152, 153, 154, 155, 156, 157, 158, 159, 160 and 161. These entities 152-161 form the main path of the encoder 150, wherein in parallel, additional entities 162, 163, 164, 165 and 166 may be arranged. The entity 162 (zfl decoder) connects informatively the entities 156 (iBPC) with the entity 158 (Zero filling). The entity 165 (get TNS) connects informatively the entity 153 ($SNS_E$) with the entity 154, 158 and 159. The entity 166 (get SNS) connects informatively the entity 152 with the entities 153, 163 and 160. The entity 158 performs zero filling an can comprise a combiner 158*c* which will be discussed in context of FIG. 4. Note there could be an implementation where the entities 159 and 160 do not exist—for example a system with an LP analysis filtering of the MDCT input and an LP synthesis filtering of the IMDCT output. Thus, these entities 159 and 160 are optional.

The entities 163 and 164 (LTP buffer, e.g. as described above referring to the unit 1010) receive the pitch contour from the entity 180 and the time domain audio signal $y_C$ so as to generate the predicted spectrum $X_P$ and/or the perceptually flattened prediction $X_{PS}$. The functionality and the interaction of the different entities will be described below.

Before discussing the functionality of the encoder 101 and especially of the encoder 150 a short description of the decoder 201 is given. The decoder 210 may comprise the entities 157, 162, 163, 164, 158, 159, 160, 161 as well as decoder specific entities 214 (HPF), 23 (signal combiner) and 22 (for constructing the waveform representing coded pulses). Furthermore, the decoder 201 comprises the signal decoder 210, wherein the entities 158, 159, 160, 161, 162, 163 and 164 form together with the entity 214 the signal decoder 210. The entity 1100 may be used as HPF 214. Furthermore, the decoder 201 comprises the signal combiner 23. Note: According to embodiments the entity 156 is just partially used by the decoder. Thus, the reference number 201 does not include the entity 156, while the decoding path 210 includes same. The partial usage of 156 by the decoder 210 is illustrated by FIG. 2*c* comprising a slightly adapted entity 156" for the decoding.

The pulse extraction 110 obtains an STFT of the input audio signal $PCM_I$, and uses a non-linear magnitude spectrogram and a phase spectrogram of the STFT to find and extract pulses, each pulse having a waveform with high-pass characteristics. Pulse residual signal $y_M$ is obtained by removing pulses from the input audio signal. The pulses are coded by the Pulse coding 132 and the coded pulses CP are transmitted to the decoder 201.

$y_M X_M L_M X_M SNS_E X_{MS} TNS_E X_{MT} \phi_H X_M X_{MS} X_{MT} LTPX_P$ $X_{PS} X_{MT} LTPX_{MR}$ The pulse residual signal is windowed and transformed via the MDCT 152 to produce of length. The windows are chosen among 3 windows as in [17]. The longest window is 30 milliseconds long with 10 milliseconds overlap in the example below, but any other window and overlap length may be used. The spectral envelope of is perceptually flattened via 153 obtaining. Optionally Temporal Noise Shaping 154 is applied to flatten the temporal envelope, in at least a part of the spectrum, producing. At least one tonality flag in a part of a spectrum (in or or) may be estimated and transmitted to the decoder 201/210. Optionally Long Term Prediction 164 that follows the pitch contour 180 is used for constructing a predicted spectrum from a past decoded samples and the perceptually flattened prediction is subtracted in the MDCT domain from, producing an residual. An average harmonicity is calculated for each frame. A pitch contour is obtained in the block Get pich contour 180 for frames with high average harmonicity and transmitted to the decoder 201. The pitch contour and a harmonicity is used to steer many parts of the codec. Alternatively, the pitch contour may be derived from the encoded pitch parameters, so it could also be stated that the parameters are derived from the encoded pitch parameters.

FIG. 2*b* shows an excerpt of FIG. 2*a* with focus on the encoder 101' comprising the entities 180, 110, 152, 153, 153, 155, 156, 165, 166 and 132. Note 156 in FIG. 2*a* is a kind of a combination of 156' in FIGS. 2*b* and 156" in FIG. 2*c*. Note the entity 163 (in FIG. 2*a*, 2*c*) can be the same or comparable as 153 and is the inverse of 160.

According to embodiments, the encoder splits the input signal into frames and outputs for example for each frame one or more of the following parameters:

- pitch contour
- MDCT window choice, 2 bits
- LTP parameters
- coded pulses
- sns, that is coded information for the spectral shaping via the SNS
- tns, that is coded information for the temporal shaping via the TNS
- global gain $g_{Qo}$, that is the global quantization step size for the MDCT codec
- spect, consisting of the entropy coded quantized MDCT spectrum
- zfl, consisting of the parametrically coded zero portions of the quantized MDCT spectrum $X_{PS}$ is an output of the 163 or 164 which also may be required in the encoder, but is shown only in the decoder.

FIG. 2*c* shows excerpt of FIG. 2*a* with focus on the decoder 201' comprising the entities 156", 162, 163, 164, 158, 159, 160, 161, 214, 23 and 2 which have been discussed in context of FIG. 2*a*. Regarding the LTP 164. Basically, because of the LTP, a part of the decoder (except 214, 230, 222 and their outputs) may also be used/required in the encoder (as shown in FIG. 2*a*) and is called the internal decoder. In implementations without the LTP, the internal decoder is not needed in the encoder.

Excurse for the MDCT coder: The output of the MDCT is $X_M$ of length $L_M$. For an example at the input sampling rate of 48 kHz and for the example frame length of 20 milliseconds, $L_M$ is equal to 960. The codec may operate at other sampling rates and/or at other frame lengths. All other spectra derived from $X_M$:$X_{MS}$, $X_{MT}$, $X_{MR}$, $X_Q$, $X_D$, $X_{DT}$, $X_{CT}$, $X_{CS}$, $X_C$, $X_P$, $X_{PS}$, $X_N$, $X_{NP}$, $X_S$ are also of the same length $L_M$, though in some cases only a part of the spectrum may be needed and used. A spectrum consists of spectral coefficients, also known as spectral bins or frequency bins. In the case of an MDCT spectrum, the spectral coefficients may have positive and negative values. We can say that each spectral coefficient covers a bandwidth. In the case of 48 kHz sampling rate and the 20 milliseconds frame length, a spectral coefficient covers the bandwidth of 25 Hz. The spectral coefficients may be indexed from 0 to $L_M-1$.

$SNS_E SNS_D N_{SB}=64 N_{SB}-1 N_{SB}=64$ The SNS scale factors, used in and, may be obtained from energies in frequency sub-bands (sometimes also referred to as bands) having increasing bandwidths, where the energies are obtained from a spectrum divided in the frequency sub-bands. For an example, the sub-bands borders, expressed in Hz, may be set to 0, 50, 100, 150, 200, 250, 300, 350, 400, 450, 500, 550, 600, 700, 800, 900, 1000, 1100, 1200, 1300, 1400, 1500, 1600, 1700, 1800, 1900, 2050, 2200, 2350, 2500, 2650, 2800, 2950, 3100, 3300, 3500, 3700, 3900, 4100, 4350, 4600, 4850, 5100, 5400, 5700, 6000, 6300, 6650, 7000, 7350, 7750, 8150, 8600, 9100, 9650, 10250, 10850, 11500, 12150, 12800,13450, 14150, 15000, 16000, 24000. The sub-bands may be indexed from 0 to. In this example the $0^{th}$ sub-band (from 0 to 50 Hz) contains 2 spectral coefficients, the same as the sub-bands 1 to 11, the sub-band 62 contains 40 spectral coefficients and the sub-band 63 contains 320 coefficients. The energies in frequency sub-bands may be downsampled to 16 values which are coded, the coded values being denoted as "sns". The 16 decoded values obtained from "sns" are interpolated into SNS scale factors, where may for example be 32, 64 or 128 scale factors. For more details on obtaining the SNS, the reader is referred to [22-26].

In iBPC, "zfl decode" and/or "Zero Filling" blocks, the spectra may be divided into sub-bands $B_i$ of varying length $L_{B_i}$, the sub-band i starting at $j_{B_i}$. The same 64 sub-band borders may be used as used for the energies for obtaining the SNS scale factors, but also any other number of sub-bands and any other sub-band borders may be used—independent of the SNS. To stress it out, the same principle of sub-band division as in the SNS may be used, but the sub-band division in iBPC, "zfl decode" and/or "Zero Filling" blocks is independent from the SNS and from $SNS_E$ and $SNS_D$ blocks. With the above sub-band division example, $j_{B_0}=0$ and $L_{B_0}=2$, $j_{B_1}=0$ and $L_{B_1}=2$, . . . , $j_{B_{63}}=640$ and $L_{B_{63}}=320$.

Note in yet another embodiment, sub-bands (that is sub-band borders) for the iBPC, "zfl decode" and "Zero Filling" could be derived from the positions of the zero spectral coefficients in $X_D$ and $X_Q$.

The encoding of the $X_{MR}$ (residual from the LTP) output by the entity 155 is done in the integral band-wise parameter coder (iBPC) as will be discussed with respect to FIG. 3.

Figure 3:
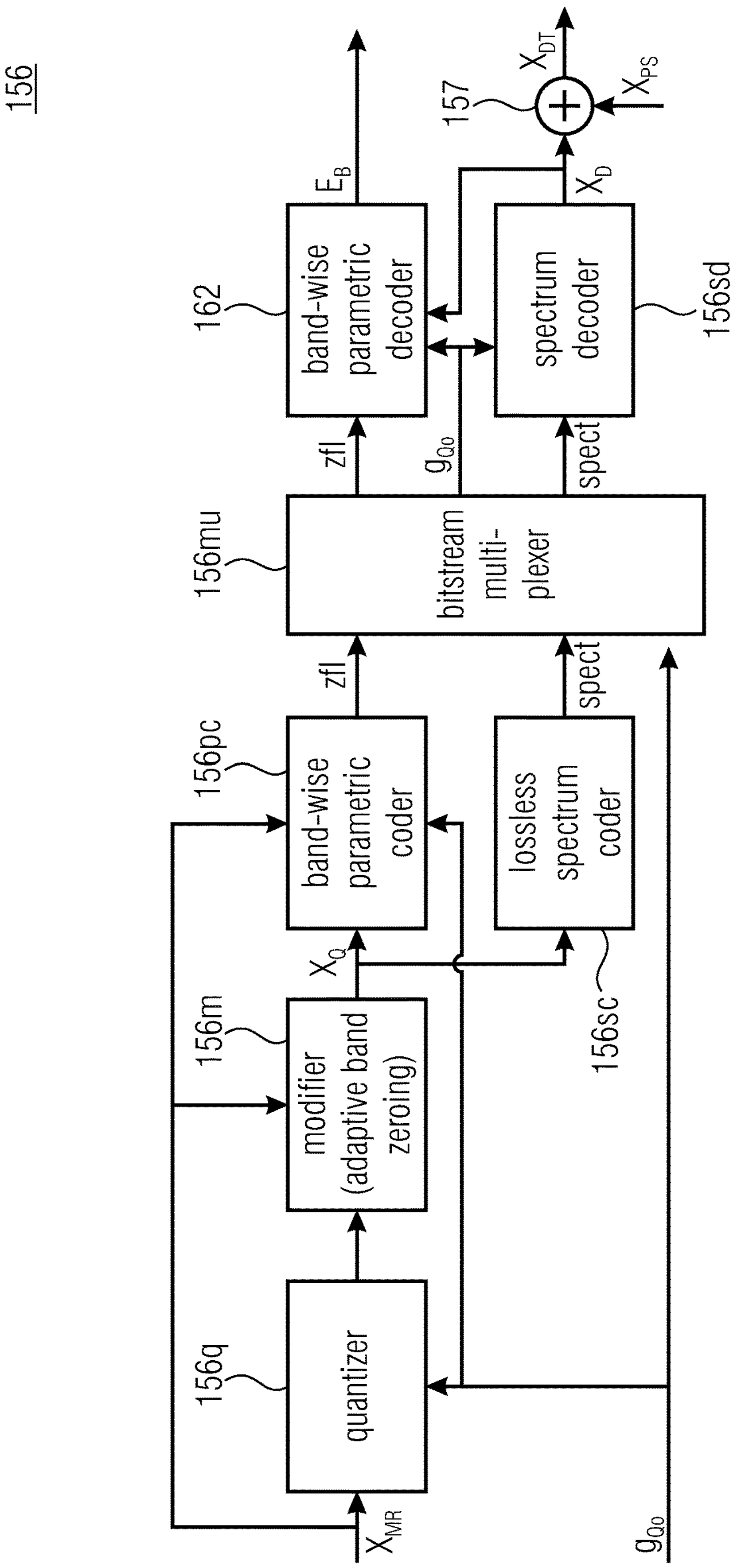
FIG. 3 shows a schematic block diagram of a signal encoder for the residual signal according to embodiments.

FIG. 3 shows that the entity iBPC 156 which may have the sub-entities 156*q*, 156*m*, 156*pc*, 156*sc* and 156*mu*. Note FIG. 1*a* shows a part of FIG. 3: Here, 1030 is comparable to 156*a*, 1010 is comparable to 156*pc*, 1020 is comparable to 156*sc*.

At the output of the bit-stream multiplexer 156*mu* the band-wise parametric decoder 162 is arranged together with the spectrum decoder 156*sc*. The entity 162 receives the signal zfl, the entity 156*sc* the signal spect, where both receive the global gain/step size $g_{Qa}$. Note the parametric decoder 162 uses the output $X_D$ of the spectrum decoder 156*sc* for decoding zfl. It may alternatively use another signal output from the decoder 156*sc*. Background there of is that the spectrum decoder 156*sc* may comprise two parts, namely a spectrum decoder and a dequantizer. For example, the output of the quantizer may be used as input for the parametric decoder 162.

$X_{MR}$ is quantized and coded including a quantization and coding of an energy for zero values in (a part of) the quantized spectrum $X_Q$, where $X_Q$ is a quantized version of $X_{MR}$. The quantization and coding of $X_{MR}$ is done in the Integral Band-wise Parametric Coder iBPC 156. As one of the parts of the iBPC, the quantization (quantizer 156*q*) together with the adaptive band zeroing 156*m* produces, based on the optimal quantization step size $g_{Qo}$, the quantized spectrum $X_Q$. The iBPC 156 produces coded information consisting of spect 156*sc* (that represent $X_Q$) and zfl 162 (that represent the energy for zero values in a part of $X_Q$).

Figure 4:
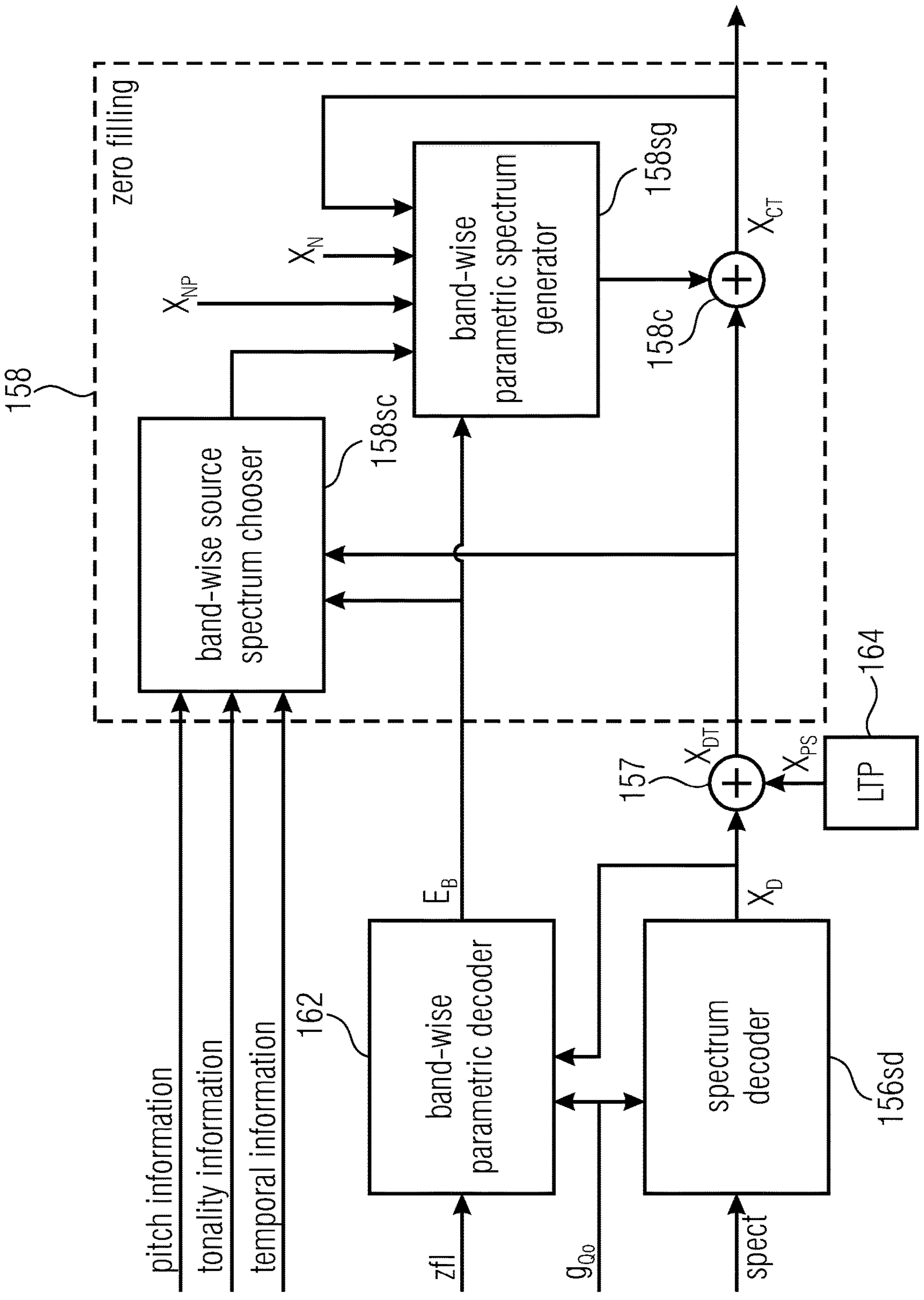
FIG. 4 shows a schematic block diagram of a decoder comprising the principle of zero filling according to further embodiments.

The zero-filling entity 158 arranged at the output of the entity 157 is illustrated by FIG. 4.

FIG. 4 shows a zero-filling entity 158 receiving the signal $E_B$ from the entity 162 and combined spectrum $X_{DT}$ from the entity 156*sd* optionally via the element 157. The zero-filling entity 158 may comprise the two sub-entities 158*sc* and 158*sg* as well as a combiner 158*c*.

The spect is decoded to obtain a decoded spectrum $X_D$ (decoded LTP residual, error spectrum) equivalent to the quantized version of $X_{MR}$ being $X_Q$. $E_B$ are obtained from zfl taking into account the location of zero values in $X_D$ (error spectrum). $E_B$ may be a smoothed version of the energy for zero values in $X_Q$. $E_B$ may have a different resolution than zfl, advantageously higher resolution coming from the smoothing. After obtaining $E_B$ (cf. 162), the perceptually flattened prediction $X_{PS}$ is optionally added to the decoded $X_D$, producing $X_{DT}$. A zero filling $X_S$ is obtained and combined with $X_{DT}$ (for example using addition 158*c*) in "Zero Filling", where the zero filling $X_G$ consists of a band-wise zero filling $$X_{S_{B_i}}$$

that is iteratively obtained from a source spectrum $X_S$ consisting of a band-wise source spectrum $$X_{G_{B_i}}$$

(cf. 156*sc*) weighted based on $E_B$. $X_{CT}$ is a band-wise combination of the zero filling $X_G$ and the spectrum $X_{DT}$ (158*c*). $X_S$ is band-wise constructed (158*sg* outputting $X_G$) and $X_{CT}$ is band-wise obtained starting from the lowest sub-band. For each sub-band the source spectrum is chosen (cf. 158*sc*), for example depending on the sub-band position, the tonality flag (toi), a power spectrum (pii) estimated from $X_{DT}$, $E_B$, pitch information and temporal information (tei). Note power spectrum estimated from $X_{DT}$ may be derived from $X_{DT}$ or $X_D$ Alternatively a choice of the source spectrum may be obtained from the bit-stream. The lowest sub-bands $$X_{S_{B_i}}$$

in $X_S$ up to a starting frequency $f_{ZFStart}$ may be set to 0, meaning that in the lowest sub-bands $X_{CT}$ may be a copy of $X_{DT}$. $f_{ZFStart}$ may be 0 meaning that the source spectrum different from zeros may be chosen even from the start of the spectrum. The source spectrum for a sub-band i may for example be a random noise or a predicted spectrum or a combination of the already obtained lower part of $X_{CT}$, the random noise and the predicted spectrum. The source spectrum is weighted based on $E_B$ to obtain the zero filling $$X_{S_{B_i}}.$$

The weighting may be performed by 158*sg* and have higher resolution than the sub-band division; it may be even sample wise determined to obtain a smooth weighting.

$$X_{S_{B_i}}$$

is added to the sub-band i of $X_{DT}$ to produce the sub-band i of $X_{CT}$. After obtaining the complete $X_{CT}$, its temporal envelope is optionally modified via $TNS_D$ 159 (cf. FIG. 2) to match the temporal envelope of $X_{MS}$, producing $X_{CS}$. The spectral envelope of $X_{CS}$ is then modified using $SNS_D$ 160 to match the spectral envelope of $X_M$, producing $X_C$. A time-domain signal $y_C$ is obtained from $X_C$, as output of IMDCT 161 where IMDCT 161 consists of the inverse MDCT, windowing and the Overlap-and-Add. $y_C$ is used to update the LTP buffer 164 (either comparable to the buffer 164 in FIGS. 2*a* and 2*c*, or to a combination of 164+163) for the following frame. A harmonic post-filter (HPF) that follows pitch contour is applied on $y_C$ to reduce noise between harmonics and to output $y_H$. The coded pulses, consisting of coded pulse waveforms, are decoded and a time domain signal $y_P$ is constructed from the decoded pulse waveforms. $y_P$ is combined with $y_H$ to produce the decoded audio signal ($PCM_O$). Alternatively $y_P$ may be combined with $y_C$ and their combination can be used as the input to the HPF, in which case the output of the HPF 214 is the decoded audio signal.

The entity "get pitch contour" 180 is described below taking reference to FIG. 5.

The process in the block "Get pitch contour 180" will be explained now. The input signal is downsampled from the full sampling rate to lower sampling rate, for example to 8 kHz. The pitch contour is determined by pitch_mid and pitch_end from the current frame and by pitch_start that is equal to pitch_end from the previous frame. The frames are exemplarily illustrated by FIG. 5. All values used in the pitch contour may be stored as pitch lags with a fractional precision. The pitch lag values are between the minimum pitch lag $d_{Fmin}$=2.25 milliseconds (corresponding to 444.4 Hz) and the maximum pitch lag $d_{Fmax}$=19.5 milliseconds (corresponding to 51.3 Hz), the range from $d_{Fmin}$ to $d_{Fmax}$ being named the full pitch range. Other range of values may also be used. The values of pitch_mid and pitch_end are found in multiple steps. In every step, a pitch search is executed in an area of the downsampled signal or in an area of the input signal.

The pitch search calculates normalized autocorrelation $\rho_H[d_F]$ of its input and a delayed version of the input. The lags $d_F$ are between a pitch search start $d_{Fstart}$ and a pitch search end $d_{Fend}$. The pitch search start $d_{Fstart}$, the pitch search end $d_{Fend}$, the autocorrelation length $l_{\rho H}$ and a past pitch candidate $d_{Fpast}$ are parameters of the pitch search. The pitch search returns an optimum pitch $d_{Foptim}$, as a pitch lag with a fractional precision, and a harmonicity level $\rho_{Hoptim}$, obtained from the autocorrelation value at the optimum pitch lag. The range of $\rho_{Hoptim}$ is between 0 and 1, 0 meaning no harmonicity and 1 maximum harmonicity.

The location of the absolute maximum in the normalized autocorrelation is a first candidate $d_{F1}$ for the optimum pitch lag. If $d_{Fpast}$ is near $d_{F1}$ then a second candidate $d_{F2}$ for the optimum pitch lag is $d_{Fpast}$, otherwise the location of the local maximum near $d_{Fpast}$ is the second candidate $d_{F2}$. The local maximum is not searched if $d_{Fpast}$ is near $d_{F1}$, because then $d_{F1}$ would be chosen again for $d_{F2}$. If the difference of the normalized autocorrelation at $d_{F1}$ and $d_{F2}$ is above a pitch candidate threshold $\tau_{dF}$, then $d_{Foptim}$ is set to $d_{F1}$ ($\rho_H[d_{F1}]-\rho_H[d_{F2}]>\tau_{dF}\Rightarrow d_{Foptim}=d_{F1}$), otherwise $d_{Foptim}$ is set to $d_{F2}$. $\tau_{dF}$ is adaptively chosen depending on $d_{F1}$, $d_{F2}$ and $d_{Fpast}$, for example $\tau_{dF}=0.01$ if $0.75\cdot d_{F1}\le d_{Fpast}\le 1.25\cdot d_{F1}$ otherwise $\tau_{dF}=0.02$ if $d_{F1}\le d_{F2}$ and $\tau_{dF}=0.03$ if $d_{F1}>d_{F2}$ (for a small pitch change it is easier to switch to the new maximum location and if the change is big then it is easier to switch to a smaller pitch lag than to a larger pitch lag).

Figure 5:
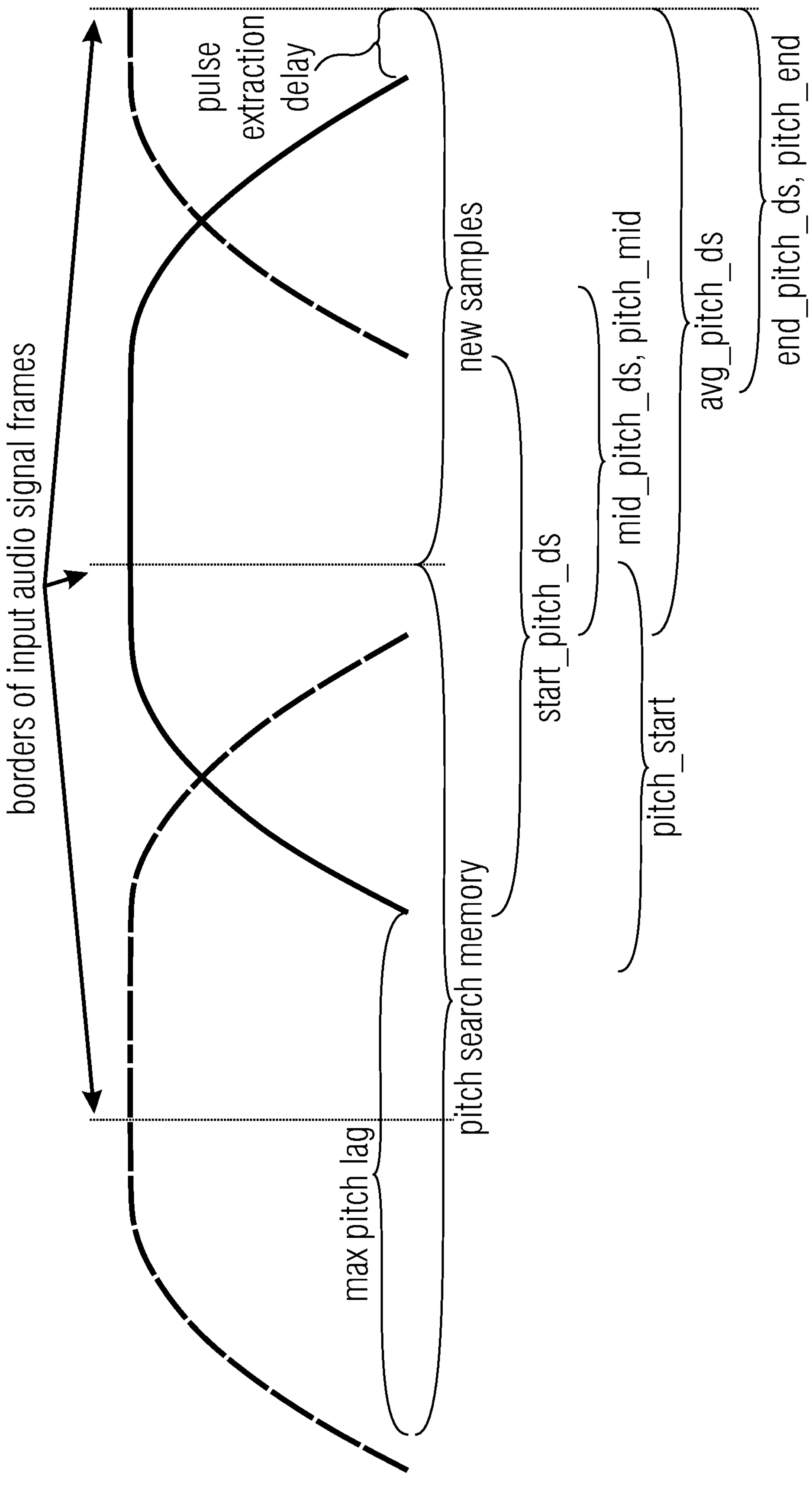
FIG. 5 shows a schematic diagram for illustrating the principle of determining the pitch contour (cf. block gap pitch contour) according to embodiments.

Locations of the areas for the pitch search in relation to the framing and windowing are shown in FIG. 5. For each area the pitch search is executed with the autocorrelation length $l_{PH}$ set to the length of the area. First, the pitch lag start_pitch_ds and the associated harmonicity start_norm_corr_ds is calculated at the lower sampling rate using $d_{Fpast}$=pitch_start, $d_{Fstart}=d_{Fmin}$ and $d_{Fend}=d_{Fmax}$ in the execution of the pitch search. Then, the pitch lag avg_pitch_ds and the associated harmonicity avg_norm_corr_ds is calculated at the lower sampling rate using $d_{Fpast}$=start_pitch_ds, $d_{Fstart}=d_{Fmin}$ and $d_{Fend}=d_{Fmax}$ in the execution of the pitch search. The average harmonicity in the current frame is set to max(start_norm_corr_ds, avg_norm_corr_ds). The pitch lags mid_pitch_ds and end_pitch_ds and the associated harmonicities mid_norm_corr_ds and end_norm_corr_ds are calculated at the lower sampling rate using $d_{Fpast}$=avg_pitch_ds, $d_{Fstart}$=0.3·avg_pitch_ds and $d_{Fend}$=0.7·avg_pitch_ds in the execution of the pitch search. The pitch lags pitch_mid and pitch_end and the associated harmonicities norm_corr_mid and norm_corr_end are calculated at the full sampling rate using $d_{Fpast}$=pitch_ds, $d_{Fstart}$=pitch_ds−$\Delta_{Fdown}$ and $d_{Fend}$=pitch_ds+$\Delta_{Fdown}$ in the execution of the pitch search, where $\Delta_{Fdown}$ is the ratio of the full and the lower sampling rate and pitch_ds=mid_pitch_ds for pitch_mid and pitch_ds=end_pitch_ds for pitch_end.

If the average harmonicity is below 0.3 or if norm_corr_end is below 0.3 or if norm_corr_mid is below 0.6 then it is signaled in the bit-stream with a single bit that there is no pitch contour in the current frame. If the average harmonicity is above 0.3 the pitch contour is coded using absolute coding for pitch_end and differential coding for pitch_mid. Pitch_mid is coded differentially to (pitch_start+pitch_end)/2 using 3 bits, by using the code for the difference to (pitch_start+pitch_end)/2 among 8 predefined values, that minimizes the autocorrelation in the pitch_mid area. If there is an end of harmonicity in a frame, e.g. norm_corr_end<norm_corr_mid/2, then linear extrapolation from pitch_start and pitch_mid is used for pitch_end, so that pitch_mid may be coded (e.g. norm_corr_mid>0.6 and norm_corr_end<0.3).

If |pitch_mid−pitch_start|≤$\tau_{HPFconst}$ and |norm_corr_mid−norm_corr_start|≤0.5 and the expected HPF gains in the area of the pitch_start and pitch_mid are close to 1 and don't change much then it is signaled in the bit-stream that the HPF should use constant parameters.

According to embodiments, the pitch contour provides $d_{contour}$ a pitch lag value $d_{contour}[i]$ at every sample i in the current window and in at least $d_{Fmax}$ past samples. The pitch lags of the pitch contour are obtained by linear interpolation of pitch_mid and pitch_end from the current, previous and second previous frame.

An average pitch lag $\bar{d}_{F_0}$ is calculated for each frame as an average of pitch_start, pitch_mid and pitch_end.

A half pitch lag correction is according to further embodiments also possible.

The LTP buffer 164 which is available in both the encoder and the decoder, is used to check if the pitch lag of the input signal is below $d_{Fmin}$. The detection if the pitch lag of the input signal is below $d_{Fmin}$ is called "half pitch lag detection" and if it is detected it is said that "half pitch lag is detected". The coded pitch lag values (pitch_mid, pitch_end) are coded and transmitted in the range from $d_{Fmin}$ to $d_{Fmax}$. From these coded parameters the pitch contour is derived as defined above. If half pitch lag is detected, it is expected that the coded pitch lag values will have a value close to an integer multiple $n_{Fcorrection}$ of the true pitch lag values (equivalently the input signal pitch is near an integer multiple $n_{Fcorrection}$ of the coded pitch). To extended the pitch lag range beyond the codable range, corrected pitch lag values (pitch_mid_corrected, pitch_end_corrected) are used. The corrected pitch lag values (pitch_mid_corrected, pitch_end_corrected) may be equal to the coded pitch lag values (pitch_mid, pitch_end) if the true pitch lag values are in the codable range. Note the corrected pitch lag values may be used to obtain the corrected pitch contour in the same way as the pitch contour is derived from the pitch lag values. In other words, this enables to extend the frequency range of the pitch contour outside of the frequency range for the coded pitch parameters, producing a corrected pitch contour.

The half pitch detection is run only if the pitch is considered constant in the current window and $\bar{d}_{F_0}<n_{Fcorrection}\cdot d_{Fmin}$. The pitch is considered constant in the current window if max(|pitch_mid−pitch_start|, |pitch_mid−pitch_end|)$<\tau_{Fconst}$. In the half pitch detection, for each $n_{Fmultiple}\in\{1, 2, \ldots, n_{Fmaxcorrection}\}$ pitch search is executed using $l_{\rho H}=\bar{d}_{F_0}$, $d_{Fpast}=\bar{d}_{F_0}/n_{Fmultiple}$, $d_{Fstart}=d_{Fpast}-3$ and $d_{Fend}=d_{Fpast}+3$. $n_{Fcorrection}$ is set to $n_{Fmultiple}$ that maximizes the normalized correlation returned by the pitch search. It is considered that the half pitch is detected if $n_{Fcorrection}>1$ and the normalized correlation returned by the pitch search for $n_{Fcorrection}$ is above 0.8 and 0.02 above the normalized correlation return by the pitch search for $n_{Fmultiple}=1$.

If half pitch lag is detected then pitch_mid_corrected and pitch_end_corrected take the value returned by the pitch search for $n_{Fmultiple}=n_{Fcorrection}$, otherwise pitch_mid_corrected and pitch_end_corrected are set to pitch_mid and pitch_end respectively.

An average corrected pitch lag $\bar{d}_{Fcorrected}$ is calculated as an average of pitch_start, pitch_mid_corrected and pitch_end_corrected after correcting eventual octave jumps. The octave jump correction finds minimum among pitch_start, pitch_mid_corrected and pitch_end_corrected and for each pitch among pitch_start, pitch_mid_corrected and pitch_end_corrected finds pitch/$n_{Fmultiple}$ closest to the minimum (for $n_{Fmultiple}\in\{1, 2, \ldots, n_{Fmaxcorrection}\}$). The pitch/$n_{Fmultiple}$ is then used instead of the original value in the calculation of the average.

Figure 6:
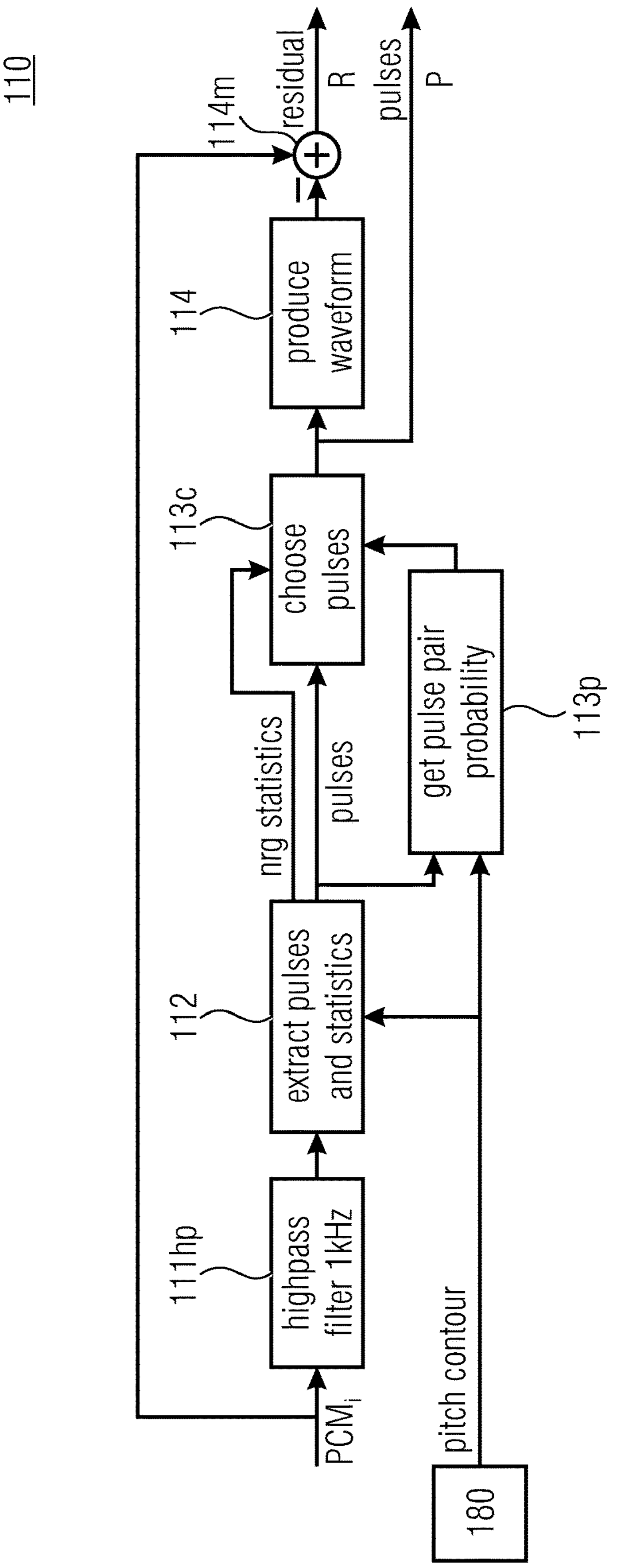
FIG. 6 shows a schematic block diagram of an pulse extractor using an information on a pitch contour according to further embodiments.

Below the pulse extraction may be discussed in context of FIG. 6. FIG. 6 shows the pulse extractor 110 having the entities 111*hp*, 112, 113*c*, 113*p*, 114 and 114*m*. The first entity at the input is an optional high pass filter 111*hp* which outputs the signal to the pulse extractor 112 (extract pulses and statistics).

At the output two entities 113*c* and 113*p* are arranged, which interact together and receive as input the pitch contour from the entity 180. The entity for choosing the pulses 113*c* outputs the pulses P directly into another entity 114 producing a waveform. This is the waveform of the pulse and can be subtracted using the mixer 114*m* from the PCM signal so as to generate the residual signal R (residual after extracting the pulses).

Up to 8 pulses per frame are extracted and coded. In another example other number of maximum pulses may be used. $N_{P_P}$ pulses from the previous frames are kept and used in the extraction and predictive coding ($0\le N_{P_P}\le 3$). In another example other limit may be used for $N_{P_P}$. The "Get pitch contour 180" provides $\bar{d}_{F_0}$; alternatively, $\bar{d}_{Fcorrected}$ may be used. It is expected that $\bar{d}_{F_0}$ is zero for frames with low harmonicity.

Time-frequency analysis via Short-time Fourier Transform (STFT) is used for finding and extracting pulses (cf. entity 112). In another example other time-frequency representations may be used. The signal $PCM_I$ may be high-passed (111*hp*) and windowed using 2 milliseconds long squared sine windows with 75% overlap and transformed via Discrete Fourier Transform (DFT) into the Frequency Domain (FD). Alternatively, the high pass filtering may be done in the FD (in 112*s* or at the output of 112*s*). Thus in each frame of 20 milliseconds there are 40 points for each frequency band, each point consisting of a magnitude and a phase. Each frequency band is 500 Hz wide and we are considering only 49 bands for the sampling rate $F_S$=48 kHz, because the remaining 47 bands may be constructed via symmetric extension. Thus there are 49 points in each time instance of the STFT and 40·49 points in the time-frequency plane of a frame. The STFT hop size is $H_P=0.0005\ F_S$.

Figure 7:
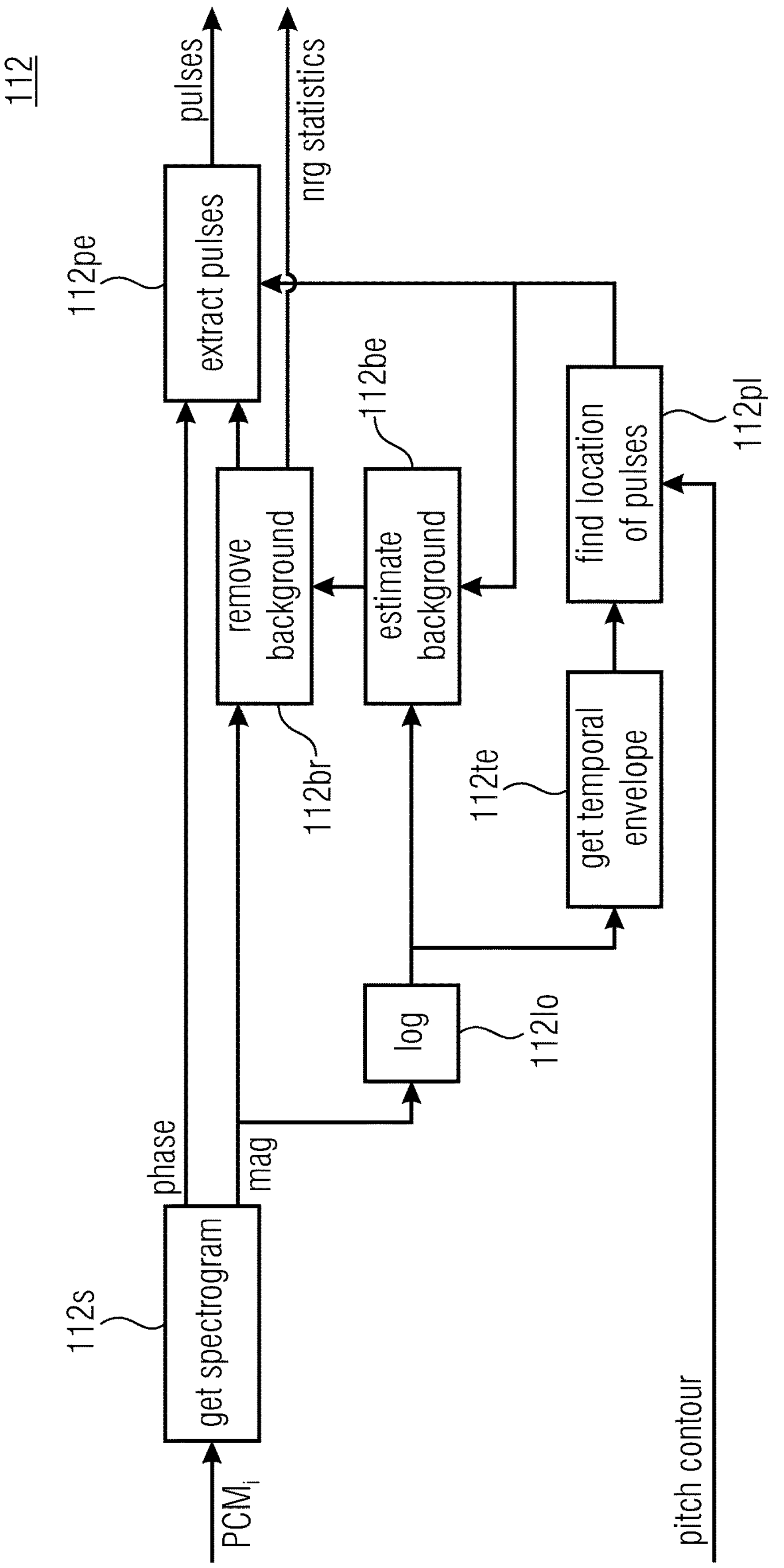
FIG. 7 shows a schematic block diagram of a pulse extractor using the pitch contour as additional information according to an alternative embodiment.

In FIG. 7 the entity 112 is shown in more details. In 112*te* a temporal envelope is obtained from the log magnitude spectrogram by integration across the frequency axis, that is for each time instance of the STFT log magnitudes are summed up to obtain one sample of the temporal envelope.

The shown entity 112 comprises a Get spectrogram entity 112*s* outputting the phase and/or the magnitude spectrogram based on the $PCM_I$ signal. The phase spectrogram is forwarded to the pulse extractor 112*pe*, while the magnitude spectrogram is further processed. The magnitude spectrogram may be processed using a background remover 112*br*, a background estimator 112*be* for estimating the background signal to be removed. Additionally or alternatively a temporal envelope determiner 112*te* and a pulse locator 112*pl* processes the magnitude spectrogram. The entities 112*pl* and 112*te* enable to determine that pulse location(s) which are used as input for the pulse extractor 112*pe* and the background estimator 112*be*. The pulse locator finder 112*pl* may use a pitch contour information. Optionally, some entities, for example, the entity 112*be* and the entity 112*te* may use algorithmic representation of the magnitude spectrogram obtained by the entity 112*lo*.

Below the functionality will be discussed. Smoothed temporal envelope is low-pass filtered version of the temporal envelope using short symmetrical FIR filter (for an example $4^{th}$ order filter at $F_S$=48 kHz).

Normalized autocorrelation of the temporal envelope is calculated:

$$\rho_{e_T}[m]=\frac{\sum_{n=0}^{40}e_T[n]e_T[n-m]}{\sqrt{\left(\sum_{n=0}^{40}e_T[n]e_T[n]\right)\left(\sum_{n=-m}^{40-m}e_T[n]e_T[n]\right)}}$$

-continued $$\hat{\rho}_{e_T}=\begin{cases}\max\limits_{5\le m\le 12}\rho_{e_T}[m], & \max\limits_{5\le m\le 12}\rho_{e_T}[m]>0.65\\ 0, & \max\limits_{5\le m\le 12}\rho_{e_T}[m]\le 0.65\end{cases}$$

where $e_T$ is the temporal envelope after mean removal. The exact delay for the maximum $$(D_{\rho_{e_T}})$$

is estimated using Lagrange polynomial of 3 points forming the peak in the normalized autocorrelation.

Expected average pulse distance may be estimated from the normalized autocorrelation of the temporal envelope and the average pitch lag in the frame:

$$\tilde{D}_P=\begin{cases}D_{\rho_{e_T}}, & \hat{\rho}_{e_T}>0\\ \min\left(\frac{\bar{d}_{F_0}}{H_P},13\right), & \hat{\rho}_{e_T}=0\wedge\bar{d}_{F_0}>0\\ 13, & \hat{\rho}_{e_T}=0\wedge\bar{d}_{F_0}=0\end{cases}$$

where for the frames with low harmonicity, $\tilde{D}_P$ is set to 13, which corresponds to 6.5 milliseconds.

Positions of the pulses are local peaks in the smoothed temporal envelope with the requirement that the peaks are above their surroundings. The surrounding is defined as the low-pass filtered version of the temporal envelope using simple moving average filter with adaptive length; the length of the filter is set to the half of the expected average pulse distance ($\tilde{D}_P$). The exact pulse position ($\dot{t}_{P_i}$) is estimated using Lagrange polynomial of 3 points forming the peak in the smoothed temporal envelope. The pulse center position ($t_{P_i}$) is the exact position rounded to the SIFT time instances and thus the distance between the center positions of pulses is a multiple of 0.5 milliseconds. It is considered that each pulse extends 2 time instances to the left and 2 to the right from its (temporal) center position. Other number of time instances may also be used.

Up to 8 pulses per 20 milliseconds are found; if more pulses are detected then smaller pulses are disregarded. The number of found pulses is denoted as $N_{P_X}$·$i^{th}$ pulse is denoted as $P_i$. The average pulse distance is defined as:

$$\bar{D}_P=\begin{cases}\tilde{D}_P, & \hat{\rho}_{e_T}>0\vee\bar{d}_{F_0}>0\\ \min\left(\frac{40}{N_{P_X}},13\right), & \hat{\rho}_{e_T}=0\wedge\bar{d}_{F_0}=0\end{cases}$$

Magnitudes are enhanced based on the pulse positions so that the enhanced STFT, also called enhanced spectrogram, consists only of the pulses. The background of a pulse is estimated as the linear interpolation of the left and the right background, where the left and the right backgrounds are mean of the $3^{rd}$ to $5^{th}$ time instance away from the (temporal) center position. The background is estimated in the log magnitude domain in 112*be* and removed by subtracting it in the linear magnitude domain in 112*br*. Magnitudes in the enhanced STFT are in the linear scale. The phase is not modified. All magnitudes in the time instances not belonging to a pulse are set to zero.

The start frequency of a pulse is proportional to the inverse of the average pulse distance (between nearby pulse waveforms) in the frame, but limited between 750 Hz and 7250 Hz:

$$f_{P_i}=\min\left(\left\lfloor 2\left(\frac{13}{\bar{D}_P}\right)^2+0.5\right\rfloor,15\right)$$

The start frequency ($f_{P_i}$) is expressed as index of an STFT band.

The change of the starting frequency in consecutive pulses is limited to 500 Hz (one STFT band). Magnitudes of the enhanced STFT bellow the starting frequency are set to zero in 112*pe*.

Waveform of each pulse is obtained from the enhanced SIFT in 112*pe*. The pulse waveform is non-zero in 4 milliseconds around its (temporal) center and the pulse length is $L_{W_P}$=0.004 $F_S$ (the sampling rate of the pulse waveform is equal to the sampling rate of the input signal $F_S$). The symbol $x_{P_i}$ represents the waveform of the $i^{th}$ pulse.

Each pulse $P_i$ is uniquely determined by the center position $t_{P_i}$ and the pulse waveform $x_{P_i}$. The pulse extractor 112*pe* outputs pulses $P_i$ consisting of the center positions $t_{P_i}$ and the pulse waveforms $x_{P_i}$. The pulses are aligned to the STFT grid. Alternatively, the pulses may be not aligned to the STFT grid and/or the exact pulse position ($\dot{t}_{P_i}$) may determine the pulse instead of $t_{P_i}$.

Features are calculated for each pulse:

- percentage of the local energy in the pulse $-p_{E_L,P_i}$
- percentage of the frame energy in the pulse $-p_{E_F,P_i}$
- percentage of bands with the pulse energy above the half of the local energy $-p_{N_E,P_i}$
- correlation $\rho_{P_i,P_j}$ and distance $d_{P_i,P_j}$ between each pulse pair (among the pulses in the current frame and the $N_{P_P}$ last coded pulses from the past frames)
- pitch lag at the exact location of the pulse $-d_{P_i}$ The local energy is calculated from the 11 time instances around the pulse center in the original STFT. All energies are calculated only above the start frequency.

The distance between a pulse pair $d_{P_j,P_i}$ is obtained from the location of the maximum cross-correlation between pulses $(x_{P_i}*x_{P_j})$ [m]. The cross-correlation is windowed with the 2 milliseconds long rectangular window and normalized by the norm of the pulses (also windowed with the 2 milliseconds rectangular window). The pulse correlation is the maximum of the normalized cross-correlation:

$$(x_{P_i}*x_{P_j})[m]=\frac{\sum_{n=l}^{L_{W_P}-l}x_{P_i}[n]x_{P_j}[n+m]}{\sqrt{\left(\sum_{n=l}^{L_{W_P}-l}x_{P_i}[n]x_{P_i}[n]\right)\left(\sum_{n=l}^{L_{W_P}-l}x_{P_j}[n+m]x_{P_j}[n+m]\right)}}$$

$$\rho_{P_j,P_i}=\begin{cases}\max\limits_{-l\le m\le l}(x_{P_i}*x_{P_j})[m], & i<j\\ \max\limits_{-l\le m\le l}(x_{P_j}*x_{P_i})[m], & i>j\\ 0, & i=j\end{cases}$$

$$\Delta_{\rho P_j,P_i}=\begin{cases}\operatorname{argmax}\limits_{-l\le m\le l}(x_{P_i}*x_{P_j})[m], & i<j\\ -\operatorname{argmax}\limits_{-l\le m\le l}(x_{P_j}*x_{P_i})[m], & i>j\\ 0, & i=j\end{cases}$$

-continued $$d_{P_j,P_i} = \left|t_{P_j} - t_{P_i} + \Delta_{\rho_{P_j,P_i}}\right| = \left|t_{P_i} - t_{P_j} + \Delta_{\rho_{P_i,P_j}}\right|$$

$$l = \frac{L_{W_P}}{4}$$

The value of $(x_{P_i} * x_{P_j})[m]$ is in the range between 0 and 1.

Error between the pitch and the pulse distance is calculated as:

$$\epsilon_{P_i,P_j} = \epsilon_{P_j,P_i} = \min\left(\min_{1\le k\le 6}\frac{|k\cdot d_{P_j,P_i} - d_{P_j}|}{H_P}, \min_{1\le k\le j-i}\frac{|d_{P_j,P_i} - k\cdot d_{P_j}|}{H_P}\right), i < j$$

Introducing multiple of the pulse distance $(k\cdot d_{P_j,P_i})$, errors in the pitch estimation are taken into account. Introducing multiples of the pitch lag $(k\cdot d_{P_j})$ solves missed pulses coming from imperfections in pulse trains: if a pulse in the train is distorted or there is a transient not belonging to the pulse train that inhibits detection of a pulse belonging to the train. Probability that the $i^{th}$ and the $j^{th}$ pulse belong to a train of pulses (cf. entity 113*p*):

$$p_{P_i,P_j} = p_{P_j,P_i} = \begin{cases} \min\left(1, \frac{\rho^2_{P_j,P_i}}{\sqrt{\max(0.2, \epsilon_{P_i,P_j})}}\right), & -N_{P_P} \le j < 0 \le i < N_{P_X} \\ \min\left(1, \frac{\rho_{P_j,P_i}}{\sqrt{\max(0.1, \epsilon_{P_i,P_j})}}\right), & 0 \le i < j < N_{P_X} \end{cases}$$

Probability of a pulse with the relation only to the already coded past pulses is defined as:

$$\dot{p}_{P_i} = p_{E_F,P_i}\left(1 + \max_{-N_{P_P}\le j<0} p_{P_j,P_i}\right)$$

Probability (cf. entity 113*p*) of a pulse $(p_{P_i})$ is iteratively found:

1. All pulse probabilities $(p_{P_i}, 0 \le i < N_{P_X})$ are set to 1
2. In the time appearance order of pulses, for each pulse that is still probable $(p_{P_i} > 0)$:
   a. Probability of the pulse belonging to a train of the pulses in the current frame is calculated:

$$\ddot{p}_{P_i} = p_{E_F,P_i}\left(\sum_{j=0}^{i-1} p_{P_j}\cdot p_{P_j,P_i} + \sum_{j=i+1}^{N_{P_X}-1} p_{P_j}\cdot p_{P_j,P_i}\right)$$

b. The initial probability that it is truly a pulse is then:

$$p_{P_i} = \dot{p}_{P_i} + \ddot{p}_{P_i}$$

c. The probability is increased for pulses with the energy in many bands above the half of the local energy:

$$p_{P_i} = \max(p_{P_i}, \min(p_{N_E P_i}, 1.5\cdot p_{P_i}))$$

d. The probability is limited by the temporal envelope correlation and the percentage of the local energy in the pulse:

$$p_{P_i} = \min\left(p_{P_i}, \left(1 + 0.4\cdot\hat{\rho}_{e_T}\right)p_{E_L P_i}\right)$$

e. If the pulse probability is below a threshold, then its probability is set to zero and it is not considered anymore:

$$p_{P_i} = \begin{cases} 1, & p_{P_i} \ge 0.15 \\ 0, & p_{P_i} < 0.15 \end{cases}$$

3. The step 2 is repeated as long as there is at least one $p_{P_i}$ set to zero in the current iteration or until all $p_{P_i}$ are set to zero.

At the end of this procedure, there are $N_{P_C}$ true pulses with $p_{P_i}$ equal to one. All and only true pulses constitute the pulse portion P and are coded as CP. Among the true $N_{P_C}$ pulses up to three last pulses are kept in memory for calculating $\rho_{P_i,P_j}$ and $d_{P_i,P_j}$ in the following frames. If there are less than three true pulses in the current frame, some pulses already in memory are kept. In total up to three pulses are kept in the memory. There may be other limit for the number of pulses kept in memory, for example 2 or 4. After there are three pulses in the memory, the memory remains full with the oldest pulses in memory being replaced by newly found pulses. In other words, the number of past pulses $N_{P_P}$ kept in memory is increased at the beginning of processing until $N_{P_P}=3$ and is kept at 3 afterwards.

Below, with respect to FIG. 8 the pulse coding (encoder side, cf. entity 132) will be discussed.

Figure 8:
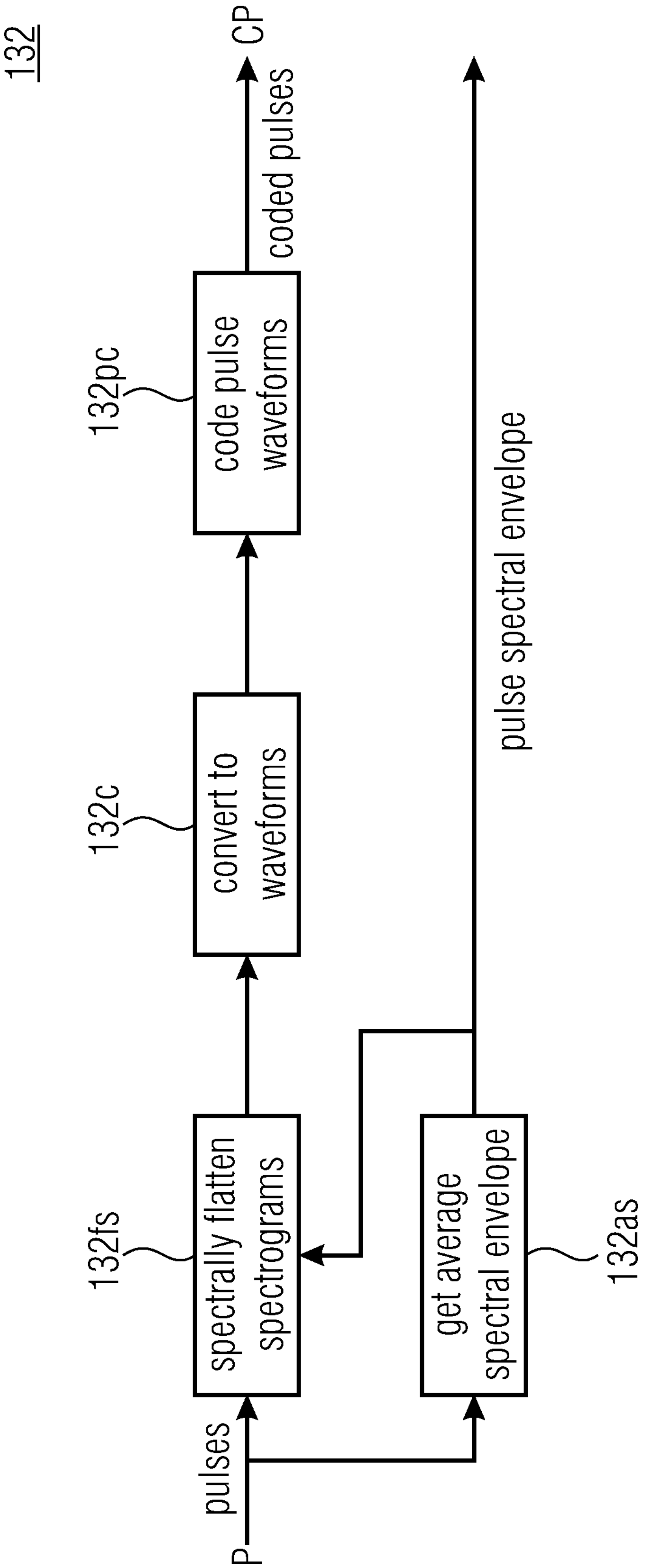
FIG. 8 shows a schematic block diagram illustrating a pulse coder according to further embodiments.

FIG. 8 shows the pulse coder 132 comprising the entities 132*fs*, 132*c* and 132*pc* in the main path, wherein the entity 132*as* is arranged for determining and providing the spectral envelope as input to the entity 132*fs* configured for performing spectrally flattening. Within the main path 132*fs*, 132*c* and 132*pc*, the pulses P are coded to determine coded spectrally flattened pulses. The coding performed by the entity 132*pc* is performed on spectrally flattened pulses. The coded pulses CP in FIG. 2*a-c* consists of the coded spectrally flattened pulses and the pulse spectral envelope. The coding of the plurality of pulses will be discussed in detail with respect to FIG. 10.

Pulses are coded using parameters:

number of pulses in the frame $N_{P_C}$ position within the frame $t_{P_i}$ pulse starting frequency $f_{P_i}$ pulse spectral envelope prediction gain $$g_{P_{P_i}}$$

and if $$g_{P_{P_i}}$$

is not zero:

index of the prediction source $i_{P_{P_i}}$ prediction offset $\Delta_{P_{P_i}}$ innovation gain $g_{I_{P_i}}$ innovation consisting of up to 4 impulses, each pulse coded by its position and sign A single coded pulse is determined by parameters:

pulse starting frequency $f_{P_i}$ pulse spectral envelope prediction gain $g_{P_{P_i}}$ and if $g_{P_{P_i}}$ is not zero:

index of the prediction source $i_{P_{P_i}}$ prediction offset $\Delta_{P_{P_i}}$ innovation gain $g_{I_{P_i}}$ innovation consisting of up to 4 impulses, each pulse coded by its position and sign From the parameters that determine the single coded pulse a waveform can be constructed that present the single coded pulse. We can then also say that the coded pulse waveform is determined by the parameters of the single coded pulse.

The number of pulses is Huffman coded.

The first pulse position $t_{P_0}$ is coded absolutely using Huffman coding. For the following pulses the position deltas $\Delta_{P_i}=t_{P_i}-t_{P_{i-1}}$ are Huffman coded. There are different Huffman codes depending on the number of pulses in the frame and depending on the first pulse position.

The first pulse starting frequency $f_{P_0}$ is coded absolutely using Huffman coding. The start frequencies of the following pulses is differentially coded. If there is a zero difference then all the following differences are also zero, thus the number of non-zero differences is coded. All the differences have the same sign, thus the sign of the differences can be coded with single bit per frame. In most cases the absolute difference is at most one, thus single bit is used for coding if the maximum absolute difference is one or bigger. At the end, only if maximum absolute difference is bigger than one, all non-zero absolute differences need to be coded and they are unary coded.

Figure 9A:
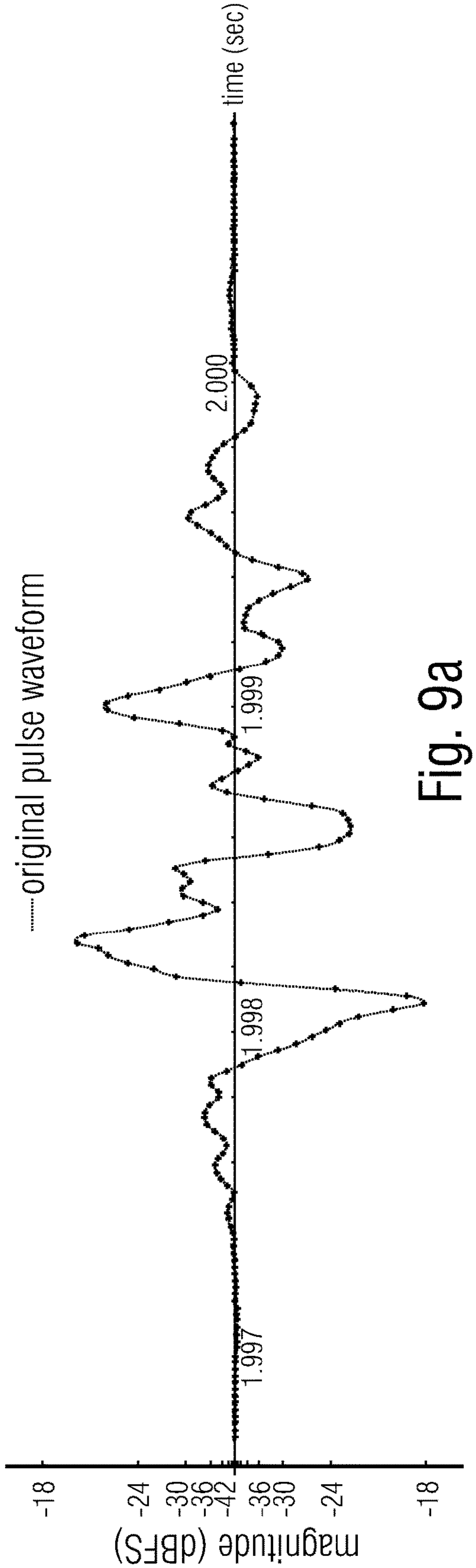
FIGS. 9*a*-9*b* show schematic diagrams for illustrating the principle of spectrally flattening a pulse according to embodiments.
Figure 9B:
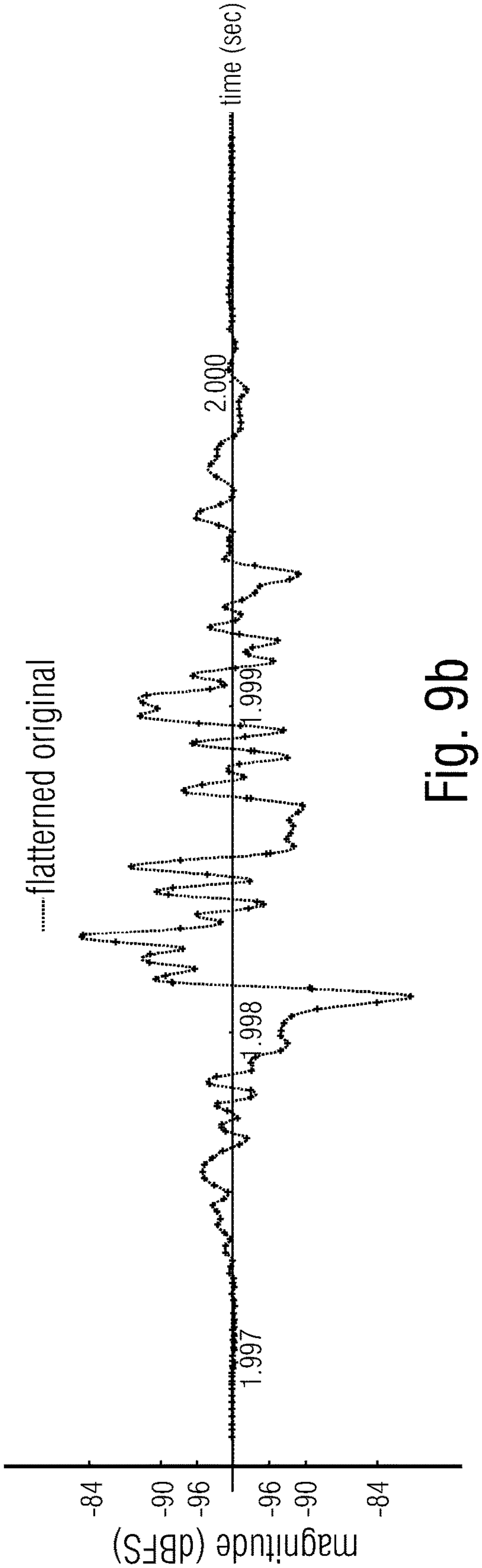

The spectrally flatten, e.g. performed using STFT (cf. entity 132*fs* of FIG. 8) is illustrated by FIGS. 9*a* and 9*b*, where FIG. 9*a* showing the original pulse waveform in comparison to the flattened version of FIG. 9*b*. Note the spectrally flattening may alternatively be performed by a filter, e.g. in the time domain.

All pulses in the frame may use the same spectral envelope (cf. entity 132*as*) consisting for example of eight bands. Band border frequencies are: 1 kHz, 1.5 kHz, 2.5 kHz, 3.5 kHz, 4.5 kHz, 6 kHz, 8.5 kHz, 11.5 kHz, 16 kHz. Spectral content above 16 kHz is not explicitly coded. In another example other band borders may be used.

Spectral envelope in each time instance of a pulse is obtained by summing up the magnitudes within the envelope bands, the pulse consisting of 5 time instances. The envelopes are averaged across all pulses in the frame. Points between the pulses in the time-frequency plane are not taken into account.

The values are compressed using fourth root and the envelopes are vector quantized. The vector quantizer has 2 stages and the $2^{nd}$ stage is split in 2 halves. Different codebooks exist for frames with $\overline{d}_{F_0}=0$ and $\overline{d}_{F_0}\neq 0$ for the values of $N_{P_C}$ and $f_{P_i}$. Different codebooks require different number of bits.

The quantized envelope may be smoothed using linear interpolation. The spectrograms of the pulses are flattened using the smoothed envelope (cf. entity 132*fs*). The flattening is achieved by division of the magnitudes with the envelope (received from the entity 132*as*), which is equivalent to subtraction in the logarithmic magnitude domain. Phase values are not changed. Alternatively a filter processor may be configured to spectrally flatten magnitudes or the pulse STFT by filtering the pulse waveform in the time domain.

Waveform of the spectrally flattened pulse $y_{P_i}$ is obtained from the STFT via the inverse DFT, windowing and overlap and add in 132*c*.

Figure 10:
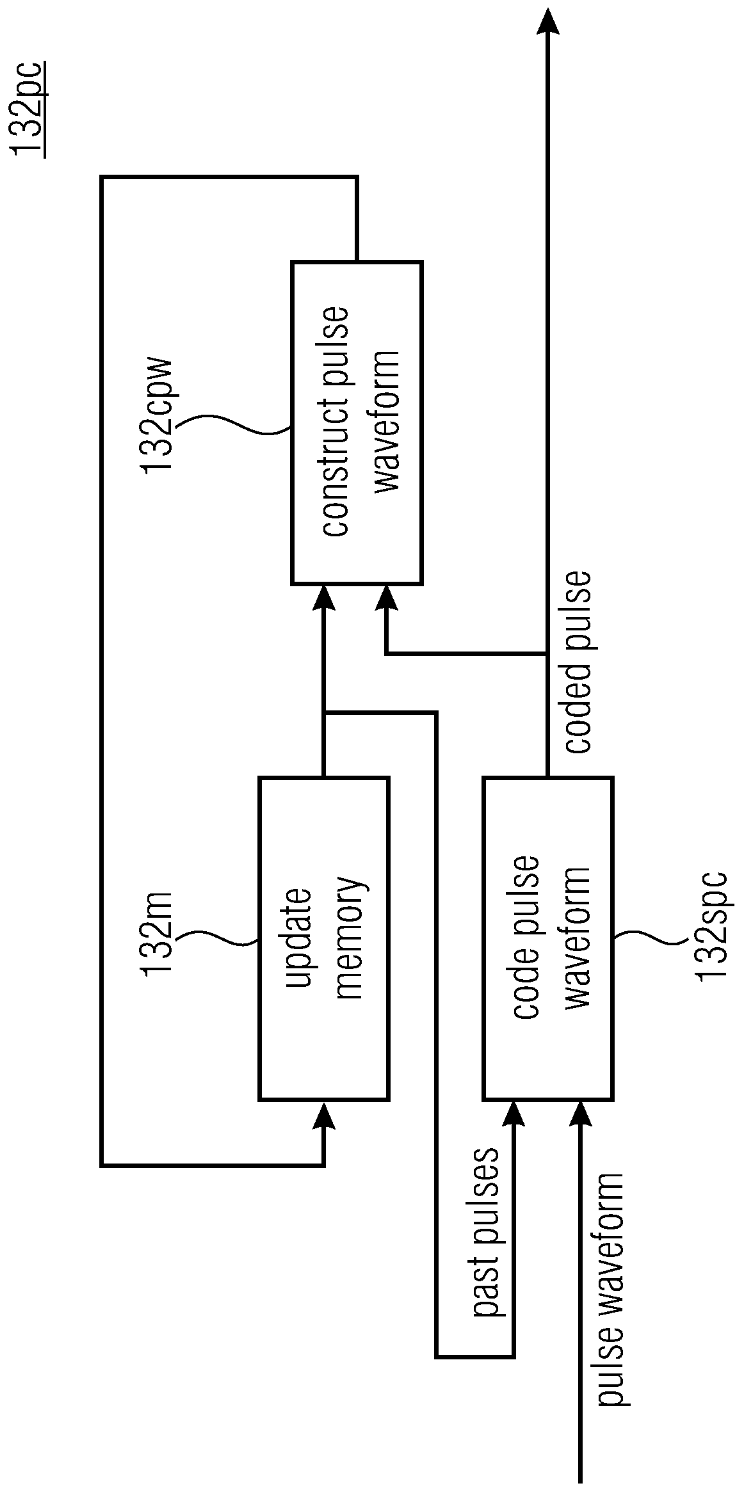
FIG. 10 shows a schematic block diagram of a pulse coder according to further embodiments.

FIG. 10 shows an entity 132*pc* for coding a single spectrally flattened pulse waveform of the plurality of spectrally flattened pulse waveforms. Each single coded pulse waveform is output as coded pulse signal. From another point of view, the entity 132*pc* for coding single pulses of FIG. 10 is than the same as the entity 132*pc* configured for coding pulse waveforms as shown in FIG. 8, but used several times for coding the several pulse waveforms.

Figure 11A:
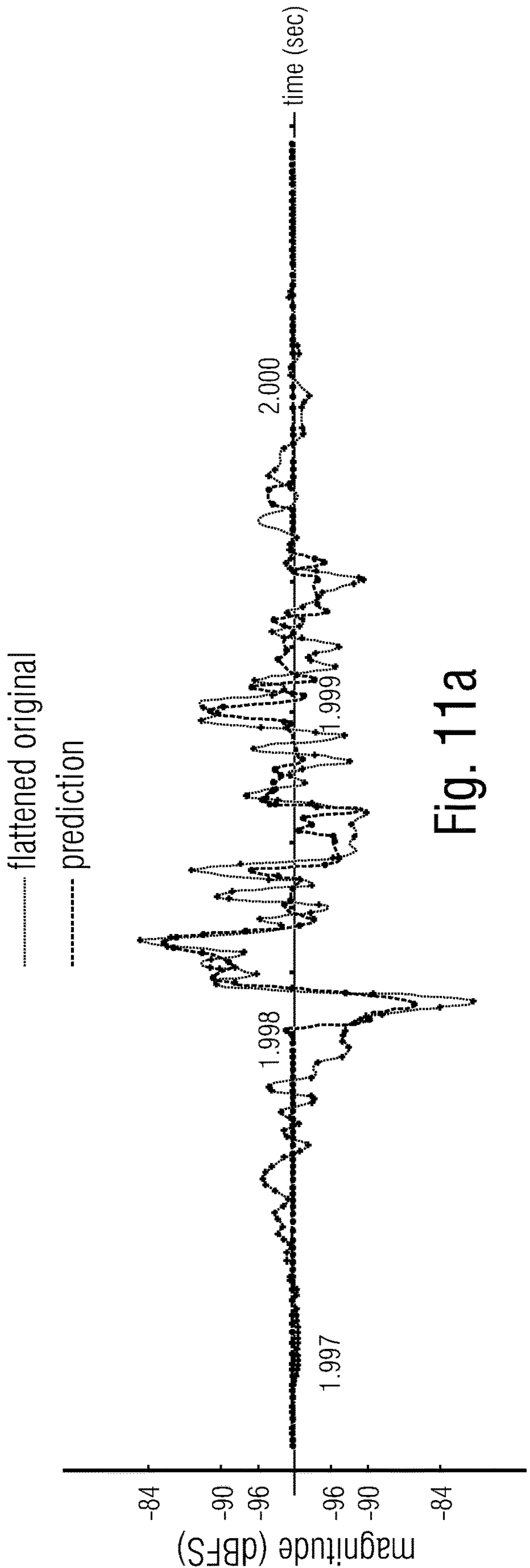
FIGS. 11*a*-11*b* show a schematic diagram illustrating the principle of determining a prediction residual signal starting from a flattened original.
Figure 11B:
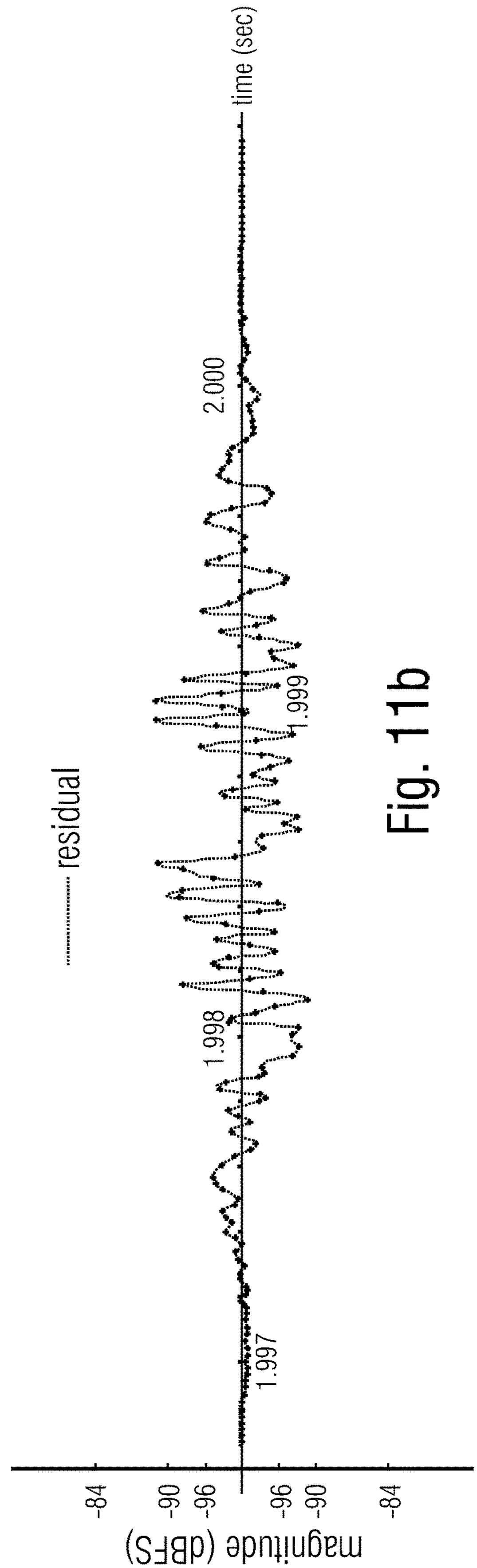

The entity 132*pc* of FIG. 10 comprises a pulse coder 132*spc*, a constructor for the flattened pulse waveform 132*cpw* and the memory 132*m* arranged as kind of a feedback loop. The constructor 132*cpw* has the same functionality as 220*cpw* and the memory 132*m* the same functionality as 229 in FIG. 14. Each single/current pulse is coded by the entity 132*spc* based on the flattened pulse waveform taking into account past pulses. The information on the past pulses is provided by the memory 132*m*. Note the past pulses coded by 132*pc* are fed via the pulse waveform constructer 132*cpw* and memory 132*m*. This enables the prediction. The result by using such prediction approach is illustrated by FIG. 11. Here FIG. 11*a*, indicates the flattened original together with the prediction and the resulting prediction residual signal in FIG. 11*b*.

According to embodiments the most similar previously quantized pulse is found among $N_{P_P}$ pulses from the previous frames and already quantized pulses from the current frame. The correlation $\rho_{P_i,P_j}$, as defined above, is used for choosing the most similar pulse. If differences in the correlation are below 0.05, the closer pulse is chosen. The most similar previous pulse is the source of the prediction $\tilde{z}_{P_i}$ and its index $$i_{P_{P_i}},$$

relative to the currently coded pulse, is used in the pulse coding. Up to four relative prediction source indexes $$i_{P_{P_i}}$$

are grouped and Huffman coded. The grouping and the Huffman codes are dependent on $N_{P_C}$ and whether $\overline{d}_{F_0}=0$ or $\overline{d}_{F_0}\neq 0$.

The offset for the maximum correlation is the pulse prediction offset $$\Delta_{P_{P_i}}.$$

It is coded absolutely, differentially or relatively to an estimated value, where the estimation is calculated from the pitch lag at the exact location of the pulse $d_{P_i}$. The number of bits needed for each type of coding is calculated and the one with minimum bits is chosen. Gain $$\acute{g}_{P_{P_i}}$$

that maximizes the SNR is used for scaling the prediction $\tilde{z}_{P_i}$. The prediction gain is non-uniformly quantized with 3 to 4 bits. If the energy of the prediction residual is not at least 5% smaller than the energy of the pulse, the prediction is not used and $$\acute{g}_{P_{P_i}}$$

is set to zero.

Figure 12:
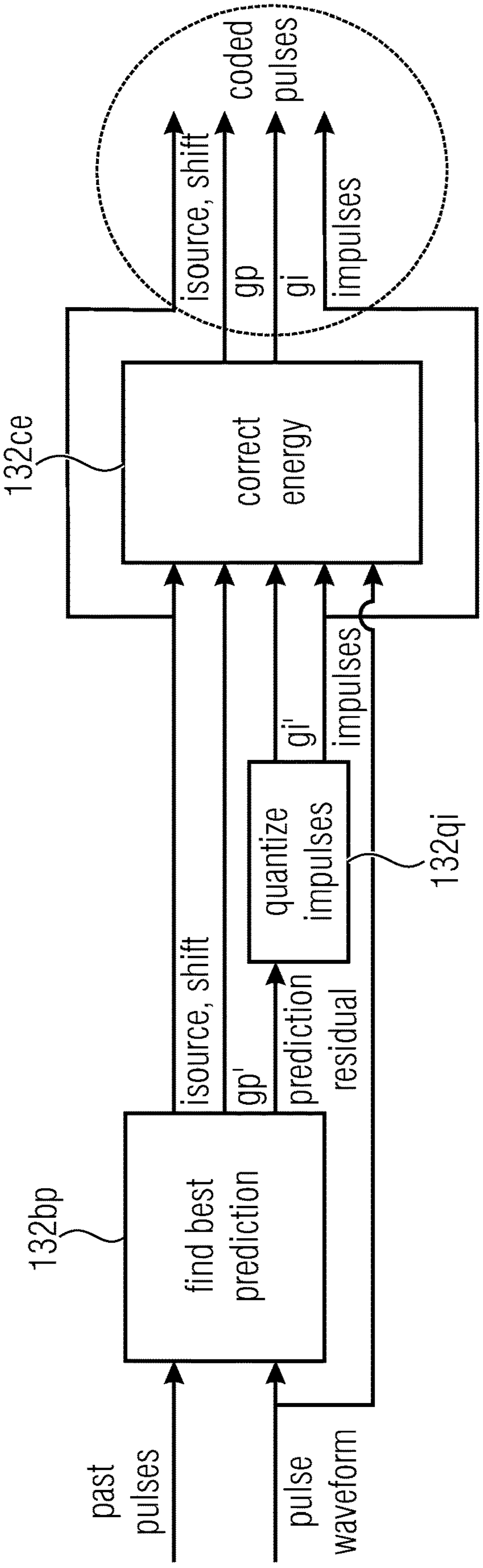
FIG. 12 shows a schematic block diagram of a pulse coder according to further embodiments.

The prediction residual is quantized using up to four impulses. In another example other maximum number of impulses may be used. The quantized residual consisting of impulses is named innovation $\dot{z}_{P_i}$. This is illustrated by FIG. 12. To save bits, the number of impulses is reduced by one for each pulse predicted from a pulse in this frame. In other words: if the prediction gain is zero or if the source of the prediction is a pulse from previous frames then four impulses are quantized, otherwise the number of impulses decreases compared to the prediction source.

FIG. 12 shows a processing path to be used as process block 132*spc* of FIG. 10. The process path enables to determine the coded pulses and may comprise the three entities 132*bp*, 132*qi*, 132*ce*.

The first entity 132*bp* for finding the best prediction uses the past pulse(s) and the pulse waveform to determine the iSOURCE, shift, GP' and prediction residual. The quantize impulse entity 132*gi* quantizes the prediction residual and outputs GI' and the impulses. The entity 132*ce* is configured to calculate and apply a correction factor. All this information together with the pulse waveform are received by the entity 132*ce* for correcting the energy, so as to output the coded impulse. The following algorithm may be used according to embodiments:

For finding and coding the impulses the following algorithm is used:

1. Absolute pulse waveform $|x|_{P_i}$ is constructed using full-wave rectification:

$$|x|_{P_i}[n] = |x_{P_i}[n]|,\ 0 \le n < L_{W_P}$$

2. Vector with the number of impulses at each location $\lfloor x \rfloor_{P_i}$ is initialized with zeros:

$$\lfloor x \rfloor_{P_i}[n] = 0,\ 0 \le n < L_{W_P}$$

3. Location of the maximum in $|x|_{P_i}$ is found:

$$\hat{n}_x = \underset{0 \le m < L_{W_P}}{\operatorname{argmax}} |x|_{P_i}[m]$$

4. Vector with the number of impulses is increased for one at the location of the found maximum $\lfloor x \rfloor_{P_i}[\hat{n}_x]$:

$$\lfloor x \rfloor_{P_i}[\hat{n}_x] = \lfloor x \rfloor_{P_i}[\hat{n}_x] + 1$$

5. The maximum in $|x|_{P_i}$ is reduced:

$$|x|_{P_i}[\hat{n}_x] = \frac{|x_{P_i}[\hat{n}_x]|}{1 + \lfloor x \rfloor_{P_i}[\hat{n}_x]}$$

6. The steps 3-5 are repeated until the required number of impulses are found, where the number of pulses is equal to $\Sigma \lfloor x \rfloor_{P_i}[n]$ Notice that the impulses may have the same location. Locations of the pulses are ordered by their distance from the pulse center. The location of the first impulse is absolutely coded.

The locations of the following impulses are differentially coded with probabilities dependent on the position of the previous impulse. Huffman coding is used for the impulse location.

Sign of each impulse is also coded. If multiple impulses share the same location then the sign is coded only once.

Figure 13:
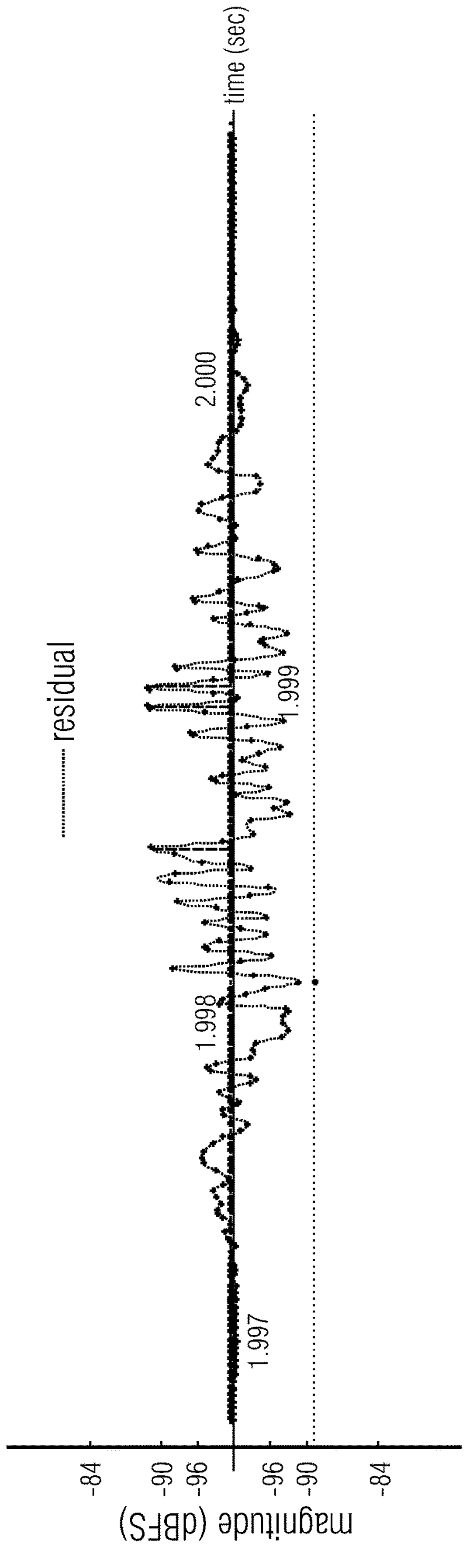
FIG. 13 shows a schematic diagram illustrating a residual signal and coded impulses for illustrating embodiments.

The resulting 4 found and scaled impulses 15*i* of the residual signal 15*r* are illustrated by FIG. 13. In detail the impulses represented by the lines $$Q\left(g_{I_{P_i}}\right)\dot{z}_{P_i}$$

may be scaled accordingly, e.g. impulse +/−1 multiplied by Gain $$\acute{g}_{I_{P_i}}.$$

Gain $$\acute{g}_{I_{P_i}}$$

that maximizes the SNR is used for scaling the innovation $\dot{z}_{P_i}$ consisting of the impulses. The innovation gain is non-uniformly quantized with 2 to 4 bits, depending on the number of pulses $N_{P_C}$.

The first estimate for quantization of the flattened pulse waveform $\acute{z}_{P_i}$ is then:

$$\acute{z}_{P_i} = Q(\acute{g}_{P_{P_i}})\tilde{z}_{P_i} + Q(\acute{g}_{I_{P_i}})\dot{z}_{P_i}$$

where Q( ) denotes quantization.

Because the gains are found by maximizing the SNR, the energy of $\acute{z}_{P_i}$ can be much lower than the energy of the original target $y_{P_i}$. To compensate the energy reduction a correction factor $c_g$ is calculated:

$$c_g = \max\left(1, \left(\frac{\sum_{n=0}^{L_{W_P}} (y_{P_i}[n])^2}{\sum_{n=0}^{L_{W_P}} (\acute{z}_{P_i}[n])^2}\right)^{0.25}\right)$$

The final gains are then:

$$g_{P_{P_i}} = \begin{cases} c_g \acute{g}_{P_{P_i}}, & Q\left(\acute{g}_{P_{P_i}}\right) > 0 \\ 0, & Q\left(\acute{g}_{P_{P_i}}\right) = 0 \end{cases}$$

$$g_{I_{P_i}} = c_g \acute{g}_{I_{P_i}}$$

The memory for the prediction is updated using the quantized flattened pulse waveform $z_{P_i}$:

$$z_{P_i} = Q\left(g_{P_{P_i}}\right)\tilde{z}_{P_i} + Q\left(g_{I_{P_i}}\right)\dot{z}_{P_i}$$

At the end of coding of $N_{P_P} \leq 3$ quantized flattened pulse waveforms are kept in memory for prediction in the following frames.

Below, taking reference to FIG. 14 the approach for reconstructing pulses will be discussed.

Figure 14:
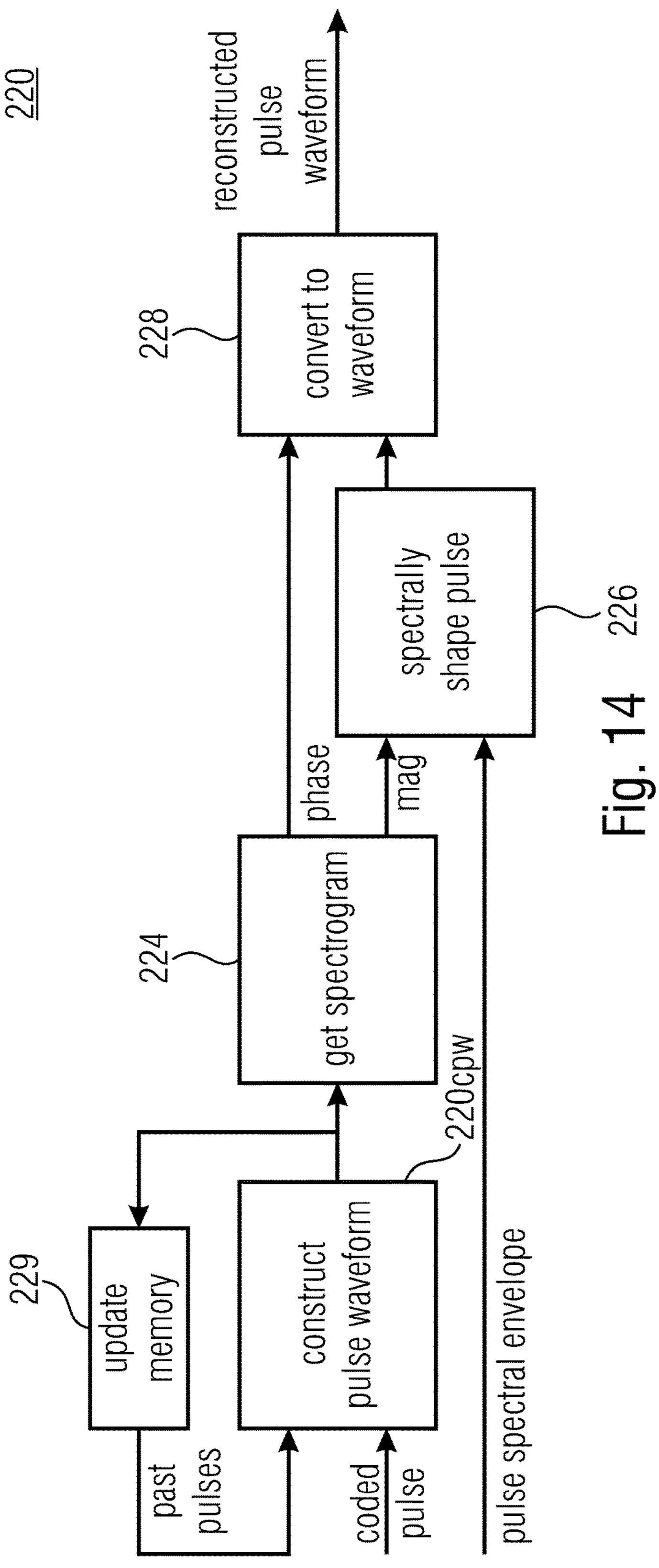
FIG. 14 shows a schematic block diagram of a pulse decoder according to further embodiments.

FIG. 14 shows an entity 220 for reconstructing a single pulse waveform. The below discussed approach for constructing a single pulse waveform is multiple times executed for multiple pulse waveforms. The multiple pulse waveforms are used by the entity 22' of FIG. 15 to reconstruct a waveform that includes the multiple pulses. From another point of view, the entity 220 processes signal consisting of a plurality of coded pulses and a plurality of pulse spectral envelopes and for each coded pulse and an associated pulse spectral envelope outputs single reconstructed pulse waveform, so that at the output of the entity 220 is a signal consisting of a plurality of the reconstructed pulse waveforms.

The entity 220 comprises a plurality of sub-entities, for example, the entity 220*cpw* for constructing spectrally flattened pulse waveform, an entity 224 for generating a pulse spectrogram (phase and magnitude spectrogram) of the spectrally flattened pulse waveform and an entity 226 for spectrally shaping the pulse magnitude spectrogram. This entity 226 uses a magnitude spectrogram as well as a pulse spectral envelope. The output of the entity 226 is fed to a converter for converting the pulse spectrogram to a waveform which is marked by the reference numeral 228. This entity 228 receives the phase spectrogram as well as the spectrally shaped pulse magnitude spectrogram, so as to reconstruct the pulse waveform. It should be noted, that the entity 220*cpw* (configured for constructing a spectrally flattened pulse waveform) receives at its input a signal describing a coded pulse. The constructor 220*cpw* comprises a kind of feedback loop including an update memory 229. This enables that the pulse waveform is constructed taking into account past pulses. Here the previously constructed pulse waveforms are fed back so that past pulses can be used by the entity 220cpw for constructing the next pulse waveform. Below, the functionality of this pulse reconstructor 220 will be discussed. To be noted that at the decoder side there are only the quantized flattened pulse waveforms (also named decoded flattened pulse waveforms or coded flattened pulse waveforms) and since there are no original pulse waveforms on the decoder side, we use the flattened pulse waveforms for naming the quantized flattened pulse waveforms at the decoder side and the pulse waveforms for naming the quantized pulse waveforms (also named decoded pulse waveforms or coded pulse waveforms or decoded pulse waveforms).

For reconstructing the pulses on the decoder side 220, the quantized flattened pulse waveforms are constructed (cf. entity 220*cpw*) after decoding the gains $$(g_{P_{P_i}} \text{ and } g_{I_{P_i}}),$$

impulses/innovation, prediction source $$(i_{P_{P_i}})$$

and offset $$(\Delta_{P_{P_i}}).$$

The memory 229 for the prediction is updated (in the same way as in the encoder in the entity 132*m*). The STFT (cf. entity 224) is then obtained for each pulse waveform. For example, the same 2 milliseconds long squared sine windows with 75% overlap are used as in the pulse extraction. The magnitudes of the STFT are reshaped using the decoded and smoothed spectral envelope and zeroed out below the pulse starting frequency $f_{P_i}$. Simple multiplication of magnitudes with the envelope may be used for shaping the STFT (cf. entity 226). The phases are not modified. Reconstructed waveform of the pulse is obtained from the STFT via the inverse DFT, windowing and overlap and add (cf. entity 228). Alternatively the envelope can be shaped via an FIR or some other filter, avoiding the STFT.

Figure 15:
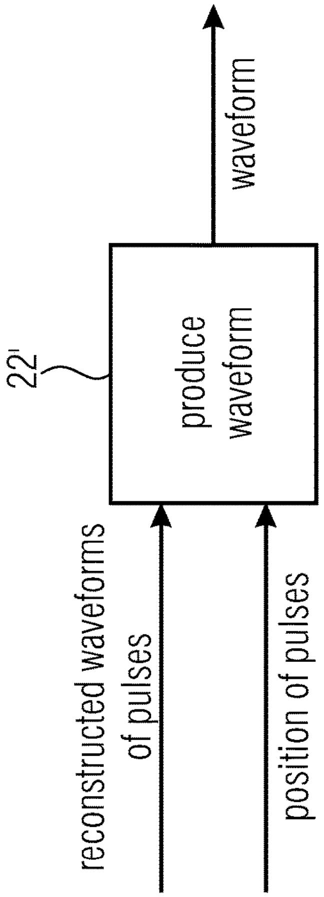
FIG. 15 shows a schematic block diagram of a pulse decoder according to further embodiments.

FIG. 15 shows the entity 22' subsequent to the entity 228 which receives a plurality of reconstructed waveforms of the pulses as well as the positions of the pulses so as to construct the waveform $y_P$ (cf. FIG. 2*a*, 2*c*). This entity 22' is used for example as the last entity within the waveform constructor 22 of 2*a* or 2*c*.

The reconstructed pulse waveforms are concatenated based on the decoded positions $t_{P_i}$, inserting zeros between the pulses in the entity 22' in FIG. 15. The concatenated waveform is added to the decoded signal (cf. 23 in FIG. 2*a* or FIG. 2*c* or 114*m* in FIG. 6). In the same manner the original pulse waveforms $x_{P_i}$ are concatenated (cf. in 114 in FIG. 6) and subtracted from the input of the MDCT based codec (cf. FIG. 6).

The reconstructed pulse waveforms are concatenated based on the decoded positions $t_{P_i}$, inserting zeros between the pulses. The concatenated waveform is added to the decoded signal. In the same manner the original pulse waveforms $x_{P_i}$ are concatenated and subtracted from the input of the MDCT based codec.

The reconstructed pulse waveform are not perfect representations of the original pulses. Removing the reconstructed pulse waveform from the input would thus leave some of the transient parts of the signal. As transient signals cannot be well presented with an MDCT codec, noise spread across whole frame would be present and the advantage of separately coding the pulses would be reduced. For this reason the original pulses are removed from the input.

According to embodiments the HF tonality flag $\phi_H$ may be defined as follows:

Normalized correlation $\rho_{HF}$ is calculate on $y_{MGF}$ between the samples in the current window and a delayed version with $\bar{d}_{F_0}$ (or $d_{Fcorrected}$) delay, where $y_{MHF}$ is a high-pass filtered version of the pulse residual signal $y_M$. For an example a high-pass filter with the crossover frequency around 6 kHz may be used.

$n_{HFTonalCurr} n_{HFTonal}=0.5 \cdot n_{HFTonal}+n_{HFTonalCurr}$ For each MDCT frequency bin above a specified frequency, it is determined, as in 5.3.3.2.5 of [18], if the frequency bin is tonal or noise like. The total number of tonal frequency bins is calculated in the current frame and additionally smoothed total number of tonal frequencies is calculated as.

HF tonality flag $\phi_H$ is set to 1 if the TNS is inactive and the pitch contour is present and there is tonality in high frequencies, where the tonality exists in high frequencies if $\rho_{HF}>0$ or $n_{HFTonal}>1$.

Figure 16:
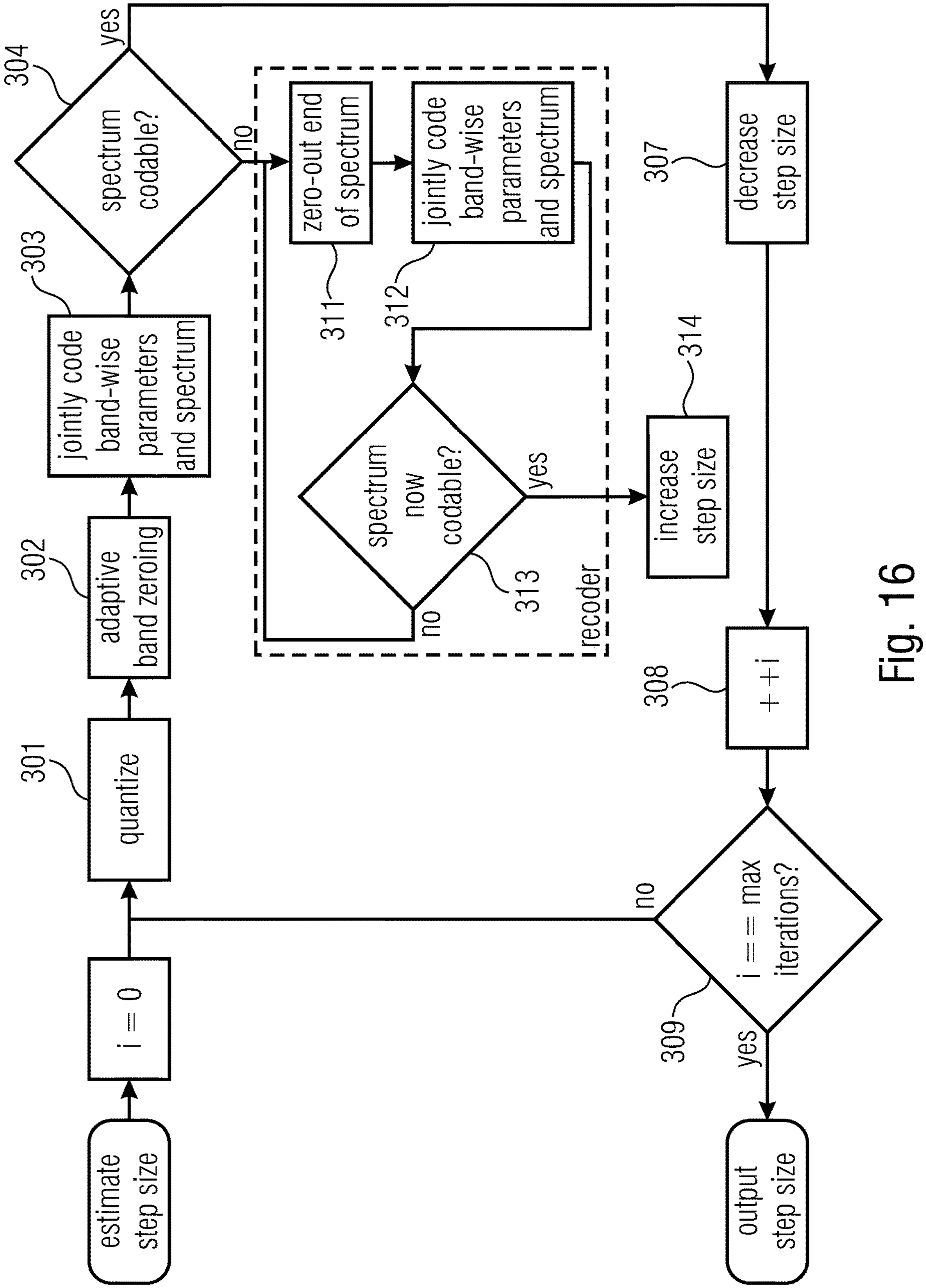
FIG. 16 shows a schematic flowchart illustrating the principle of estimating a step size using the block IBPC according to embodiments.

With respect to FIG. 16 the iBPC approach is discussed. The process of obtaining the optimal quantization step size $g_{Qo}$ will be explained now. The process may be an integral part of the block iBPC. Note iBPC of FIG. 16 outputs $g_{Qo}$ based on $X_{MR}$. In another apparatus $X_{MR}$ and $g_{Qo}$ may be used as input (for details cf. FIG. 3).

FIG. 16 shows a flow chart of an approach for estimating a step size. The process starts,with i=0 wherein then for example four steps of quantize, adaptive band zeroing, determining jointly band-wise parameters and spectrum and determine whether the spectrum is codeable are performed. These steps are marked by the reference numerals 301 to 304. In case the spectrum is codeable the step size is decreased (cf. step 307) a next iteration ++i is performed cf. reference numeral 308. This is performed as long as i is not equal to the maximum iteration (cf. decision step 309). In case the maximum iteration is achieved the step size is output. In case the maximum iterations are not achieved the next iteration is performed.

In case, the spectrum is not codeable, the process having the steps 311 and 312 together with the verifying step (spectrum now codebale) 313 is applied. After that the step size is increased (cf. 340) before initiating the next iteration (cf. step 308).

A spectrum $X_{MR}$, which spectral envelope is perceptually flattened, is scalar quantized using single quantization step size $g_Q$ across the whole coded bandwidth and entropy coded for example with a context based arithmetic coder producing a coded spect. The coded spectrum bandwidth is divided into sub-bands $B_i$ of increasing width $L_{B_i}$.

The optimal quantization step size $g_{Qo}$, also called global gain, is iteratively found, explained above in the explanation of the FIG. 16.

In each iteration the spectrum $X_{MR}$ is quantized in the block Quantize to produce $X_{Q1}$. In the block "Adaptive band zeroing" a ratio of the energy of the zero quantized lines and the original energy is calculated in the sub-bands $B_i$ and if the energy ratio is above an adaptive threshold $\tau_{B_i}$, the whole sub-band in $X_{Q1}$ is set to zero. The thresholds $\tau_{B_i}$ are calculated based on the tonality flag $\phi_H$ and flags $$\grave{\phi}_{N_{B_i}},$$

where the flags $$\grave{\phi}_{N_{B_i}}$$

indicate if a sub-band was zeroed-out in the previous frame:

$$\tau_{B_i} = \frac{1 + \left(\frac{1}{2} - \grave{\phi}_{N_{B_i}}\right)\phi_H}{2}$$

For each zeroed-out sub-band a flag $$\phi_{N_{B_i}}$$

is set to one. At the end of processing the current frame, $$\phi_{N_{B_i}}$$

are copied to $$\grave{\phi}_{N_{B_i}}.$$

Alternatively there could be more than one tonality flag and a mapping from the plurality of the tonality flags into tonality of each sub-band, producing a tonality value for each sub-band $$\phi_{H_{B_i}}.$$

The values of $\tau_{B_i}$ may for example have a value from a set of values {0.25, 0.5, 0.75}. Alternatively other decision may be used to decide based on the energy of the zero quantized lines and the original energy and on the contents $X_{Q1}$ and $X_{MR}$ of whether to set the whole sub-band i in $X_{Q1}$ to zero.

A frequency range where the adaptive band zeroing is used may be restricted above a certain frequency $f_{ABZStart}$, for example 7000 Hz, extending the adaptive band zeroing as long, as the lowest sub-band is zeroed out, down to a certain frequency $f_{ABZMin}$, for example 700 Hz.

The individual zero filling levels (individual zfl) of sub-bands of $X_{Q1}$ above $f_{EZ}$, where $f_{EZ}$ is for an example 3000 Hz that are completely zero is explicitly coded and additionally one zero filling level ($zfl_{small}$) for all zero sub-bands bellow $f_{EZ}$ and all zero sub-bands above $f_{EZ}$ quantized to zero is coded. A sub-band of $X_{Q1}$ may be completely zero because of the quantization in the block Quantize even if not explicitly set to zero by the adaptive band zeroing. The required number of bits for the entropy coding of the zero filling levels (zfl consisting of the individual zfl and the $zfl_{small}$) and the spectral lines in $X_{Q1}$ is calculated. Additionally the number of spectral lines $N_Q$ that can be explicitly coded with the available bit budget is found. $N_Q$ is an integral part of the coded spect and is used in the decoder to find out how many bits are used for coding the spectrum lines; other methods for finding the number of bits for coding the spectrum lines may be used, for example using special EOF character. As long as there is not enough bits for coding all non-zero lines, the lines in $X_{Q1}$ above $N_Q$ are set to zero and the required number of bits is recalculated.

For the calculation of the bits needed for coding the spectral lines, bits needed for coding lines starting from the bottom are calculated. This calculation is needed only once as the recalculation of the bits needed for coding the spectral lines is made efficient by storing the number of bits needed for coding n lines for each $n \leq N_Q$.

In each iteration, if the required number of bits exceeds the available bits, the global gain is decreased (307), otherwise it is increased (314). In each iteration the speed of the global gain change is adapted. The same modification as in the rate-distortion loop from the EVS may be used to iteratively modify the global gain. At the end of the iteration process, the optimal quantization step size $g_{Qo}$ is equal to $g_Q$ that produces optimal coding of the spectrum, for example using the criteria from the EVS.

Instead of an actual coding, an estimation of maximum number of bits needed for the coding may be used. The output of the iterative process is the optimal quantization step size $g_{Qo}$; the output may also contain the coded spect and the coded noise filling levels (zfl), as they are usually already available, to avoid repetitive processing in obtaining them again.

Below, the zero-filling will be discussed in detail.

According to embodiments, the block "Zero Filling" will be explained now, starting with an example of a way to choose the source spectrum.

For creating the zero filling, following parameters are adaptively found:

an optimal long copy-up distance $\dot{d}_C$ a minimum copy-up distance $\check{d}_C$ a minimum copy-up source start $\check{s}_C$ a copy-up distance shift $\Delta_C$ The optimal copy-up distance $\dot{d}_C$ determines the optimal distance if the source spectrum is the already obtained lower part of $X_{CT}$. The value of $\dot{d}_C$ is between the minimum $\dot{d}_{\check{C}}$, that is for an example set to an index corresponding to 5600 Hz, and the maximum $\dot{d}_{\hat{C}}$, that is for an example set to an index corresponding to 6225 Hz. Other values may be used with a constraint $\dot{d}_{\check{C}} < \dot{d}_{\hat{C}}$.

The distance between harmonics $$\Delta_{X_{F_0}}$$

is calculated from an average pitch lag $\bar{d}_{F_0}$, where the average pitch lag $\bar{d}_{F_0}$ is decoded from the bit-stream or deduced from parameters from the bit-stream (e.g. pitch contour). Alternatively $$\Delta_{X_{F_0}}$$

may be obtained by analyzing $X_{DT}$ or a derivative of it (e.g. from a time domain signal obtained using $X_{DT}$). The distance between harmonics $$\Delta_{X_{F_0}}$$

is not necessarily an integer. If $\bar{d}_{F_0}=0$ then $$\Delta_{X_{F_0}}$$

is set to zero, where zero is a way of signaling that there is no meaningful pitch lag.

The value of $$d_{C_{F_0}}$$

is the minimum multiple of the harmonic distance $$\Delta_{X_{F_0}}$$

larger than the minimal optimal copy-up distance $\dot{d}_{\check{C}}$:

$$d_{C_{F_0}} = \left\lfloor \Delta_{X_{F_0}} \left\lceil \frac{\dot{d}_{\check{C}}}{\Delta_{X_{F_0}}} \right\rceil + 0.5 \right\rfloor$$

If $$\Delta_{X_{F_0}}$$

is zero then $$d_{C_{F_0}}$$

is not used.

The starting TNS spectrum line plus the TNS order is denoted as $i_T$, it can be for example an index corresponding to 1000 Hz.

If TNS is inactive in the frame $i_{C_S}$ is set to $$\lfloor 2.5\Delta_{X_{F_0}} \rfloor.$$

If TNS is active $i_{C_S}$ is set to $i_T$, additionally lower bound by $$\lfloor 2.5\Delta_{X_{F_0}} \rfloor$$

if HFs are tonal (e.g. if $\phi_H$ is one).

Magnitude spectrum $Z_C$ is estimated from the decoded spect $X_{DT}$:

$$Z_C[n] = \sqrt{\sum_{m=-2}^{2} (X_{DT}[n+m])^2}$$

A normalized correlation of the estimated magnitude spectrum is calculated:

$$\rho_C[n] = \frac{\sum_{m=0}^{L_C-1} Z_C[i_{C_S}+m] Z_C[i_{C_S}+n+m]}{\sqrt{\left(\sum_{m=0}^{L_C-1} Z_C[i_{C_S}+m] Z_C[i_{C_S}+m]\right)\left(\sum_{m=0}^{L_C-1} Z_C[i_{C_S}+n+m] Z_C[i_{C_S}+n+m]\right)}}, \dot{d}_{\check{C}} \le n \le \dot{d}_{\hat{C}}$$

The length of the correlation $L_C$ is set to the maximum value allowed by the available spectrum, optionally limited to some value (for example to the length equivalent of 5000 Hz).

Basically we are searching for n that maximizes the correlation between the copy-up source $Z_C[i_{C_S}+m]$ and the destination $Z_C[i_{C_S}+n+m]$, where $0 \le m < L_C$.

We choose $d_{C_\rho}$ among n ($\dot{d}_{\check{C}} \le n \le \dot{d}_{\hat{C}}$) where $\rho_C$ has the first peak and is above mean of $\rho_C$, that is: $\rho_C[d_{C_\rho}-1] \le \rho_C[d_{C_\rho}] \le \rho_C[d_{C_\rho}+1]$ and $$\rho_C[d_{C_\rho}] \ge \frac{\sum_n \rho_C[n]}{\dot{d}_{\hat{C}} - \dot{d}_{\check{C}}}$$

and for every $m \le d_{C_\rho}$ it is not fulfilled that $\rho_C[m-1] \le \rho_C[m] \le \rho_C[m+1]$. In other implementation we can choose $d_{C_\rho}$ so that it is an absolute maximum in the range from $\dot{d}_{\check{C}}$ to $\dot{d}_{\hat{C}}$. Any other value in the range from $\dot{d}_{\check{C}}$ to $\dot{d}_{\hat{C}}$ may be chosen for $d_{C_\rho}$, where an optimal long copy up distance is expected.

If the TNS is active we may choose $\dot{d}_C = d_{C_\rho}$.

If the TNS is inactive $$\dot{d}_C = \mathcal{F}_C\left(\rho_C, d_{C_\rho}, d_{C_{F_0}}, \grave{d}_C, \grave{\rho}_C\left[\grave{d}_C\right], \Delta_{\bar{d}_{F_0}}, \grave{\phi}_{T_C}\right),$$

where $\grave{\rho}_C$ is the normalized correlation and $\grave{d}_C$ the optimal distance in the previous frame. The flag $\grave{\phi}_{T_C}$ indicates if there was change of tonality in the previous frame. The function $\mathcal{F}_C$ returns either $$d_{C_\rho}, d_{C_{F_0}} \grave{d}_C.$$

The decision which value to return in $\mathcal{F}_C$ is primarily based on the values $$\rho_C[d_{C_\rho}], \rho_C\left[d_{C_{F_0}}\right]$$

and $\rho_C[\grave{d}_C]$. If the flag $\grave{\phi}_{T_C}$ is true and $$\rho_C[d_{C_\rho}] \text{ or } \rho_C\left[d_{C_{F_0}}\right]$$

are valid then $\rho_C[\grave{d}_C]$ is ignored. The values of $\grave{\rho}_C[\grave{d}_C]$ and $$\Delta_{\bar{d}_{F_0}}$$

are used in rare cases.

In an example $\mathcal{F}_C$ could be defined with the following decisions:

$d_{C_\rho}$ is returned if $\rho_C[d_{C_\rho}]$ is larger than $$\rho_C\left[d_{C_{F_0}}\right]$$

for at least $$\tau_{d_{C_{F_0}}}$$

and larger than $\rho_C[\grave{d}_C]$ for at least $\tau_{\grave{d}_C}$, where $$\tau_{d_{C_{F_0}}}$$

and $\tau_{\grave{d}_C}$ are adaptive thresholds that are proportional to the $$\left|d_{C_\rho} - d_{C_{F_0}}\right|$$

and $|d_{C_\rho} - \grave{d}_C|$ respectively. Additionally it may be requested that $\rho_C[d_{C_\rho}]$ is above some absolute threshold, for an example 0.5 otherwise $$d_{C_{F_0}}$$

is returned if $$\rho_C\left[d_{C_{F_0}}\right]$$

is larger than $\rho_C[\grave{d}_C]$ for at least a threshold, for example 0.2 otherwise $d_{C_\rho}$ is returned if $\grave{\phi}_{T_C}$ is set and $\rho_C[d_{C_\rho}]>0$ otherwise $$d_{C_{F_0}}$$

is returned if $\grave{\phi}_{T_C}$ is set and the value of $$d_{C_{F_0}}$$

is valid, that is if there is a meaningful pitch lag otherwise $$d_{C_{F_0}}$$

is returned if $\grave{\rho}_C[\grave{d}_C]$ is small, for example below 0.1, and the value of $$d_{C_{F_0}}$$

is valid, that is if there is a meaningful pitch lag, and the pitch lag charge from the previous frame is small otherwise $\grave{d}_C$ is returned The flag $\grave{\phi}_{T_C}$ is set to true if TNS is active or if $\rho_C[\dot{d}_C]<\tau_{T_C}$ and the tonality is low, the tonality being low for an example if $\phi_H$ is false or if $\bar{d}_{F_0}$ is zero. $\tau_{T_C}$ is a value smaller than 1, for example 0.7. The value set to $\grave{\phi}_{T_C}$ is used in the following frame.

The percentual change of $\bar{d}_{F_0}$ between the previous frame and the current frame $$\Delta_{\bar{d}_{F_0}}$$

is also calculated.

The copy-up distance shift $\Delta_C$ is set to $$\Delta_{X_{F_0}}$$

unless the optimal copy-up distance $\dot{d}_C$ is equivalent to $\grave{d}_C$ and $$\Delta_{\bar{d}_{F_0}} < \tau_{\Delta_F}$$

($\tau_{\Delta_F}$ being a predefined threshold), in which case $\Delta_C$ is set to the same value as in the previous frame, making it constant over the consecutive frames.

$$\Delta_{\bar{d}_{F_0}}$$

is a measure of change (e.g. a percentual change) of $\bar{d}_{F_0}$ between the previous frame and the current frame. $\tau_{\Delta_F}$ could be for example set to 0.1 if $$\Delta_{\bar{d}_{F_0}}$$

is the perceptual change of $\bar{d}_{F_0}$. If TNS is active in the frame $\Delta_C$ is not used.

The minimum copy up source start $\check{s}_C$ can for an example be set to $i_T$ if the TNS is active, optionally lower bound by $$\left\lfloor 2.5\Delta_{X_{F_0}} \right\rfloor$$

if HFs are tonal, or for an example set to $\lfloor 2.5\Delta_C \rfloor$ if the TNS is not active in the current frame.

The minimum copy-up distance $\check{d}_C$ is for an example set to $\lceil \Delta_C \rceil$ if the TNS is inactive. If TNS is active, $\check{d}_C$ is for an example set to $\check{s}_C$ if HF are not tonal, or $\check{d}_C$ is set for an example to $$\left\lceil \Delta_{X_{F_0}} \left\lceil \frac{\check{s}_C}{\Delta_{X_{F_0}}} \right\rceil \right\rceil$$

if HFs are tonal.

Using for example $X_N[-1]=\Sigma_n 2n|X_D[n]|$ as an initial condition, a random noise spectrum $X_N$ is constructed as $X_N[n]=\text{short}(31821X_N[n-1]+13849)$, where the function short truncates the result to 16 bits. Any other random noise generator and initial condition may be used. The random noise spectrum $X_N$ is then set to zero at the location of non-zero values in $X_D$ and optionally the portions in $X_N$ between the locations set to zero are windowed, in order to reduce the random noise near the locations of non-zero values in $X_D$.

For each sub-band $B_i$ of length $L_{B_i}$ starting at $j_{B_i}$ in $X_{CT}$ a source spectrum for $$X_{S_{B_i}}$$

is found. The sub-band division may be the same as the sub-band division used for coding the zfl, but also can be different, higher or lower.

For an example if TNS is not active and HFs are not tonal then the random noise spectrum $X_N$ is used as the source spectrum for all sub-bands. In another example $X_N$ is used as the source spectrum for the sub-bands where other sources are empty or for some sub-bands which start below minimal copy-up destination: $\check{s}_C+\min(\check{d}_C, L_{B_i})$.

In another example if the TNS is not active and HFs are tonal, a predicted spectrum $X_{NP}$ may be used as the source for the sub-bands which start below $\check{s}_C+\dot{d}_C$ and in which $E_B$ is at least 12 dB above $E_B$ in neighboring sub-bands, where the predicted spectrum is obtained from the past decoded spectrum or from a signal obtained from the past decoded spectrum (for example from the decoded TD signal).

For cases not contained in the above examples, distance $d_C$ may be found so that $X_{CT}[s_C+m](0 \le m < L_{B_i})$ or a mixture of the $X_{CT}[s_C+m]$ and $X_N[s_C+d_C+m]$ may be used as the source spectrum for $$X_{S_{B_i}}$$

that starts at $j_{B_i}$, where $s_C=j_{B_i}-d_C$. In one example if the TNS is active, but starts only at a higher frequency (for example at 4500 Hz) and HFs are not tonal, the mixture of the $X_{CT}[s_C+m]$ and $X_N[s_C+d_C+m]$ may be used as the source spectrum if $\check{s}_C+\check{d}_C \le j_{B_i} < \check{s}_C+\dot{d}_C$; in yet another example only $X_{CT}[s_C+m]$ or a spectrum consisting of zeros may be used as the source. If $j_{B_i} \ge \check{s}_C+\dot{d}_C$ then $d_C$ could be set to $\dot{d}_C$. If the TNS is active then a positive integer n may be found so that $$j_{B_i} - \frac{d_C}{n} \ge \check{s}_C$$

and $d_C$ may be set to $$\frac{\dot{d}_C}{n},$$

for example to the smallest such integer n. If the TNS is not active, another positive integer n may be found so that $j_{B_i}-\dot{d}_C+n \cdot \Delta_C \ge \check{s}_C$ and $d_C$ is set to $\dot{d}_C-n \cdot \Delta_C$, for example to the smallest such integer n.

In another example the lowest sub-bands $$X_{S_{B_i}}$$

in $X_S$ up to a starting frequency $f_{ZFStart}$ may be set to 0, meaning that in the lowest sub-bands $X_{CT}$ may be a copy of $X_{DT}$.

An example of weighting the source spectrum based on $E_B$ in the block "Zero Filling" is given now.

In an example of smoothing the $E_B$, $E_{B_i}$ may be obtained from the zfl, each $E_{B_i}$ corresponding to a sub-band i in $E_B$. $E_{B_i}$ are then smoothed:

$$E_{B_{1,i}} = \frac{E_{B_{i-1}} + 7E_{B_i}}{8} \text{ and } E_{B_{2,i}} = \frac{7E_{B_i} + E_{B_{i+1}}}{8}.$$

The scaling factor $a_{C_i}$ is calculated for each sub-band $B_i$ depending on the source spectrum:

$$a_{C_i} = g_Q \sqrt{\frac{L_{B_i}}{\sum_{m=0}^{L_{B_i}-1} \left(X_{S_{B_i}}[m]\right)^2}}$$

Additionally the scaling is limited with the factor $b_{C_i}$ calculated as:

$$b_{C_i} = \frac{2}{\max\left(2,\, a_{C_i} \cdot E_{B_{1,i}},\, a_{C_i} \cdot E_{B_{2i}}\right)}$$

The source spectrum band $$X_{S_{B_i}}[m]\left(0 \le m < L_{B_i}\right)$$

is split in two halves and each half is scaled, the first half with $g_{C_{1,i}}=b_{C_i} \cdot a_{C_i} \cdot E_{B_{1,i}}$ and the second with $g_{C_{2,i}}=b_{C_i} \cdot a_{C_i} \cdot E_{B_{2,i}}$. The scaled source spectrum band $$X_{S_{B_i}},$$

where the scaled source spectrum band is $$X_{G_{B_i}},$$

is added to $X_{DT}[j_{B_i}+m]$ to obtain $X_{CT}[j_{B_i}+m]$.

An example of quantizing the energies of the zero quantized lines (as a part of iBPC) is given now.

$X_{QZ}$ is obtained from $X_{MR}$ by setting non-zero quantized lines to zero. For an example the same way as in $X_N$, the values at the location of the non-zero quantized lines in $X_Q$ are set to zero and the zero portions between the non-zero quantized lines are windowed in $X_{MR}$, producing $X_{QZ}$.

The energy per band i for zero lines ($E_{Z_i}$) are calculated from $X_{QZ}$:

$$E_{Z_i} = \frac{1}{g_Q} \sqrt{\frac{\sum_{m=j_{B_i}}^{j_{B_i}+L_{B_i}-1} (X_{QZ}[m])^2}{L_{B_i}}}$$

The $E_{Z_i}$ are for an example quantized using step size $\frac{1}{8}$ and limited to $\frac{6}{8}$. Separate $E_{Z_i}$ are coded as individual zfl only for the sub-bands above $f_{EZ}$, where $f_{EZ}$ is for an example 3000 Hz, that are completely quantized to zero. Additionally one energy level $E_{Z_S}$ is calculated as the mean of all $E_{Z_i}$ from zero sub-bands bellow $f_{EZ}$ and from zero sub-bands above $f_{EZ}$ where $E_{Z_i}$ is quantized to zero, zero sub-band meaning that the complete sub-band is quantized to zero. The low level $E_{Z_S}$ is quantized with the step size $\frac{1}{16}$ and limited to $\frac{3}{16}$. The energy of the individual zero lines in non-zero sub-bands is estimated and not coded explicitly.

Long Term Prediction (LTP)

The block LTP 164 will be explained now.

Figure 17A:
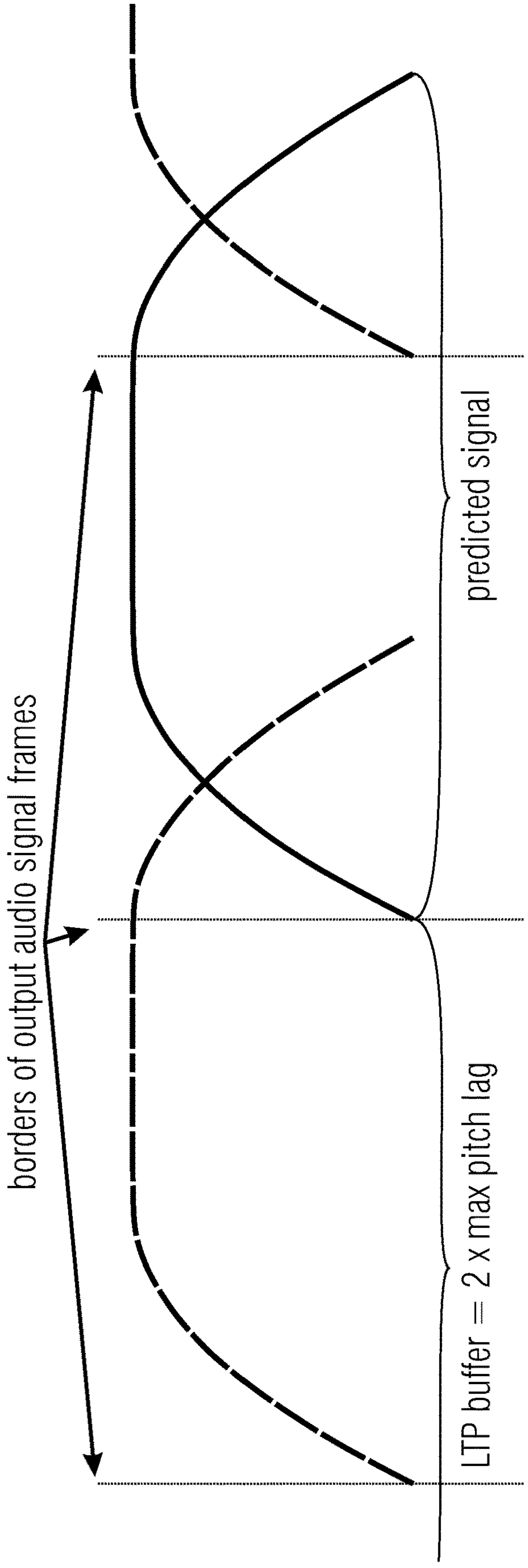
FIGS. 17*a*-17*d* show schematic diagrams for illustrating the principle of long-term prediction according to embodiments.

The time-domain signal $y_C$ is used as the input to the LTP, where $y_C$ is obtained from $X_C$ as output of IMDCT. IMDCT consists of the inverse MDCT, windowing and the Overlap-and-Add. The left overlap part and the non-overlapping part of $y_C$ in the current frame is saved in the LTP buffer. The LTP buffer is used in the following frame in the LTP to produce the predicted signal for the whole window of the MDCT. This is illustrated by FIG. 17*a*.

Figure 17B:
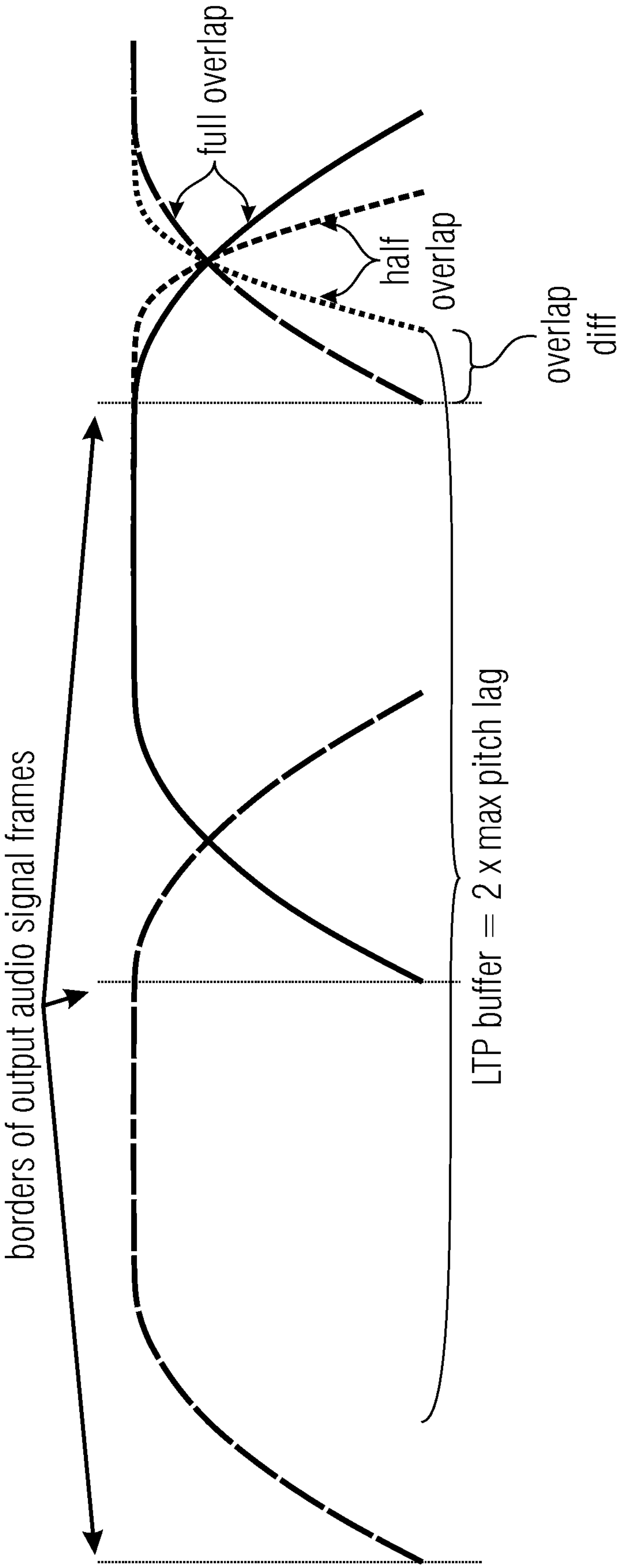

If a shorter overlap, for example half overlap, is used for the right overlap in the current window, then also the non-overlapping part "overlap diff" is saved in the LTP buffer. Thus, the samples at the position "overlap diff" (cf. FIG. 17*b*) will also be put into the LTP buffer, together with the samples at the position between the two vertical lines before the "overlap diff". The non-overlapping part "overlap diff" is not in the decoder output in the current frame, but only in the following frame (cf. FIGS. 17*b* and 17*c*).

If a shorter overlap is used for the left overlap in the current window, the whole non-overlapping part up to the start of the current window is used as a part of the LTP buffer for producing the predicted signal.

Figure 17C:
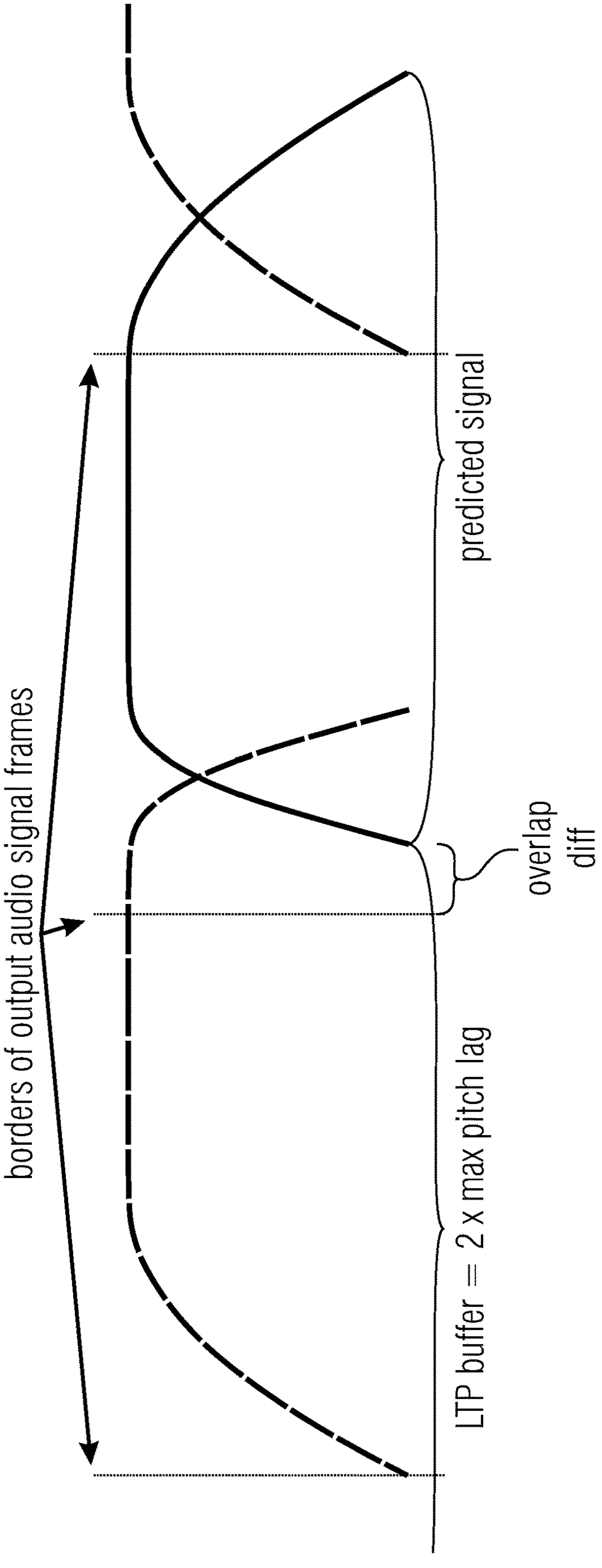
Figure 17D:
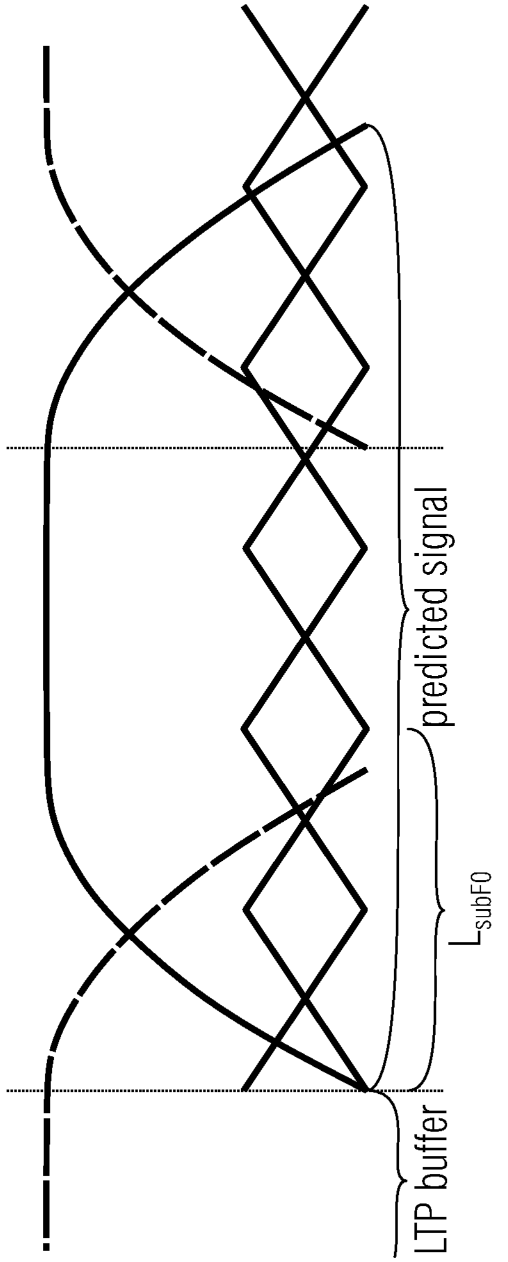

The predicted signal for the whole window of the MDCT is produced from the LTP buffer. The time interval of the window length is split into overlapping sub-intervals of length $L_{subF0}$ with the hop size $L_{updateF0}=L_{subF0}/2$. Other hop sizes and relations between the sub-interval length and the hop size may be used. The overlap length may be $L_{updateF0}-L_{subF0}$ or smaller. $L_{subF0}$ is chosen so that no significant pitch change is expected within the sub-intervals. In an example $L_{updateF0}$ is an integer closest to $\bar{d}_{F_0}/2$, but not greater than $\bar{d}_{F_0}/2$, and $L_{subF0}$ is set to $2L_{updateF0}$. As illustrated by FIG. 17*d*. In another example it may be additionally requested that the frame length or the window length is divisible by $L_{updateF0}$.

Below, an example of "calculation means (1030) configured to derive sub-interval parameters from the encoded pitch parameter dependent on a position of the sub-intervals within the interval associated with the frame of the encoded audio signal" and also an example of "parameters are derived from the encoded pitch parameter and the sub-interval position within the interval associated with the frame of the encoded audio signal" will be given. For each sub-interval pitch lag at the center of the sub-interval $i_{subCenter}$ is obtained from the pitch contour. In the first step, the sub-interval pitch lag $d_{subF0}$ is set to the pitch lag at the position of the sub-interval center $d_{contour}[i_{subCenter}]$. As long as the distance of the sub-interval end to the window start ($i_{subCenter}+L_{subF0}/2$) is bigger than $d_{subF0}$, $d_{subF0}$ is increased for the value of the pitch lag from the pitch contour at position $d_{subF0}$ to the left of the sub-interval center, that is $d_{subF0}=d_{subF0}+d_{contour}[i_{subCenter}-d_{subF0}]$ until $i_{subCenter}+L_{subF0}/2<d_{subF0}$. The distance of the sub-interval end to the window start ($i_{subCenter}+L_{subF0}/2$) may also be termed the sub-interval end.

In each sub-interval the predicted signal is constructed using the LTP buffer and a filter with the transfer function $H_{LTP}(z)$, where:

$$H_{LTP}(z)=B(z,T_{fr})z^{-T_{int}}$$

where $T_{int}$ is the integer part of $d_{subF0}$, that is $T_{int}=\lfloor d_{subF0}\rfloor$, and $T_{fr}$ is the fractional part of $d_{subF0}$, that is $T_{fr}=d_{subF0}-T_{int}$, and $B(z, T_{fr})$ is a fractional delay filter. $B(z, T_{fr})$ may have a low-pass characteristics (or it may de-emphasize the high frequencies). The prediction signal is then cross-faded in the overlap regions of the sub-intervals. $H_{LTP2}(z)$ Alternatively the predicted signal can be constructed using the method with cascaded filters as described in [19], with zero input response (ZIR) of a filter based on the filter with the transfer function and the LTP buffer used as the initial output of the filter, where:

$$H_{LTP2}(z)=\frac{1}{1-gB(z,T_{fr})z^{-T_{int}}}$$

Examples for $B(z, T_{fr})$:

$$B\left(z,\frac{0}{4}\right)=0.0000z^{-2}+0.2325z^{-1}+0.5349z^{0}+0.2325z^{1}$$

$$B\left(z,\frac{1}{4}\right)=0.0152z^{-2}+0.3400z^{-1}+0.5094z^{0}+0.1353z^{1}$$

$$B\left(z,\frac{2}{4}\right)=0.0609z^{-2}+0.4391z^{-1}+0.4391z^{0}+0.0609z^{1}$$

$$B\left(z,\frac{3}{4}\right)=0.1353z^{-2}+0.5094z^{-1}+0.3400z^{0}+0.0152z^{1}$$

In the examples $T_{fr}$ is usually rounded to the nearest value from a list of values and for each value in the list the filter B is predefined.

The predicted signal XP* is windowed, with the same window as the window used to produce $X_M$, and transformed via MDCT to obtain $X_P$.

Below, an example of means for modifying the predicted spectrum, or a derivative of the predicted spectrum, dependent on a parameter derived from the encoded pitch parameter will be given. The magnitudes of the MDCT coefficients at least $n_{Fsafeguard}$ away from the harmonics in $X_P$ are set to zero (or multiplied with a positive factor smaller than 1), where $n_{Fsafeguard}$ is for example 10. Alternatively other windows than the rectangular window may be used to reduce the magnitudes between the harmonics. It is considered that the harmonics in $X_P$ are at bin locations that are integer multiples of $iF0=2L_M/\bar{d}_{F_{corrected}}$, where $L_M$ is $X_P$ length and $\bar{d}_{F_{corrected}}$ is the average corrected pitch lag. The harmonic locations are $\lfloor n\cdot iF0\rfloor$. This removes noise between harmonics, especially when the half pitch lag is detected.

The spectral envelope of $X_P$ is perceptually flattened with the same method as $X_M$, for example via $SNS_E$, to obtain $X_{PS}$.

Below an example of "a number of predictable harmonics is determined based on the coded pitch parameter is given. Using $X_{PS}$, $X_{MS}$ and $\bar{d}_{F_{corrected}}$ the number of predictable harmonics $n_{LTP}$ is determined. $n_{LTP}$ is coded and transmitted to the decoder. Up to $N_{LTP}$ harmonics may be predicted, for example $N_{LTP}=8$. $X_{PS}$ and $X_{MS}$ are divided into $N_{LTP}$ bands of length $\lfloor iF0+0.5\rfloor$, each band starting at $\lfloor(n-0.5)iF0\rfloor$, $n\in\{1, \ldots, N_{LTP}\}$. $n_{LTP}$ is chosen so that for all $n\le n_{LTP}$ the ratio of the energy of $X_{MS}-X_{PS}$ and $X_{MS}$ is below a threshold $\tau_{LTP}$, for example $\tau_{LTP}=0.7$. If there is no such n, then $n_{LTP}=0$ and the LTP is not active in the current frame. It is signaled with a flag if the LTP is active or not. Instead of $X_{PS}$ and $X_{MS}$, $X_P$ and $X_M$ may be used. Instead of $X_{PS}$ and $X_{MS}$, $X_{PS}$ and $X_{MT}$ may be used. Alternatively, the number of predictable harmonics may be determined based on a pitch contour $d_{contour}$.

If the LTP is active then first $\lfloor(n_{LTP}+0.5)iF0\rfloor$ coefficients of $X_{PS}$, except the zeroth coefficient, are subtracted from $X_{MT}$ to produce $X_{MR}$. The zeroth and the coefficients above $\lfloor(n_{LTP}+0.5)iF0\rfloor$ are copied from $X_{MT}$ to $X_{MR}$.

In a process of a quantization, $X_Q$ is obtained from $X_{MR}$, and $X_Q$ is coded as spect, and by decoding $X_D$ is obtained from spect.

Below, an example of a combiner (157) configured to combine at least a portion of the prediction spectrum ($X_P$) or a portion of the derivative of the predicted spectrum ($X_{PS}$)

with the error spectrum ($X_D$) will be given. If the LTP is active then first $\lfloor(n_{LTP}+0.5)iF0\rfloor$ coefficients of $X_{PS}$, except the zeroth coefficient, are added to $X_D$ to produce $X_{DT}$. The zeroth and the coefficients above $\lfloor(n_{LTP}+0.5)iF0\rfloor$ are copied from $X_D$ to $X_{DT}$. The "$\lfloor\ \rfloor$" indicates the use of the floor function.

Below, the optional features of harmonic post-filtering will be discussed.

A time-domain signal $y_C$ is obtained from $X_C$ as output of IMDCT where IMDCT consists of the inverse MDCT, windowing and the Overlap-and-Add. A harmonic post-filter (HPF) that follows pitch contour is applied on $y_C$ to reduce noise between harmonics and to output $y_H$. Instead of $y_C$, a combination of $y_C$ and a time domain signal $y_P$, constructed from the decoded pulse waveforms, may be used as the input to the HPF.

Figure 18A:
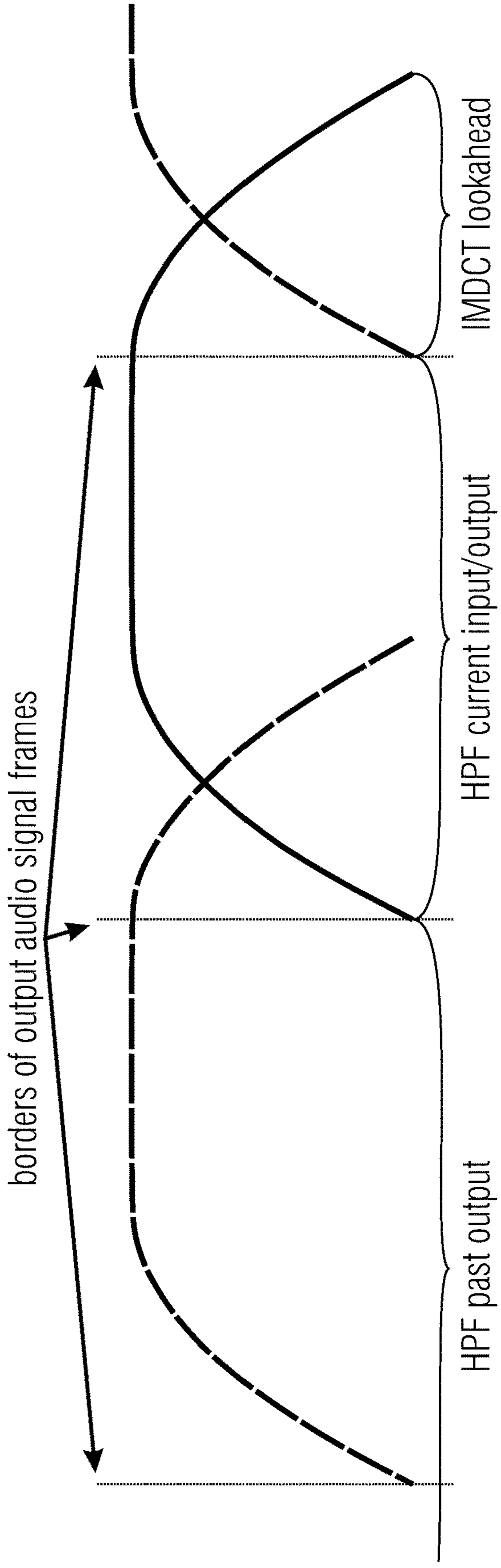
FIGS. 18*a*-18*d* show schematic diagrams for illustrating the principle of harmonic post-filtering according to further embodiments.

The HPF input for the current frame k is $y_C[n](0\le n<N)$. The past output samples $y_H[n]$ $(-d_{HPFmax}\le n<0$, where $d_{HPFmax}$ is at least the maximum pitch lag) are also available. $N_{ahead}$ IMDCT look-ahead samples are also available, that may include time aliased portions of the right overlap region of the inverse MDCT output. We show an example where an time interval on which HPF is applied is equal to the current frame, but different intervals may be used. The location of the HPF current input/output, the HPF past output and the IMDCT look-ahead relative to the MDCT/IMDCT windows is illustrated by FIG. 18*a* showing also the overlapping part that may be added as usual to produce Overlap-and-Add.

If it is signaled in the bit-stream that the HPF should use constant parameters, a smoothing is used at the beginning of the current frame, followed by the HPF with constant parameters on the remaining of the frame. Alternatively, a pitch analysis may be performed on $y_C$ to decide if constant parameters should be used. The length of the region where the smoothing is used may be dependent on pitch parameters.

Figure 18B:
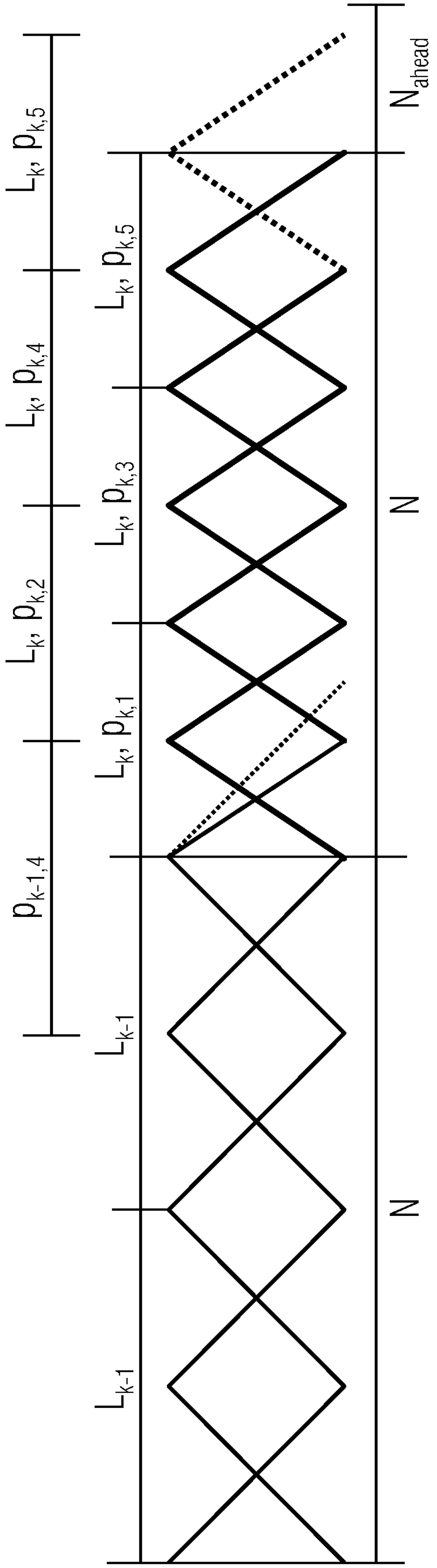

When constant parameters are not signaled, the HPF input is split into overlapping sub-intervals of length $L_k$ with the hop size $L_{k,update}=L_k/2$. Other hop sizes may be used. The overlap length may be $L_{k,update}-L_k$ or smaller. $L_k$ is chosen so that no significant pitch change is expected within the sub-intervals. In an example $L_{k,update}$ is an integer closest to pitch_mid/2, but not greater than pitch_mid/2, and $L_k$ is set to $2L_{k,update}$. Instead of pitch_mid some other values may be used, for example mean of pitch_mid and pitch_start or a value obtained from a pitch analysis on $y_C$ or for example an expected minimum pitch lag in the interval for signals with varying pitch. Alternatively a fixed number of sub-intervals may be chosen. In another example it may be additionally requested that the frame length is divisible by $L_{k,update}$ (Cf FIG. 18*b*).

We say that the number of sub-intervals in the current interval k is $K_k$, in the previous interval k−1 is $K_{k-1}$ and in the following interval k+1 is $K_{k+1}$. In the example in FIG. 18*b* $K_k=6$ and $K_{k-1}=4$.

Figure 18C:
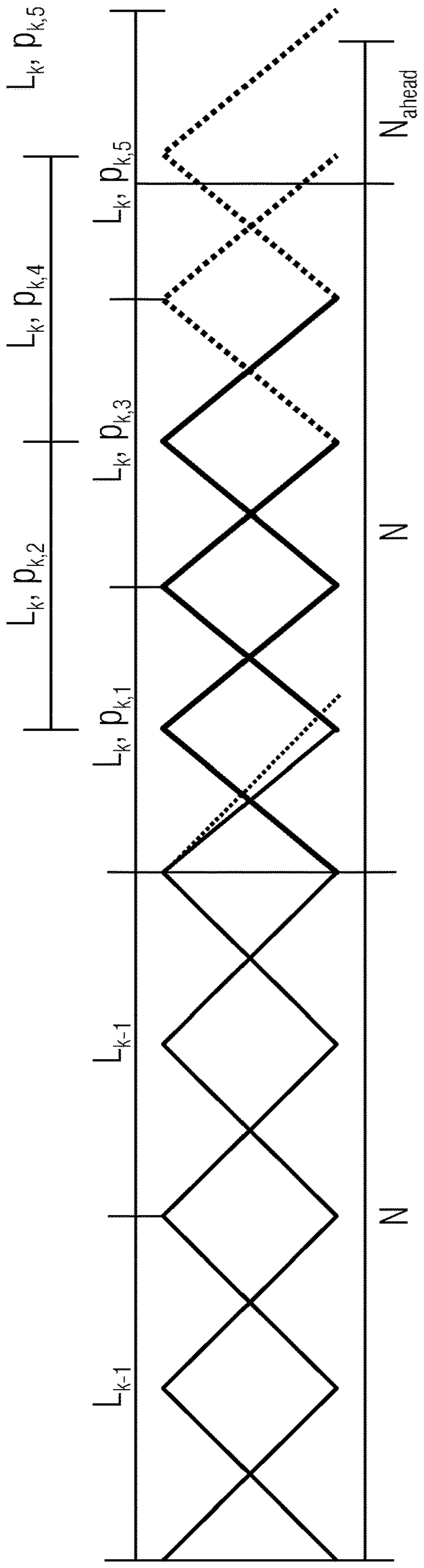
Figure 18D:
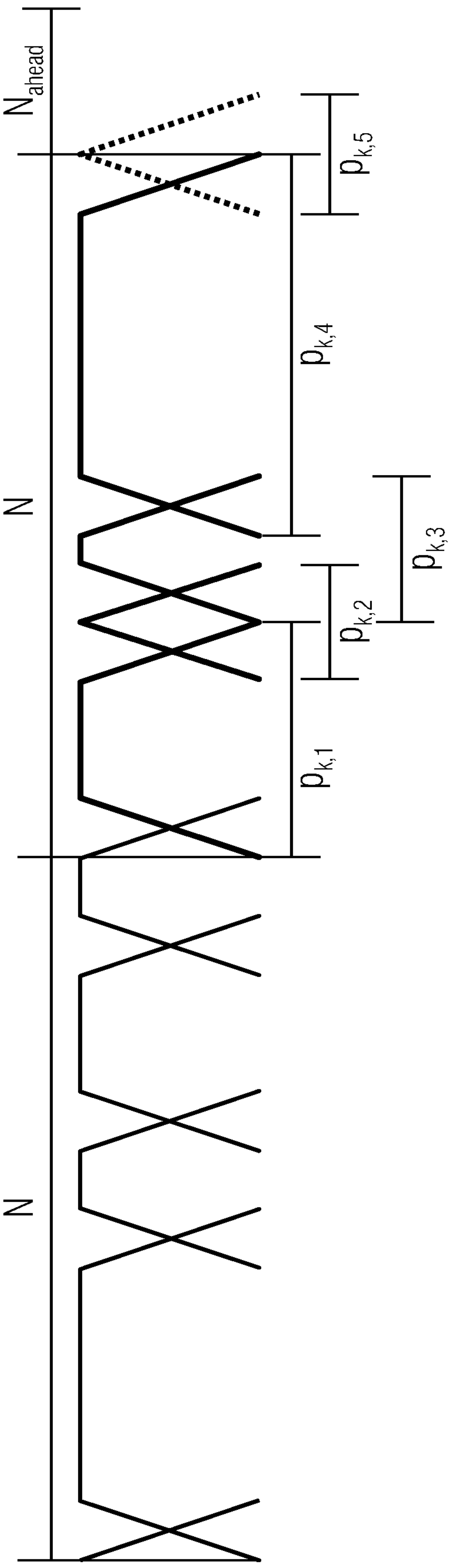

In other example it is possible that the current (time) interval is split into non integer number of sub-intervals and/or that the length of the sub-intervals change within the current interval as illustrated by FIGS. 18*c* and 18*d*.

For each sub-interval l in the current interval k $(1\le l\le K_k)$, sub-interval pitch lag $p_{k,l}$ is found using a pitch search algorithm, which may be the same as the pitch search used for obtaining the pitch contour or different from it. The pitch search for sub-interval l may use values derived from the coded pitch lag (pitch_mid, pitch_end) to reduce the complexity of the search and/or to increase the stability of the values $p_{k,l}$ across the sub-intervals, for example the values derived from the coded pitch lag may be the values of the pitch contour. In other example, parameters found by a global pitch analysis in the complete interval of $y_C$ may be used instead of the coded pitch lag to reduce the complexity of the search and/or the stability of the values $p_{k,l}$ across the sub-intervals. In another example, when searching for the sub-interval pitch lag, it is assumed that an intermediate output of the harmonic post-filtering for previous sub-intervals is available and used in the pitch search (including sub-intervals of the previous intervals).

The $N_{ahead}$ (potentially time aliased) look-ahead samples may also be used for finding pitch in sub-intervals that cross the (time) interval/frame border or, for example if the look-ahead is not available, a delay may be introduced in the decoder in order to have a look-ahead for the last sub-interval in the interval. Alternatively a value derived from the coded pitch lag (pitch_mid, pitch_end) may be used for $p_{k,K_k}$.

For the harmonic post-filtering, the gain adaptive harmonic post-filter may be used. In the example the HPF has the transfer function:

$$H(z)=\frac{1-\alpha\beta hB(z,0)}{1-\beta hgB(z,T_{fr})z^{-T_{int}}}$$

where $B(z, T_{fr})$ is a fractional delay filter. $B(z, T_{fr})$ may be the same as the fractional delay filters used in the LTP or different from them, as the choice is independent. In the HPF, $B(z, T_{fr})$ acts also as a low-pass (or a tilt filter that de-emphasizes the high frequencies). An example for the difference equation for the gain adaptive harmonic post-filter with the transfer function H(z) and $b_j(T_{fr})$ as coefficients of $B(z, T_{fr})$ is:

$$y[n]=x[n]-\beta h\left(\alpha\sum_{i=-m}^{m+1}b_i(0)x[n+i]-g\sum_{j=-m}^{m+1}b_j(T_{fr})y[n-T_{int}+j]\right)$$

Instead of a low-pass filter with a fractional delay, the identity filter may be used, giving $B(z, T_{fr})=1$ and the difference equation:

$$y[n]=x[n]-\beta h(\alpha x[n]-gy[n-T_{int}])$$

The parameter g is the optimal gain. It models the amplitude change (modulation) of the signal and is signal adaptive.

The parameter h is the harmonicity level. It controls the desired increase of the signal harmonicity and is signal adaptive. The parameter β also controls the increase of the signal harmonicity and is constant or dependent on the sampling rate and bit-rate. The parameter β may also be equal to 1. The value of the product βh should be between 0 and 1, 0 producing no change in the harmonicity and 1 maximally increasing the harmonicity. In practice it is usual that βh<0.75.

The feed-forward part of the harmonic post-filter (that is $1-\alpha\beta hB(z, 0)$) acts as a high-pass (or a tilt filter that de-emphasizes the low frequencies). The parameter α determines the strength of the high-pass filtering (or in another words it controls the de-emphasis tilt) and has value between 0 and 1. The parameter α is constant or dependent on the sampling rate and bit-rate. Value between 0.5 and 1 is advantageous in embodiments.

For each sub-interval, optimal gain $g_{k,l}$ and harmonicity level $h_{k,l}$ is found or in some cases it could be derived from other parameters.

For a given $B(z, T_{fr})$ we define a function for shifting/filtering a signal as:

$$y^{-p}[n] = \sum_{j=-1}^{2} b_j(T_{fr}) y_H[n - T_{int} + j],$$

$$T_{int} = \lfloor p \rfloor,\ T_{fr} = p - T_{int}$$

$$\overline{y_C}[n] = y_C^{-0}[n]$$

$$y_{L,l}[n] = y_C[n + (l-1)L]$$

With these definitions $y_{L,l}[n]$ represents for $0 \le n < L$ the signal $y_C$ in a sub-interval l with length L, $\overline{y_C}$ represents filtering of $y_C$ with B(z, 0), $y^{-p}$ represents shifting of $y_H$ for (possibly fractional) p samples.

We define normalized correlation normcorr($y_C$, $y_H$, l, L, p) of signals $y_C$ and $y_H$ at sub-interval l with length L and shift p as:

$$normcorr(y_C, y_H, l, L, p) = \frac{\sum_{n=0}^{L-1} \overline{y}_{L,l}[n] y_{L,l}^{-p}[n]}{\sqrt{\sum_{n=0}^{L-1} (\overline{y}_{L,l}[n])^2 \sum_{n=0}^{L_k-1} (y_{L,l}^{-p}[n])^2}}$$

An alternative definition of normcorr($y_C$, $y_H$, l, L, p) may be:

$$normcorr(y_C, y_H, l, L, p) = \sum_{j=-1}^{2} b_j(T_{fr}) \frac{\sum_{n=0}^{L-1} y_{L,l}[n] y_{L,l}[n - T_{int}]}{\sqrt{\sum_{n=0}^{L-1} (y_{L,l}[n])^2 \sum_{n=0}^{L_k-1} (y_{L,l}[n - T_{int}])^2}}$$

$$T_{int} = \lfloor p \rfloor,\ T_{fr} = p - T_{int}$$

In the alternative definition $y_{L,l}[n-T_{int}]$ represents $y_H$ in the past sub-intervals for $n<T_{int}$. In the definitions above we have used the $4^{th}$ order B (z, $T_{fr}$). Any other order may be used, requiring change in the range for j. In the example where $B(z, T_{fr})=1$, we get $\overline{y}=y_C$ and $y^{-p}[n]=y_H[n-\lfloor p \rfloor]$ which may be used if only integer shifts are considered.

The normalized correlation defined in this manner allows calculation for fractional shifts p.

The parameters of normcorr l and L define the window for the normalized correlation. In the above definition rectangular window is used. Any other type of window (e.g. Hann, Cosine) may be used instead which can be done multiplying $\overline{y}_{L,l}[n]$ and $$y_{L,l}^{-p}[n]$$

with w[n] where w[n] represents the window.

To get the normalized correlation on a sub-interval we would set l to the interval number and L to the length of the sub-interval.

The output of $$y_{L,l}^{-p}[n]$$

represents the ZIR of the gain adaptive harmonic post-filter H(z) for the sub-frame l, with $\beta=h=g=1$ and $T_{int}=\lfloor p \rfloor$ and $T_{fr}=p-T_{int}$.

The optimal gain $g_{k,l}$ models the amplitude change (modulation) in the sub-frame l. It may be for example calculated as a correlation of the predicted signal with the low passed input divided by the energy of the predicted signal:

$$g_{k,l} = \frac{\sum_{n=0}^{L_k-1} \overline{y}_{L_k,l}[n] \overline{y}_{L_k,l}^{-p_{k,l}}[n]}{\sum_{n=0}^{L_k-1} \left(y_{L_k,l}^{-p_{k,l}}[n]\right)^2}$$

In another example the optimal gain $g_{k,l}$ may be calculated as the energy of the low passed input divided by the energy of the predicted signal:

$$g_{k,l} = \frac{\sum_{n=0}^{L_k-1} (\overline{y}_{L_k,l}[n])^2}{\sum_{n=0}^{L_k-1} \left(y_{L_k,l}^{-p_{k,l}}[n]\right)^2}$$

The harmonicity level $h_{k,l}$ controls the desired increase of the signal harmonicity and can be for example calculated as square of the normalized correlation:

$$h_{k,l} = normcorr(y_C, y_H, l, L_k, p_{k,l})^2$$

Usually the normalized correlation of a sub-interval is already available from the pitch search at the sub-interval.

The harmonicity level $h_{k,l}$ may also be modified depending on the LTP and/or depending on the decoded spectrum characteristics. For an example we may set:

$$h_{k,l} = h_{modLTP} h_{modTilt} normcorr(y_C, y_H, l, L_k, p_{k,l})^2$$

where $h_{modLTP}$ is a value between 0 and 1 and proportional to the number of harmonics predicted by the LTP and $h_{modTilt}$ is a value between 0 and 1 and inverse proportional to a tilt of $X_C$. In an example $h_{modLTP}=0.5$ if $n_{LTP}$ is zero, otherwise $h_{modLTP}=0.7+0.3n_{LTP}/n_{LTP}$. The tilt of $X_C$ may be the ratio of the energy of the first 7 spectral coefficients to the energy of the following 43 coefficients.

Once we have calculated the parameters for the sub-interval l, we can produce the intermediate output of the harmonic post-filtering for the part of the sub-interval l that is not overlapping with the sub-interval l+1. As written above, this intermediate output is used in finding the parameters for the subsequent sub-intervals.

Each sub-interval is overlapping and a smoothing operation between two filter parameters is used. The smoothing as described in [3] may be used. Below, advantageous embodiments will be discussed:

Embodiments provide an apparatus for decoding and encoding audio signals, the encoded audio signal comprising at least encoded pitch parameters and parameters defining an error spectrum, the apparatus comprising: inverse frequency domain transform (e.g. inverse MDCT) for generating a block of aliased td audio signal from a derivative of the error spectrum; means for generating a frame of td audio signal using at least two blocks of aliased td audio signal, where at least some portions of the aliased td audio signal are different from the td audio signal (time domain alias cancelation (tdac) coming from windowing and Overlap-and-Add); means for putting samples from the frame of td audio signal into an LTP buffer; means for dividing a prediction signal into sub-intervals depending on the encoded pitch parameters, where at least in some cases there are more sub-intervals than temporally distinct encoded pitch parameters; means for deriving sub-interval parameters from the encoded pitch parameters depending on the position of the sub-interval within the prediction signal, where at least in some cases there are more distinct sub-interval parameters than temporally distinct encoded pitch parameters; means for generating the prediction signal from the LTP buffer depending on the sub-interval parameters, including smoothing across/at sub-interval borders; frequency domain transform for generating a prediction spectrum; means to combine at least a portion of a derivative of the prediction spectrum with the error spectrum to generate a combined spectrum (derivation is a perceptual spectral flattening or a modification); where the derivative of the error spectrum is derived from the combined spectrum (derivation including zero filling, perceptual spectral shaping and TNS).

According to another embodiment an apparatus is provided for decoding an encoded audio signal. The apparatus comprises: inverse frequency domain transform for generating a block of aliased td audio signal from a derivative of the error spectrum; means for generating a frame of td audio signal using at least two blocks of aliased td audio signal, where at least some portions of the aliased td audio signal are different from the td audio signal (time domain alias cancelation (tdac) coming from windowing and Overlap-and-Add); means for putting samples from the frame of td audio signal into an LTP buffer; means for generating a prediction signal from the LTP buffer depending on parameters derived from the encoded pitch parameters; frequency domain transform for generating a prediction spectrum from the prediction signal; means for modifying the prediction spectrum, or a derivative of it, depending on parameters derived from the encoded pitch parameters, to generate modified prediction spectrum; (derivation is for example perceptual spectral flattening. modification is for example the magnitude reduction between harmonics or restriction to the number of predictable harmonics) means to combine at least a portion of a derivative of the modified prediction spectrum with the error spectrum to generate a combined spectrum (derivation is for example perceptual spectral flattening); where the derivative of the error spectrum is derived from the combined spectrum (derivation including for example zero filling, perceptual spectral shaping and TNS).

Another apparatus for decoding an encoded audio signal comprises: inverse frequency domain transform for generating a block of aliased td audio signal from a derivative of the error spectrum; means for generating a frame of td audio signal using at least two blocks of aliased td audio signal, where at least some portions of the aliased td audio signal are different from the td audio signal (time domain alias cancelation (tdac) coming from windowing and Overlap-and-Add); means for putting samples from the frame of td audio signal into an LTP buffer; means for deriving modified pitch parameters from the encoded pitch parameters depending on the contents of the LTP buffer (i.e. extending frequency range of the encoded pitch parameters); means for generating a prediction spectrum from the LTP buffer depending on the modified pitch parameters; (the modified pitch parameters may be used to generate the prediction signal or to modify the prediction spectrum) means to combine at least a portion of a derivative of the prediction spectrum with the error spectrum to generate a combined spectrum (derivation is for example perceptual spectral flattening); where the derivative of the error spectrum is derived from the combined spectrum (derivation including for example zero filling, perceptual spectral shaping and TNS).

According to embodiments the apparatus additionally comprises means for putting all samples from the block of aliased td audio signal not different from the td audio signal into the LTP buffer, even when the samples are used for producing the subsequent frame of td audio signal (using the non-overlapping IMDCT output when overlap is shorter than the maximum overlap). For example, the portion of respective samples used by the LTP buffer may be adapted (e.g. so that a portion of the samples used for the LTP is increased). An example for an increased portion used for the LTP is shown by FIG. 17*c* in comparison to FIG. 17*a*. This means that according to embodiments, one or more previous frames are buffered by the LTP buffer; the buffered frames may be used for the prediction of the current frame or a subsequent frame. For example just one buffered frame or a plurality of buffered frames or just a portion (one or more samples) of one or more frames is used. The selection which portion of the respective buffered frames is selected dynamically. For example, the buffer portion is selected so as to include samples that will be output in the subsequent frame. In general, can comprise one or more samples of one or more frames.

Another embodiment provides an audio processor for processing an audio signal having associated therewith a pitch lag information, the audio processor comprises a domain converter for converting on a frame basis a first domain representation of the audio signal into a second domain representation of the audio signal; and means for dividing the audio signal into overlapping sub-intervals depending on the pitch information, where at least in some cases there are at least two sub-intervals in a frame; a harmonic post-filter for filtering on a sub-interval basis the second domain representation of the audio signal, (including smoothing across/at sub-interval borders,) wherein the harmonic post-filter is based on a transfer function comprising a numerator and a denominator, wherein the numerator comprises a harmonicity value, and wherein the denominator comprises the harmonicity value and a gain value and a pitch lag value, where the harmonicity value is proportional to a desired intensity of the filter independent of amplitude changes in the audio signal and the gain value is dependent on amplitude changes in the audio signal and at least in some cases the harmonic post-filter is different in different sub-intervals.

According to embodiments, the harmonicity value, the gain value and the pitch lag value are derived using already available output of the harmonic post-filter in past sub-intervals and the second domain representation of the audio signal. Background is that harmonic post-filter may change from a previous sub-interval to a subsequent sub-interval and that the harmonic post-filter uses the already available output as its input.

Another embodiment provides a combination of both the LTP and the HPF with a frequency domain decoder.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

[1] G. Cohen, Y. Cohen, D. Hoffman, H. Krupnik, and A. Satt, "Digital audio signal coding," U.S. Pat. No. 6,064,954, 1998.

[2] K. Makino and J. Matsumoto, "Hybrid audio coding for speech and audio below medium bit rate," in *Consumer Electronics,* 2000. *ICCE.* 2000 *Digest of Technical Papers. International Conference on,* 2000, pp. 264-265.

[3] J. Ojanpera, "Method, apparatus and computer program to provide predictor adaptation for advanced audio coding (AAC) system," 2004.

[4] J. Ojanperaå, "Method for improving the coding efficiency of an audio signal," 2007.

[5] J. Ojanperä, "Method for improving the coding efficiency of an audio signal," 2008.

[6] J. Ojanperä, M. Väänänen, and L. Yin, "Long term predictor for transform domain perceptual audio coding," in *Audio Engineering Society Convention* 107, 1999.

[7] S. A. Ramprashad, "A multimode transform predictive coder (MTPC) for speech and audio," in *Speech Coding Proceedings,* 1999 *IEEE Workshop on,* 1999, pp. 10-12.

[8] B. Edler, C. Helmrich, M. Neuendorf, and B. Schubert, "Audio Encoder, Audio Decoder, Method For Encoding An Audio Signal And Method For Decoding An Encoded Audio Signal," PCT/EP2016/054831, 2016.

[9] L. Villemoes, J. Klejsa, and P. Hedelin, "Speech coding with transform domain prediction," in 2017 *IEEE Workshop on Applications of Signal Processing to Audio and Acoustics* (*WASPAA*), 2017, pp. 324-328.

[10] R. H. Frazier, "An adaptive filtering approach toward speech enhancement," Citeseer, 1975.

[11] D. Malah and R. Cox, "A generalized comb filtering technique for speech enhancement," in *Acoustics, Speech, and Signal Processing, IEEE International Conference on ICASSP'*82, 1982, vol. 7, pp. 160-163.

[12] J. Song, C.-H. Lee, H.-O. Oh, and H.-G. Kang, "Harmonic Enhancement in Low Bitrate Audio Coding Using an Efficient Long-Term Predictor," in *EURASIP J. Adv. Signal Process.* 2010, 2010.

[13] T. Morii, "Post Filter And Filtering Method," PCT/JP2007/074044, 2007.

[14] E. Ravelli, C. Helmrich, G. Markovic, M. Neusinger, S. Disch, M. Jander, and M. Dietz, "Apparatus and Method for Processing an Audio Signal Using a Harmonic Post-Filter," PCT/EP2015/066998, 2015.

[15] 3rd Generation Partnership Project; Technical Specification Group Services and System Aspects; Codec for Enhanced Voice Services (EVS); Detailed algorithmic description, no. 26.445. 3GPP, 2019.

[16] C. Helmrich, J. Lecomte, G. Markovic, M. Schnell, B. Edler, and S. Reuschl, "Apparatus And Method For Encoding Or Decoding An Audio Signal Using A Transient-Location Dependent Overlap," PCT/EP2014/053293, 2014.

[17] C. Helmrich, J. Lecomte, G. Markovic, M. Schnell, B. Edler, and S. Reuschl, "Apparatus And Method For Encoding Or Decoding An Audio Signal Using A Transient-Location Dependent Overlap," PCT/EP2014/053293, 2014.

[18] 3rd Generation Partnership Project; Technical Specification Group Services and System Aspects; Codec for Enhanced Voice Services (EVS); Detailed algorithmic description, no. 26.445. 3GPP, 2019.

[19] G. Markovic, E. Ravelli, M. Dietz, and B. Grill, "Signal Filtering," PCT/EP2018/080837, 2018.

[20] N. Guo and B. Edler, "Encoder, Decoder, Encoding Method And Decoding Method For Frequency Domain Long-Term Prediction Of Tonal Signals For Audio Coding," PCT/EP2019/082802, 2019

[21] N. Guo and B. Edler, "Frequency Domain Long-Term Prediction for Low Delay General Audio Coding", IEEE Signal Processing Letters, 2021

[21] T. Nanjundaswamy and K. Rose, "Cascaded Long Term Prediction for Enhanced Compression of Polyphonic Audio Signals," IEEE/ACM Transactions On Audio, Speech, And Language Processing, 2014

[23] E. Ravelli, M. Schnell, C. Benndorf, M. Lutzky, and M. Dietz, Apparatus And Method For Encoding And Decoding An Audio Signal Using Downsampling Or Interpolation Of Scale Parameters, U.S. Patent PCT/EP2017/0789212017.

[24] E. Ravelli, M. Schnell, C. Benndorf, M. Lutzky, M. Dietz, and S. Korse, Apparatus And Method For Encoding And Decoding An Audio Signal Using Downsampling Or Interpolation Of Scale Parameters, U.S. Patent PCT/EP2018/0801372018.

[25] Low Complexity Communication Codec. Bluetooth, 2020.

[26] Digital Enhanced Cordless Telecommunications (DECT); Low Complexity Communication Codec plus (LC3plus), no. 103 634. ETSI, 2019.

The invention claimed is:

1. A processor for processing an encoded audio signal, the encoded audio signal comprising at least an encoded pitch parameter, the processor comprising:

an LTP buffer configured to receive samples derived from a frame of the encoded audio signal;

an interval splitter configured to divide a time interval associated with a subsequent frame of the encoded audio signal into sub-intervals depending on the encoded pitch parameter;

a calculation unit configured to derive sub-interval parameters from the encoded pitch parameter dependent on a position of the sub-intervals within the time interval associated with the subsequent frame of the encoded audio signal;

a predictor configured for generating a prediction signal from the LTP buffer dependent on the sub-interval parameters; and a frequency domain transformer configured for generating a prediction spectrum based on the prediction signal.

2. The processor according to claim 1, wherein there are more sub-intervals than temporarily distinct encoded pitch parameters; and/or wherein there are more distinct sub-interval parameters than temporarily distinct encoded pitch parameters; and/or wherein there are more than one temporarily distinct encoded pitch parameters in the frame.

3. The processor according to claim 1, further comprising a combiner configured to combine at least a portion of a derivation of the prediction spectrum with an error spectrum to generate a combined spectrum; and/or wherein a derivation of the prediction spectrum is derived from the prediction spectrum by perceptually flattening the prediction spectrum.

4. The processor according to claim 3, further comprising a unit for putting all samples from a block of aliased time domain audio signal being not different from the audio signal into the LTP buffer; or further comprising a unit for putting samples from the block of aliased time domain audio signal not different from a time domain audio signal into the LTP buffer, wherein the samples are used for producing the subsequent frame of audio signal; or further comprising a unit for putting samples from the block of aliased time domain audio signal not different from a current frame into the LTP buffer, wherein the samples are used for producing the subsequent frame of time domain audio signal, wherein a selection of a portion of the current frame or of the samples selected from the block of aliased time domain audio signal is adapted by the unit for putting samples.

5. The processor according to claim 1, wherein the processor further comprises an inverse frequency domain transformer; and/or wherein the processor further comprises an inverse frequency domain transformer configured for generating a block of aliased time domain audio signal from a derivation of an error spectrum, where the prediction spectrum is obtained from the frame of the encoded audio signal and/or where an error spectrum is obtained from the subsequent frame of the encoded audio signal subsequent to the frame and the derivation of the error spectrum is derived from the error spectrum; or wherein the processor further comprises the inverse frequency domain transformer configured for generating the block of aliased time domain audio signal from the derivation of the error spectrum, where the prediction spectrum is obtained from the frame of the encoded audio signal and/or where the error spectrum is obtained from the subsequent frame of the encoded audio signal subsequent to the frame and the derivation of the error spectrum is derived from the error spectrum; and a unit for generating a frame of time domain audio signal using at least two blocks of the aliased time domain audio signal, where at least some portions of the aliased time domain audio signal are different from the time domain audio signal and the received samples, respectively.

6. The processor according to claim 4, further comprising an entity configured for zero filling based on a signal received from a band-wise parametric decoder and a combined spectrum to obtain the derivation of the error spectrum where the combined spectrum is obtained based on at least a portion of a derivation of the prediction spectrum and the error spectrum; and an entity configured for spectral shaping a spectral envelope of a signal modified by an entity configured for temporal shaping and taking into account a coded information for the spectral shaping to obtain the derivation of the error spectrum and the entity configured for temporal shaping the signal taking into account the coded information for temporal shaping to obtain the derivation of the error spectrum.

7. The processor according to claim 1, further comprising a combiner configured to combine at least a portion of the prediction spectrum $X_P$ with an error spectrum XD to generate a combined spectrum $X_{DT}$; and/or further comprising a combiner configured to combine at least a portion of the prediction spectrum $X_P$ or at least a portion of a derivation of a prediction spectrum $X_{PS}$ with an error spectrum $X_D$, wherein the portion is determined based on the encoded pitch parameter; and/or further comprising a combiner configured to combine at least a portion of the prediction spectrum $X_P$ or at least a portion of a derivation of the prediction spectrum $X_{PS}$ with an error spectrum $X_D$, wherein if the LTP buffer is active, then first $\lfloor(n_{LTP}+0.5)iF0\rfloor$ coefficients of the prediction spectrum or the derivation of the prediction spectrum, except a zeroth coefficient, are added to the error spectrum to produce a combined spectrum $X_{DT}$; and/or wherein the zeroth and the coefficients above $\lfloor(n_{LTP}+0.5)iF0\rfloor$ are copied from the error spectrum to the combined spectrum), wherein "$\lfloor\ \rfloor$" indicates a use of a floor function;

where $n_{LTP}$ is a parameter from the encoded audio signal and/or where $n_{LTP}$ is a number of predictable harmonics; and where iF0 is derived from the encoded pitch parameter.

8. The processor according to claim 1, wherein in each sub-interval the predicted signal is constructed using the LAP buffer and/or using a decoded audio signal out of the LTP buffer and a filter whose parameters are derived from the encoded pitch parameter and the sub-interval position within the time interval associated with the subsequent frame of the encoded audio signal.

9. The processor according to claim 1, wherein the calculation unit are configured to derive sub-interval parameters from the encoded pitch parameter, wherein the sub-interval parameters comprise at least a sub-interval pitch parameter, as follows:

obtaining a sub-interval pitch lag associated with a center of the sub-interval from a pitch contour, wherein the pitch contour comprises multiple values, comprising:

setting the sub-interval pitch lag to the pitch contour value at the position of the sub-interval center, determining a sub-interval end, comparing the sub-interval pitch lag to the sub-interval end producing a comparison result, and/or adapting the sub-interval pitch lag for the pitch contour value at position derived from the sub-interval pitch lag depending on the comparison result and further comprising the calculation unit configured to derive a pitch contour from the encoded pitch parameter; where the pitch contour is obtained from the encoded pitch parameters using an interpolation; or further comprising the calculation unit configured to derive a pitch contour from the encoded pitch parameter; where the pitch contour is obtained from the encoded pitch parameters using an interpolation.

10. The processor according to claim 1, further comprising a unit for smoothing the prediction signal across and/or at borders of at least two sub-intervals of a plurality of sub-intervals and/or further comprising a unit for smoothing the prediction signal across and/or at borders of at least two sub-intervals of the plurality of sub-intervals, wherein at least the at least two sub-intervals are overlapping.

11. The processor according to claim 1, further comprising a unit for modifying the predicted spectrum, or a derivative of the predicted spectrum, dependent on a parameter derived from the encoded pitch parameter in order to generate a modified predicted spectrum; and/or further comprising a unit for modifying the predicted spectrum, or a derivative of the predicted spectrum, wherein the unit for modifying are configured to adapt magnitudes of MDCT coefficients at least $n_{Fsafeguard}$ away from harmonics in $X_P$ or in $X_{PS}$ by setting to zero or multiplying with a positive factor smaller than 1 magnitudes of the MDCT coefficients; or further comprising a unit for modifying the predicted spectrum, or a derivative of the predicted spectrum, wherein the unit for modifying are configured to reduce magnitudes of the predicted spectrum, or magnitudes of the derivative of the predicted spectrum, between harmonics.

12. The processor according to claim 1, further comprising a unit for deriving a modified pitch parameter from the encoded pitch parameter dependent on a content of the LTP buffer; or wherein the predicted spectrum is generated dependent on a modified pitch parameter.

13. A processing unit comprising a processor claim 1, and the processor comprising:

a splitter configured for splitting a time interval associated with a frame of the audio signal into a plurality of sub-intervals, each comprising a respective length, the respective length of the plurality of sub-intervals being dependent on a pitch lag value;

a harmonic post-filter configured for filtering the plurality of sub-intervals, wherein the harmonic post-filter is based on a transfer function comprising a numerator and a denominator, where the numerator comprises a harmonicity value, and wherein the denominator comprises a sub-interval pitch lag value and the harmonicity value and/or a gain value;

wherein the associated harmonicity value and/or the sub-interval pitch lag value and/or the gain value is different in at least two different sub-intervals of the plurality of sub-intervals;

wherein the sub-interval pitch lag value, the harmonicity value and/or the gain value are obtained based on the audio signal in each sub-interval of the plurality of sub-intervals.

14. A processor for processing an audio signal, the processor comprising:

a splitter configured for splitting a time interval associated with a frame of the audio signal into a plurality of sub-intervals, each comprising a respective length, the respective length of the plurality of sub-intervals being dependent on a pitch lag value;

a harmonic post-filter configured for filtering the plurality of sub-intervals, wherein the harmonic post-filter is based on a transfer function comprising a numerator and a denominator, where the numerator comprises a harmonicity value, and wherein the denominator comprises a sub-interval pitch lag value and the harmonicity value and/or a gain value;

wherein the associated harmonicity value and/or the sub-interval pitch lag value and/or the gain value is different in at least two different sub-intervals of the plurality of sub-intervals;

wherein the sub-interval pitch lag value, the harmonicity value and/or the gain value are obtained based on the audio signal in each sub-interval of the plurality of sub-intervals.

15. The processor according to claim 14, wherein at least two subintervals or the plurality of sub-intervals are overlapping.

16. The processor according to claim 14, wherein the harmonicity value is proportional to a desired intensity of the harmonic post-filter and/or independent of amplitude changes in the audio signal; and/or wherein the gain value is dependent on the amplitude changes in the audio signal).

17. The processor according to according to claim 14, wherein the harmonic post-filter changes from a sub-interval to a subsequent sub-interval; and/or wherein the harmonicity value and/or the gain value and/or the sub-interval pitch lag value in the subsequent sub-interval are derived using an output of the harmonic post-filter in the sub-interval.

18. The processor according to claim 14, wherein the harmonic post-filter is different in at least two different sub-intervals of the plurality of sub-intervals; or wherein the harmonic post-filter is different in at least two different sub-intervals of the plurality of sub-intervals or wherein the associated harmonicity value and/or the sub-interval pitch lag value and/or the gain value is different in at least two different sub-intervals of the plurality of sub-intervals, the in at least two different sub-intervals of the plurality of sub-intervals belonging to a same frame.

19. The processor according to claim 14, further comprising a unit for smoothing an output of the harmonic post-filter in the plurality of sub-intervals across and/or at sub-interval borders.

20. The processor according to claim 14, wherein there are at least two sub-intervals within the frame.

21. The processor according to claim 14, wherein the respective length is dependent on an average pitch; and/or wherein an average pitch is obtained from an encoded pitch parameter; and/or wherein the encoded pitch parameter comprises higher time resolution than a codec framing and/or wherein the encoded pitch parameter comprises lower time resolution then a pitch contour.

22. The processor according to claim 14, further comprising a domain converter configured for converting on a frame basis a first domain representation of the audio signal into a second domain representation of the audio signal; or further comprising a domain converter configured for converting on a frame basis a frequency domain representation of the audio signal into a time domain representation of the audio signal.

23. The processor claim 14, wherein the harmonicity value and/or the gain value and/or the sub-interval pitch lag value for each sub-interval is derived dependent on a position of the respective sub-interval within the time interval associated with the frame.

24. A decoder for decoding an encoded audio signal which comprises a processor claim 1 and/or a processor comprising:

a splitter configured for splitting a time interval associated with a frame of the audio signal into a plurality of sub-intervals, each comprising a respective length, the respective length of the plurality of sub-intervals being dependent on a pitch lag value;

a harmonic post-filter configured for filtering the plurality of sub-intervals, wherein the harmonic post-filter is based on a transfer function comprising a numerator and a denominator, where the numerator comprises a harmonicity value, and wherein the denominator comprises a sub-interval pitch lag value and the harmonicity value and/or a gain value;

wherein the associated harmonicity value and/or the sub-interval pitch lag value and/or the gain value is different in at least two different sub-intervals of the plurality of sub-intervals; wherein the sub-interval pitch lag value, the harmonicity value and/or the gain value are obtained based on the audio signal in each sub-interval of the plurality of sub-intervals.

25. The decoder claim 24, further comprising a frequency domain decoder or a decoder based on an inverse MDCT.

26. An encoder for encoding an audio signal, comprising the processor claim 1.

27. A method for processing an encoded audio signal, the encoded audio signal comprising at least an encoded pitch parameter, the method comprising following steps:

receiving samples derived from a frame of the encoded audio signal using an LTP buffer;

dividing a time interval associated with a subsequent frame of the encoded audio signal subsequent to the frame into sub-intervals depending on the encoded pitch parameter;

deriving sub-interval parameters from the encoded pitch parameter dependent on a position of the sub-intervals within the time interval associated with the subsequent frame of the encoded audio signal;

generating a prediction signal from the LTP buffer dependent on the sub-interval parameters; and generating a prediction spectrum based on the prediction signal.

28. A method for processing an audio signal, the method comprising following steps:

splitting a time interval associated with a frame of the audio signal into a plurality of sub-intervals, each comprising a respective length, the respective lengths of at least two of the plurality of sub-intervals being dependent on a pitch lag value; and filtering the plurality of sub-intervals using a harmonic post-filter, wherein the harmonic post-filter is based on a transfer function comprising a numerator and a denominator, where the numerator comprises a harmonicity value, and wherein the denominator comprises a sub-interval pitch lag value and the harmonicity value and/or a gain value, wherein the associated harmonicity value and/or the sub-interval pitch lag value and/or the gain value is different in at least two different sub-intervals of the plurality of sub-intervals, and wherein the sub-interval pitch lag value, the harmonicity value and/or the gain value are obtained based on the audio signal in each sub-interval of the plurality of sub-intervals.

29. A non-transitory digital storage medium having a computer program stored thereon to perform a method for processing an encoded audio signal, the encoded audio signal comprising at least an encoded pitch parameter and the method comprising following steps:

receiving samples derived from a frame of the encoded audio signal using an LTP buffer;

dividing a time interval associated with a subsequent frame of the encoded audio signal subsequent to the frame into sub-intervals depending on the encoded pitch parameter;

deriving sub-interval parameters from the encoded pitch parameter dependent on a position of the sub-intervals within the time interval associated with the subsequent frame of the encoded audio signal;

generating a prediction signal from the LTP buffer dependent on the sub-interval parameters; and generating a prediction spectrum based on the prediction signal, when said computer program is run by a computer.

30. A non-transitory digital storage medium having a computer program stored thereon to perform a method for processing an audio signal, the method comprising following steps:

splitting a time interval associated with a frame of the audio signal into a plurality of sub-intervals, each comprising a respective length, the respective lengths of at least two of the plurality of sub-intervals being dependent on a pitch lag value; and filtering the plurality of sub-intervals using a harmonic post-filter, wherein the harmonic post-filter is based on a transfer function comprising a numerator and a denominator, where the numerator comprises a harmonicity value, and wherein the denominator comprises a sub-interval pitch lag value and the harmonicity value and/or a gain value, wherein the associated harmonicity value and/or the sub-interval pitch lag value and/or the gain value is different in at least two different sub-intervals of the plurality of sub-intervals, and wherein the sub-interval pitch lag value, the harmonicity value and/or the gain value are obtained based on the audio signal in each sub-interval of the plurality of sub-intervals, when said computer program is run by a computer.

* * * * *